US012750622B2

(12) United States Patent
Ham et al.

(10) Patent No.: US 12,750,622 B2
(45) Date of Patent: Sep. 29, 2026

(54) APPARATUS INCLUDING A REAR COVER HAVING A HOLE

(71) Applicant: LG Display Co., Ltd., Seoul (KR)

(72) Inventors: Sungsu Ham, Paju-si (KR); Sungtae Lee, Paju-si (KR); Yongjun Cho, Paju-si (KR); Seungwoo Baek, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 125 days.

(21) Appl. No.: 18/821,644

(22) Filed: Aug. 30, 2024

(65) Prior Publication Data

US 2025/0088806 A1 Mar. 13, 2025

(30) Foreign Application Priority Data

Sep. 8, 2023 (KR) ........................ 10-2023-0119923
Jul. 31, 2024 (KR) ........................ 10-2024-0101846

(51) Int. Cl.

| | |
|---|---|
| ***H04R 17/00*** | (2006.01) |
| ***H04R 1/02*** | (2006.01) |
| ***H04R 1/40*** | (2006.01) |
| ***H04R 3/12*** | (2006.01) |

(52) U.S. Cl.

CPC ............. *H04R 17/00* (2013.01); *H04R 1/028* (2013.01); *H04R 1/403* (2013.01); *H04R 3/12* (2013.01); *H04R 2499/15* (2013.01)

(58) Field of Classification Search

CPC ........ H04R 17/00; H04R 1/028; H04R 1/403; H04R 3/12; H04R 2499/15

See application file for complete search history.

(56) References Cited

U.S. PATENT DOCUMENTS

| | | | | |
|---|---|---|---|---|
| 12,464,288 B2 * | 11/2025 | Ha | ......................... | H04R 7/045 |
| 12,549,892 B2 * | 2/2026 | Lee | ......................... | H04R 1/345 |
| 2022/0182744 A1 * | 6/2022 | Han | ......................... | H04R 17/00 |
| 2025/0220336 A1 * | 7/2025 | Lee | ......................... | H04R 1/2811 |

* cited by examiner

*Primary Examiner* — Andrew Sniezek

(74) *Attorney, Agent, or Firm* — Birch, Stewart, Kolasch & Birch, LLP

(57) ABSTRACT

An apparatus in one example includes a vibration member, a vibration apparatus connected to a rear surface of the vibration member, and a rear cover covering a rear surface of the vibration apparatus. The rear cover includes a hole part having a plurality of holes overlapping the vibration apparatus. The size of the hole part is greater than the size of the vibration apparatus.

24 Claims, 21 Drawing Sheets

APPARATUS INCLUDING A REAR COVER HAVING A HOLE

CROSS-REFERENCE TO RELATED APPLICATIONS

This application claims priority to Korean Patent Application No. 10-2023-0119923 filed on Sep. 8, 2023 and Korean Patent Application No. 10-2024-0101846 filed on Jul. 31, 2024, the entire contents of all these applications being hereby expressly incorporated by reference into the present application.

BACKGROUND

Technical Field

The present disclosure relates to an apparatus, and more particularly, to an apparatus for outputting sound.

Discussion of the Related Art

Apparatuses include a separate speaker or sound apparatus for providing sound. When a speaker is in a display apparatus, the speaker occupies a space. However, due to this configuration, the design and spatial disposition of the display apparatus can be limited.

A speaker applied to the apparatus can be, for example, an actuator including a magnet and a coil. However, when the actuator is applied to the apparatus, a thickness thereof can be large. As such, piezoelectric elements that enable thinness to be implemented are attracting much attention.

SUMMARY OF THE DISCLOSURE

Sound, which is generated in a sound apparatus or a speaker embedded in a display apparatus which is a type of apparatus, is output in a rearward direction or a lateral direction of the display apparatus instead of a forward direction of a display panel and thus does not travel toward a viewer or a user who is watching an image at a front region with respect to the display panel. Due to this configuration, there is a problem where an immersion experience of the viewer watching the image is hindered.

Therefore, the inventors of the present disclosure have recognized such problems described above and have performed various research and experiments on an apparatus for outputting a sound in a forward direction and a rearward direction thereof. Based on the various research and experiments, the inventors of the present disclosure have invented a new apparatus for outputting a sound in a forward direction and a rearward direction thereof.

The present disclosure provides an apparatus which can output a sound in a forward direction and a rearward direction thereof.

The present disclosure provides an apparatus which can be improved in sound quality, can reproduce a sound of a middle-high-pitched sound band, and can output a sound having a wide orientation.

The present disclosure provides an apparatus which can reduce an increase in temperature when driving a vibration apparatus and can have low power consumption.

Additional features and aspects will be set forth in the description that follows, and in part will be apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, an apparatus comprises a vibration member, a vibration apparatus connected to a rear surface of the vibration member, and a rear cover covering a rear surface of the vibration apparatus. The rear cover comprises a hole part including a plurality of holes overlapping the vibration apparatus. A size of the hole part is greater than a size of the vibration apparatus.

Details of other example embodiments of the present disclosure will be included in the detailed description of the disclosure and the accompanying drawings.

An apparatus according to one or more embodiments of the present disclosure can output a sound in a forward direction and a rearward direction of a vibration member (or display panel).

An apparatus according to one or more embodiments of the present disclosure can be improved in sound quality, can reproduce a sound of a middle-high-pitched sound band, and can output a sound having a wide orientation.

An apparatus according to one or more embodiments of the present disclosure can include an embedded vibration apparatus, can have an improved design, and can implement a clean back design.

An apparatus according to one or more embodiments of the present disclosure can include a film-type vibration apparatus including a piezoelectric material, and thus, can have low current consumption and can output a sound having a middle-high-pitched sound band and a wide orientation, thereby implementing an immersive sound.

An apparatus according to one or more embodiments of the present disclosure can include a pad member, and thus, can be improved in sound quality and can prevent an increase in temperature caused by driving of a vibration apparatus because an air gap between a vibration member and a rear cover is maintained.

In the apparatus according to one or more embodiments of the present disclosure, a signal supply member and a vibration apparatus can be electrically connected to each other without a soldering process.

In the apparatus according to one or more embodiments of the present disclosure, as a signal supply member and a vibration apparatus are provided as one body, the signal supply member and the vibration apparatus can be configured as one part (or an element or one component), thereby realizing a uni-materialization effect.

In the apparatus according to one or more embodiments of the present disclosure, a structure and a manufacturing process of a vibration apparatus can be simplified.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims.

Nothing in this section should be taken as a limitation on those claims. Further aspects and advantages are discussed below in conjunction with aspects of the disclosure.

It is to be understood that both the foregoing description and the following description of the present disclosure are example and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

Figure 1:
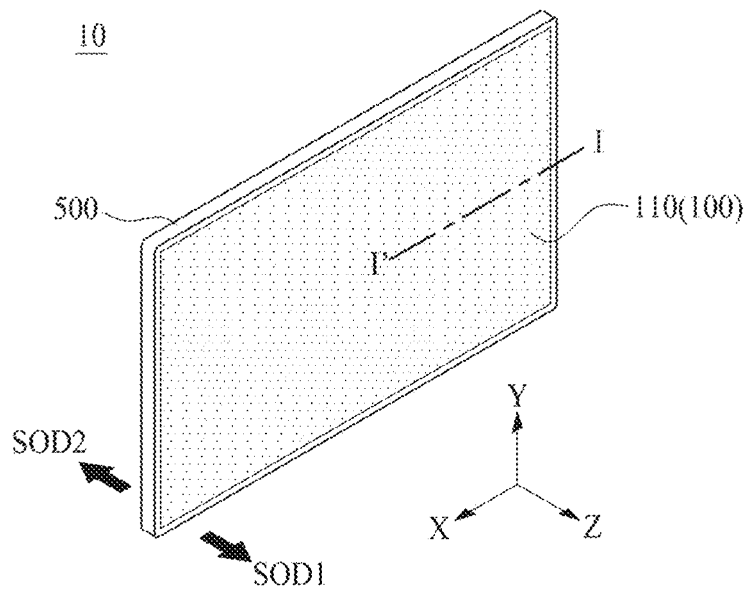
FIG. 1 is a perspective view illustrating an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and convenience.

DETAILED DESCRIPTION OF THE EMBODIMENTS

Reference is now made in detail to aspects of the present disclosure, examples of which can be illustrated in the accompanying drawings. In the following description, when a detailed description of well-known functions, structures or configurations can unnecessarily obscure aspects of the present disclosure, a detailed description of such known functions or configurations can have been omitted for brevity. Further, repetitive descriptions can be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings, are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where a term like "comprise," "have," "include," "contain," "constitute," "made of," "formed of," or the like is used with respect to one or more elements, one or more other elements can be added unless a term such as "only" or the like is used. The terms used in the present disclosure are merely used in order to describe example aspects, and are not intended to limit the scope of the present disclosure. The terms of a singular form can include plural forms unless the context clearly indicates otherwise.

The word "example" is used to mean serving as an example or illustration, unless otherwise specified. Aspects are example aspects. Aspects are example aspects. "Aspects," "examples," "aspects," and the like should not be construed as preferred or advantageous over other implementations. An aspect, an example, an example aspect, an aspect, or the like can refer to one or more aspects, one or more examples, one or more example aspects, one or more aspects, or the like, unless stated otherwise. Further, the term "can" encompasses all the meanings of the term "may."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an example term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate(ly)," or "direct(ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, or the like), these elements should not be limited by these terms, for example, to any particular order, sequence, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element can be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element can be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item", can represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning for example, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

Here, “X-axis direction”, “Y-axis direction” and “Z-axis direction” should not be construed by a geometric relation only of a mutual vertical relation and can have broader directionality within the range that elements of the present disclosure can act functionally.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

Figure 2:
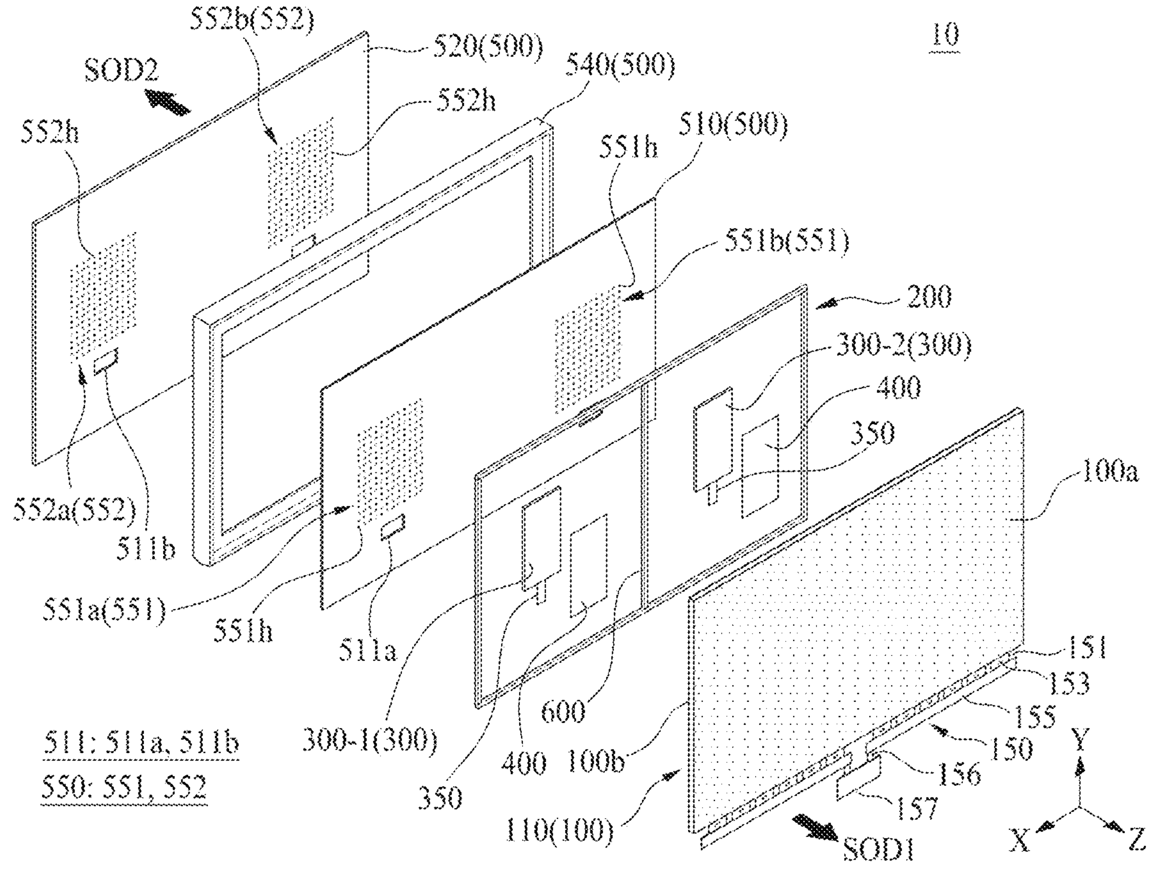
FIG. 2 is an exploded perspective view illustrating an apparatus according to an embodiment of the present disclosure.
Figure 3:
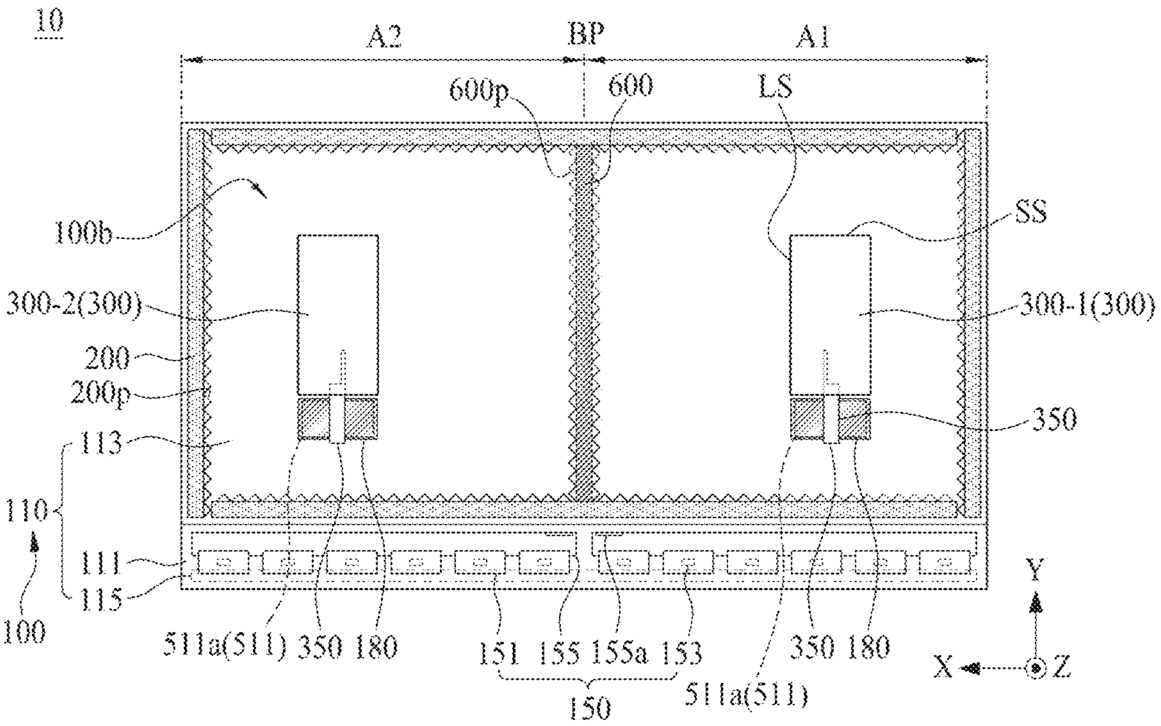
FIG. 3 illustrates a rear surface of a vibration member and a vibration apparatus according to an embodiment of the present disclosure.
Figure 4:
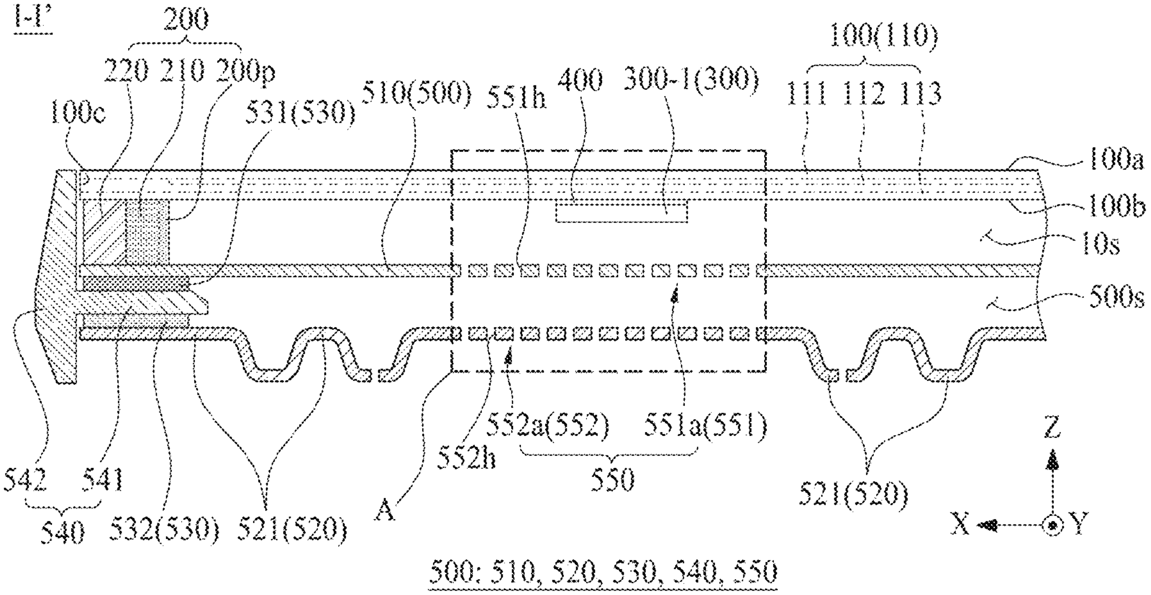
FIG. 4 is a cross-sectional view taken along line I-I' illustrated in FIG. 1.
Figure 5:
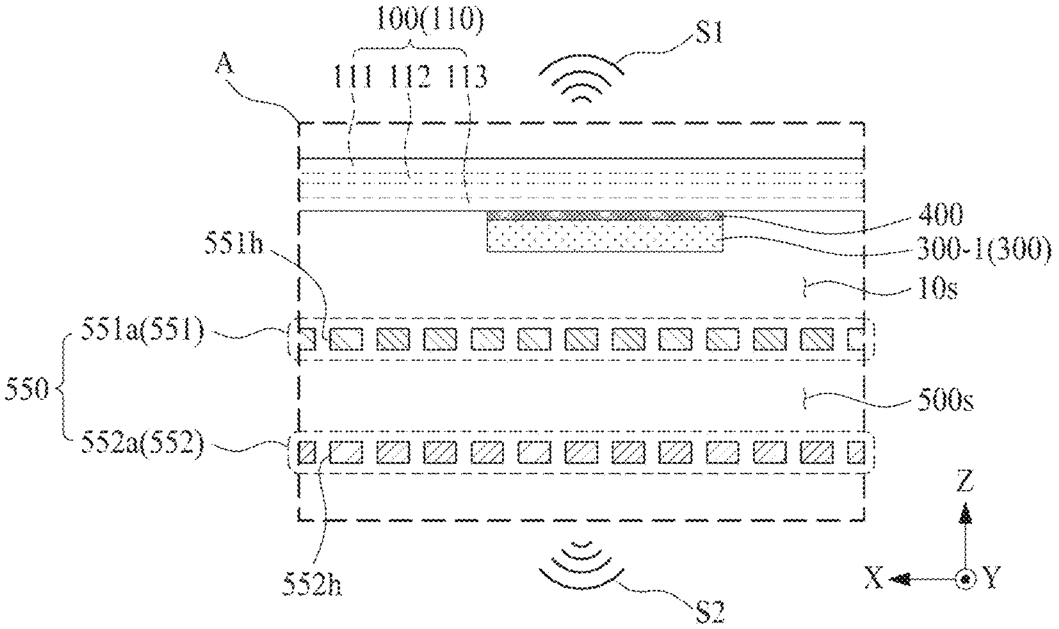
FIG. 5 is an expanded view of an area 'A' illustrated in FIG. 4.

FIG. 1 is a perspective view illustrating an apparatus according to an embodiment of the present disclosure. FIG. 2 is an exploded perspective view illustrating an apparatus according to an embodiment of the present disclosure. FIG. 3 illustrates a rear surface of a vibration member and a vibration apparatus according to an embodiment of the present disclosure. FIG. 4 is a cross-sectional view taken along line I-I' illustrated in FIG. 1. FIG. 5 is an expanded view of area ‘A’ illustrated in FIG. 4.

With reference to FIGS. 1 to 5, an apparatus 100 according to an embodiment of the present disclosure can implement or realize a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, a vehicular apparatus can include one or more seats and one or more windows (or glass windows). For example, the vehicular apparatus can include a vehicle, a train, a ship, or an aircraft, but embodiments of the present disclosure are not limited thereto. Further, the apparatus 100 can implement or realize an analog signage or a digital signage, or the like such as an advertising signboard, a poster, or a noticeboard, or the like.

The apparatus 10 according to an embodiment of the present disclosure can be applied to a vehicle by being implemented as a user interface device, such as a central control panel in an automobile. For example, the user interface device for the vehicle can be configured between two front seat occupants such that sounds due to vibrations of the display module propagate towards the interior of the vehicle. Thus, the audio experience within a vehicle can be improved when compared to having speakers only at the interior sides in the vehicle.

The apparatus 10 according to an embodiment of the present disclosure can be a display apparatus which includes a plurality of pixels, but embodiments of the present disclosure are not limited thereto. The display apparatus can include a display panel which includes a plurality of pixels for configuring a black/white or a color image, and a driver configured to drive the display panel. The pixel can be a subpixel which configures one of a plurality of colors implementing a color image.

The apparatus 10 according to an embodiment of the present disclosure can include a vibration member 100, a vibration apparatus 300, and a rear cover 500.

The vibration member 100 can generate a vibration or can output a sound (or a sound wave) based on a displacement (or driving or vibration) of the vibration apparatus 300. The vibration member 100 can be a passive vibration panel, a display panel, a vibration object, a display member, a signage panel, a passive vibration plate, a front member, a vibration panel, a sound panel, a sound output plate, a sound vibration plate, or an image screen, or the like, but embodiments of the present disclosure are not limited thereto.

The vibration member 100 according to an embodiment of the present disclosure can include a polygonal shape including a rectangular shape or a square shape, but embodiments of the present disclosure are not limited thereto. The vibration member 100 can include a horizontal length (or a long-side) parallel to a first direction X and a vertical length (or a short-side) parallel to a second direction (or a Y-axis direction) Y. For example, with respect to a same plane, the first direction X can be a first horizontal direction, an X-axis direction, or a first horizontal length direction (or a long-side length direction) of the vibration member 100. For example, the second direction Y can be a second horizontal direction which is orthogonal to the first direction X, a Y-axis direction, or a second horizontal length direction (or a short-side length direction) of the vibration member 100.

The vibration member 100 according to an embodiment of the present disclosure can include a structure having totally a same thickness, but embodiments of the present disclosure are not limited thereto. For example, the vibration member 100 can include a plate structure having totally a same thickness, but embodiments of the present disclosure are not limited thereto. For example, the vibration member 100 can include one or more of a planar structure and a nonplanar structure.

According to an embodiment of the present disclosure, the vibration member 100 can include a first surface 100*a*, a second surface 100*b*, and a plurality of lateral surfaces 100*c*. In the vibration member 100, the first surface 100*a* can be a front surface, a forward surface, a top surface, or an upper surface. The second surface 100*b* can be a rear surface, a rearward surface, a bottom surface, or a lower surface. Each of the plurality of lateral surfaces 100*c* can be an outer side, a sidewall, or an outer wall.

The vibration member 100 according to another embodiment of the present disclosure can include a vibration plate which includes a metal material or a nonmetal material (or a composite nonmetal material) having a material characteristic suitable for outputting a sound based on a vibration. The vibration member 100 can be configured to be transparent, translucent, or opaque. The metal material of the vibration member 100 can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the vibration member 100 can include one or more material (or substance) of plastic, fiber, leather, wood, cloth, rubber, carbon, glass, and paper, but embodiments of the present disclosure are not limited thereto. For example, the paper can be cone paper for speakers. For example, the cone paper can be a pulp or a foamed plastic, or the like, but embodiments of the present disclosure are not limited thereto.

The plastic material of the vibration member 100 according to an embodiment of the present disclosure can be configured as polyethylene terephthalate (PET), polycarbonate (PC), polyimide (PI), polypropylene (PP), polyarylate (PAR), polyethersulfone (PES), polyethylene naphthalate (PEN), polysulfone (PS), cyclo-olefin copolymer (COC), or carbon fiber reinforced plastic (CFRP), or the like, but embodiments of the present disclosure are not limited thereto.

The vibration member 100 according to another embodiment of the present disclosure can be configured in a plastic material of styrene material, but embodiments of the present disclosure are not limited thereto. For example, the styrene material can be an ABS material. The ABS material can be acrylonitrile, butadiene, and styrene.

The vibration member 100 according to an embodiment of the present disclosure can include a porous material. For example, the vibration member 100 can include a micro cellular plastic material. For example, the vibration member 100 can be configured as a polyethylene terephthalate (PET) material or a polycarbonate (PC) material. For example, the vibration member 100 can be configured as a Micro Cellular polyethylene terephthalate (MCPET) material. The vibration member 100 configured the MCPET can have capability to reproduce a high original sound because having a low density and an excellent elastic force, thereby enhancing the quality of a sound.

The vibration member 100 according to another embodiment of the present disclosure can implement or realize a signage panel such as an analog signage or a digital signage, or the like such as an advertising signboard, a poster, or a noticeboard, or the like. For example, when the vibration member 100 implements the signage panel, the analog signage can include signage content such as a sentence, a picture, and a sign, or the like. The signage content can be disposed at the vibration member 100 to be visible. For example, the signage content can be attached at one or more of the first surface 100*a* and the second surface 100*b* of the vibration member 100. For example, the signage content can be directly attached at one or more of the first surface 100*a* and the second surface 100*b* of the vibration member 100. For example, the signage content can be printed on a medium such as paper or the like, and the medium with the signage content printed thereon can be directly attached at one or more of the first surface 100*a* and the second surface 100*b* of the vibration member 100. For example, when the signage content is attached at the second surface 100*b* of the vibration member 100, the vibration member 100 can be configured as a transparent material. For example, the vibration member 100 can be a passive vibration member or a display panel, or the like, but embodiments of the present disclosure are not limited thereto. The vibration member 100 according to another embodiment of the present disclosure can include a display panel 110 which includes a plurality of pixels for implementing a black/white or a color image.

The display panel 110 can display an image, for example, an electronic image or a digital image. For example, the display panel 110 can output light to display an image. For example, the display panel 110 can be a curved display panel, or can be any type of display panel, such as a liquid crystal display panel, an organic light emitting display panel, a quantum dot light emitting display panel, a micro light emitting diode display panel, and an electrophoresis display panel. The display panel 110 can be a flexible display panel. For example, the display panel 110 can be a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

With reference to FIGS. 2 to 4, the display panel 110 (or vibration member 100) according to an embodiment of the present disclosure can include a base member 111, a pixel array part 112, and an encapsulation member 113.

The base member 111 can be configured as one or more of a glass member, a flexible glass member, and a plastic member. For example, the base member 111 can be configured as a polyimide material.

The pixel array part 112 can be configured on the base member 111 to display an image. For example, the pixel array part 112 can include a light emitting device (or light emitting device layer) which is disposed on the base member 111. For example, the pixel array part 112 can include a plurality of pixels having a light emitting device (or light emitting device layer) which is disposed on the base member 111. For example, each of the plurality of pixels can include a pixel circuit (or a circuit layer) having a thin film transistor connected to the light emitting device. For example, the pixel array part 112 can be a pixel layer, a pixel array layer, a display layer, or a display part, but embodiments of the present disclosure are not limited thereto.

The encapsulation member 113 can be configured to cover the pixel array part 112. For example, the encapsulation member 113 can be configured to surround the pixel array part 112 and can be configured to prevent oxygen or water from penetrating into the light emitting device of the pixel array part 112. For example, the encapsulation member 113 can be disposed (or configured) to cover the pixel array part 112 at the other portion (or a display part) of the base member 111 other than one periphery portion of the base member 111. For example, the encapsulation member 113 can have a size smaller than the base member 111, or can have a size greater than the pixel array part 112 and smaller than the base member 111. For example, the encapsulation member 113 can include at least one inorganic material layer or can include a metal material. For example, the encapsulation member 113 can be a plate member, an encapsulation plate, a back plate, a metal plate, but embodiments of the present disclosure are not limited thereto.

The apparatus 10 according to an embodiment of the present disclosure can further include a driving circuit part (or a panel driving circuit part) 150.

The driving circuit part 150 can be configured at a rear surface of the display panel 110 (or vibration member 100). The driving circuit part 150 can be configured to be electrically connected to the display panel 110 (or vibration member 100). The driving circuit part 150 can be disposed (or configured) at the second surface 100*b* of the vibration member 100 or the rear surface of the display panel 110 and can be configured to be electrically connected to a pad part 115 at the display panel 110 (or vibration member 100). For example, the rear surface of the display panel 110 can be the second surface 100*b* of the vibration member 100.

The pad part 115 can be disposed at one side of the display panel 110. For example, the pad part 115 can be disposed at one periphery portion of the display panel 110. For example, the pad part 115 can include a plurality of pads which are electrically connected to signal lines configured at the display panel 110. The plurality of pads can be electrically connected to the driving circuit part 150. For example, the signal lines can be configured to be electrically connected to the pixel circuit configured at each of the plurality of pixels.

The driving circuit part 150 according to an embodiment of the present disclosure can include a plurality of flexible films 151, a plurality of data driving integrated circuits (ICs) 153, one or more printed circuit boards (PCBs) 155, and a control board 157.

Each of the plurality of flexible films 151 can be attached at the pad part 115 of the display panel 110 by a film attachment process. Each of the plurality of flexible films 151 can be disposed at the rear surface of the display panel 110. For example, the plurality of flexible films 151 can be a chip on film, but embodiments of the present disclosure are not limited thereto.

Each of the plurality of data driving ICs 153 can be individually mounted on a corresponding flexible film 151 of the plurality of flexible films 151. Each of the plurality of data driving ICs 153 can receive a timing control signal and pixel data provided from the control board 157, convert the pixel data into an analog pixel-based data signal based on the timing control signal, and output the pixel-based data signal. The pixel-based data signal can be supplied to the signal line (for example, a data line) configured at the pixel array part 112 through the flexible film 151 and the pad part 115.

The one or more PCBs 155 can be connected to the plurality of flexible films 151 and can be disposed at the second surface 100*b* of the vibration member 100 or at the rear surface of the display panel 110. For example, the one or more PCBs 155 can be disposed (or fixed) at one rear periphery portion of the vibration member 100 (or display panel 110). The one or more PCBs 155 can be configured to transfer a signal and power between elements of the driving circuit part 150. For example, the one or more PCBs 155 can be disposed (or fixed) at one rear periphery portion of the base member 111 of the display panel 110. For example, the one or more PCBs 155 can be connected (or attached) to the one rear periphery portion of the base member 111 of the display panel 110 by a buffer member. The buffer member can include a material for blocking or minimizing the transfer of a vibration of the vibration member 100 or the display panel 110 to the one or more PCBs 155. For example, the buffer member can be a double-sided tape or a double-sided cushion tape, but embodiments of the present disclosure are not limited thereto.

The control board 157 can be disposed (or fixed) at the rear surface of the vibration member 100 (or display panel 110) and can be connected to the one or more PCBs 155 through a signal transfer member 156. The control board 157 can be connected to a host system (or a display driving system). The control board 157 can be configured to provide the pixel data and the timing control signal based on a timing synchronization signal and image data supplied from the host system, to the plurality of data driving ICs 153 through the signal transfer member 156, the one or more PCBs 155, and the plurality of flexible films 151.

The vibration apparatus 300 can be configured to vibrate the vibration member 100 (or display panel 110). The vibration apparatus 300 can be configured at (or disposed at) or connected to the second surface 100*b* of the vibration member 100. For example, the vibration apparatus 300 can be configured at (or disposed at) or connected to the rear surface of the display panel 110. For example, the vibration apparatus 300 can be configured at (or disposed at) or connected to the encapsulation member 113 of the display panel 110. For example, the vibration apparatus 300 can be configured at (or disposed at) or connected to a rear surface of the encapsulation member 113 of the display panel 110, but embodiments of the present disclosure are not limited thereto. For example, the rear surface of the encapsulation member 113 can be the second surface 100*b* of the vibration member 100.

The vibration apparatus 300 can be configured to vibrate (or displace or drive) based on a driving signal (or an electrical signal or a voice signal) applied through a signal cable (or signal line) 350 to vibrate (or displace) the vibration member 100 (or display panel 110). The vibration apparatus 300 can vibrate the vibration member 100 (or display panel 110) to output a first sound S1 or a first haptic feedback in a forward direction (or first sound output direction) SOD1 of the vibration member 100. For example, the vibration apparatus 300 can directly vibrate the vibration member 100 (or display panel 110) to output the first sound S1 or the first haptic feedback in the forward direction (or first sound output direction) SOD1 of the vibration member 100. For example, the vibration apparatus 300 can be a vibration generating part, an active vibration member, a vibration generator, a vibration structure, a vibrator, a vibration generating device, a sound generator, a sound device, a sound generating structure, or a sound generating device, but embodiments of the present disclosure are not limited thereto.

The vibration apparatus 300 according to an embodiment of the present disclosure can include a piezoelectric material or an electroactive material which have a piezoelectric characteristic. For example, the vibration apparatus 300 can be a film type vibration apparatus (or a piezoelectric vibration apparatus) including a piezoelectric material. The vibration apparatus 300 can autonomously vibrate (or displace) based on a vibration (or displacement or driving) of the piezoelectric material based on a driving signal applied to the piezoelectric material, or can vibrate (or displace or drive) the vibration member 100 or the like. The vibration apparatus 300 can alternately repeat contraction and/or expansion based on a piezoelectric effect (or a piezoelectric characteristic) to vibrate (or displace or drive). For example, the vibration apparatus 300 can vibrate (or displace or drive) in a vertical direction (or a thickness direction) Z as contraction and/or expansion are alternately repeated by an inverse piezoelectric effect.

According to an embodiment of the present disclosure, the vibration apparatus 300 can be configured as a film-type vibration apparatus including a piezoelectric material, and thus, can have a vibration width (or displacement width or driving width) which is relatively smaller than a vibration apparatus based on a coil type. Therefore, in the apparatus 10 according to an embodiment of the present disclosure, a sound characteristic and/or a sound pressure level characteristic of a middle-high-pitched sound band of a sound generated by a vibration of a vibration member 100 based on a vibration (or displacement or driving) of the vibration apparatus 300 can be enhanced. Further, the apparatus 10 according to an embodiment of the present disclosure can include a film-type vibration apparatus including a piezoelectric material, and thus, can have low power consumption and can output a sound having a middle-high-pitched sound band and a wide orientation, thereby implementing an immersive sound. Further, because the apparatus 10 according to an embodiment of the present disclosure includes the film-type vibration apparatus including the piezoelectric material, the apparatus 10 can be embedded and can be applied to various sound bars or displays or the like such as a bendable apparatus or a curved apparatus which can reproduce a high sound and/or can be improved in orientation. For example, the middle-pitched sound band can be 300 Hz or 500 Hz or more and 3 kHz or less, and the middle-high-pitched sound band can be 3 kHz or more, but embodiments of the present disclosure are not limited thereto.

The vibration apparatus 300 according to an embodiment of the present disclosure can have a rectangular shape including a long-side and a short-side. For example, the vibration apparatus 300 can include a rectangular shape which has a first length (or short-side) parallel to the first direction X and a second length (or long-side) parallel to the second direction Y. For example, the vibration apparatus 300 can include a rectangular shape which has where the second length (or a long-side length) is greater than the first length (or a short-side length). For example, the vibration apparatus 300 can include a rectangular shape which has where the second length is twice (or two times) the first length, but embodiments of the present disclosure are not limited thereto. The long-side LS of the vibration apparatus 300 can be parallel to the short-side of the vibration member 100, and the short-side SS of the vibration apparatus 300 can be parallel to the long-side of the vibration member 100. For example, a long-side length direction of the vibration apparatus 300 can be parallel to the second direction Y or a short-side length direction (or a vertical direction) of the vibration member 100. For example, the vibration apparatus 300 can have a vertical arrangement structure.

With reference to FIGS. 2, 4, and 5, the vibration apparatus 300 according to an embodiment of the present disclosure can be connected to or coupled to the vibration member 100 (or display panel 110) by a connection member 400. For example, the vibration apparatus 300 can be connected to or supported by the second surface 100*b* of the vibration member 100 by the connection member 400. For example, the vibration apparatus 300 can be connected to or supported by the rear surface of the display panel 110 by the connection member 400. For example, the connection member 400 can be a first connection member, an adhesive member, or a first adhesive member, but embodiments of the present disclosure are not limited thereto. In the following description, the vibration member 100 can be the display panel 110.

The connection member 400 can be disposed between the vibration apparatus 300 and the vibration member 100 and can connect or couple the vibration apparatus 300 to the vibration member 100. For example, the vibration apparatus 300 can be connected or coupled to the second surface 100*b* of the vibration member 100 by the connection member 400, and thus, the vibration apparatus 300 can be supported by or disposed at the second surface 100*b* of the vibration member 100.

The connection member 400 according to an embodiment of the present disclosure can include an adhesive layer (or a tacky layer) which is good in attaching force or adhesive force. For example, the connection member 400 can be configured as a material including an adhesive layer which is good in attaching force or adhesive force, with respect to each of the vibration apparatus 300 and the second surface 100*b* of the vibration member 100. For example, the connection member 400 can include a foam pad, a double-sided tape, a double-sided foam pad, a double-sided foam tape, an adhesive, a double-sided adhesive tape, a double-sided adhesive foam pad, or a tacky sheet, or the like, but embodiments of the present disclosure are not limited thereto. For example, when the connection member 400 includes the adhesive layer (or the tacky layer), the connection member 400 can include only an adhesive layer or a tacky layer without a base member such as a plastic material or the like.

The adhesive layer (or a tacky layer) of the connection member 400 according to an embodiment of the present disclosure can include epoxy, acrylic, silicone, or urethane, but embodiments of the present disclosure are not limited thereto. The adhesive layer (or a tacky layer) of the connection member 400 according to another embodiment of the present disclosure can include a pressure sensitive adhesive (PSA), an optically cleared adhesive (OCA), or an optically cleared resin (OCR), but embodiments of the present disclosure are not limited thereto. For example, the adhesive layer (or a tacky layer) of the connection member 400 can include an acrylic-based a substance (or a material) having a characteristic where an adhesive force is relatively better and hardness is higher than the urethane material. Accordingly, a vibration of the vibration apparatus 300 can be efficiently transferred to the vibration member 100.

The connection member 400 according to another embodiment of the present disclosure can include one or more of a thermo-curable adhesive, a photo-curable adhesive, and a thermosetting adhesive (or a thermal bonding adhesive). For example, the connection member 400 can include the thermosetting adhesive. The thermosetting adhesive can be a heat-active type or a thermo-curable type. For example, the connection member 400 including the thermosetting adhesive can attach or couple the vibration apparatus 300 and the vibration member 110 by heat and pressure.

In the apparatus 10 according to an embodiment of the present disclosure, the vibration member 100 can include a first region A1 and a second region A2. For example, the second surface 100*b* of the vibration member 100 can include a first region (or a first rear region) A1 and a second region (or a second rear region) A2. For example, the first region A1 can be a left rear region (or right rear region), and the second region A2 can be the right rear region (or left rear region). For example, the first region A1 can include a first display region, and the second region A2 can include a second display region. For example, the first region A1 can include a left display region (or right display region), and the second region A2 can include the right display region (or left display region). The first region A1 and the second region A2 can be a left-right symmetrical with respect to a center line CL of the vibration member 100 based on the first direction X, but embodiments of the present disclosure are not limited thereto, and the first region A1 and the second region A2 can be a left-right asymmetrical.

With reference to FIGS. 2 to 5, the apparatus 10 or the vibration apparatus 300 according to an embodiment of the present disclosure can include a first vibration apparatus 300-1 and a second vibration apparatus 300-2.

The first vibration apparatus 300-1 can be configured to vibrate the first region A1 of the vibration member 100. The first vibration apparatus 300-1 can be disposed at the first region A1 of the vibration member 100. The first vibration apparatus 300-1 can be connected to or coupled to the first region A1 of the vibration member 100 by the connection member 400, and thus, the first vibration apparatus 300-1 can be disposed at or supported by the first region A1 of the vibration member 100. The first vibration apparatus 300-1 can be connected to or supported by the second surface 100*b* of the vibration member 100 overlapping the first region A1 of the vibration member 100 by the connection member 400. The first vibration apparatus 300-1 can vibrate the first region A1 of the vibration member 100, and thus, the first vibration apparatus 300-1 can generate a first sound S1 or a first haptic feedback in the first region A1 of the vibration member 100. For example, the first vibration apparatus 300-1 can directly vibrate the first region A1 of the vibration member 100, and thus, the first vibration apparatus 300-1 can generate the first sound S1 or the first haptic feedback in the first region A1 of the vibration member 100. For example, the first sound S1 can be a left sound (or a right sound).

The second vibration apparatus 300-2 can be configured to vibrate the second region A2 of the vibration member 100. The second vibration apparatus 300-2 can be disposed at the second region A2 of the vibration member 100. The second vibration apparatus 300-2 can be connected to or coupled to the second region A2 of the vibration member 100 by the connection member 400, and thus, the second vibration apparatus 300-2 can be disposed at or supported by the second region A2 of the vibration member 100. The second vibration apparatus 300-2 can be connected to or supported by the second surface 100*b* of the vibration member 100 overlapping the second region A2 of the vibration member 100 by the connection member 400. The second vibration apparatus 300-2 can vibrate the second region A2 of the vibration member 100, and thus, the second vibration apparatus 300-2 can generate a second sound S2 or a second haptic feedback in the second region A2 of the vibration member 100. For example, the second vibration apparatus 300-2 can directly vibrate the second region A2 of the vibration member 100, and thus, the second vibration apparatus 300-2 can generate the second sound S2 or the second haptic feedback in the second region A2 of the vibration member 100. For example, the second sound S2 can be the right sound (or the left sound).

The rear cover 500 can be configured or disposed at the rear surface of the vibration member 100. For example, the rear cover 500 can be configured or disposed at the second surface 100*b* of the vibration member 100. The rear cover 500 can be configured to cover or surround the second surface 100*b* of the vibration member 100. The rear cover 500 can be configured to cover or surround the second surface 100*b* and lateral surfaces 100*c* of the vibration member 100. The rear cover 500 can be configured or disposed to be spaced apart from the second surface 100*b* of the vibration member 100. For example, the rear cover 500 can be disposed to face the second surface 100*b* of the vibration member 100 with a gap space 10*s* therebetween. For example, the rear cover 500 can be spaced apart from the second surface 100*b* of the vibration member 100 with the gap space 10*s* therebetween. For example, the rear cover 500 can be a rear structure, a supporting member, a case, an outer case, a case member, a housing, a housing member, a cabinet, a sealing member, or a sealing box, or the like, but embodiments of the present disclosure are not limited thereto. For example, the gap space 10*s* can be a first space, an air gap, an air space, a vibration space, a sound space, a sound box, or a sealing space, or the like, but embodiments of the present disclosure are not limited thereto.

The rear cover 500 can be configured to cover the vibration apparatus 300. The rear cover 500 can be spaced apart from a rear surface of the vibration apparatus 300. For example, the rear cover 500 can be configured to cover the first vibration apparatus 300-1 and the second vibration apparatus 300-2 of the vibration apparatus 300. For example, the rear cover 500 can be spaced apart from a rear surface of each of the first vibration apparatus 300-1 and the second vibration apparatus 300-2 of the vibration apparatus 300. For example, the rear cover 500 can be configured to cover the second surface 100*b* of the vibration member 100 and the rear surface of the vibration apparatus 300. For example, the rear cover 500 can be configured to cover the second surface 100*b* of the vibration member 100 and the rear surface of each of the first vibration apparatus 300-1 and the second vibration apparatus 300-2 of the vibration apparatus 300.

The apparatus according to one or more embodiments of the present disclosure can have an improved design and realize a clean back design, as the vibration apparatus 300 can be covered by the rear cover 500 or embedded (or built-in) between the vibration member 100 and the rear cover 500.

The rear cover 500 according to an embodiment of the present disclosure can include one or more of a metal material and a nonmetal material (or a composite nonmetal material), but embodiments of the present disclosure are not limited thereto. For example, the rear cover 500 can include one or more materials of a metal material, plastic, and wood, but embodiments of the present disclosure are not limited thereto. For example, the connector 400 can configure as a metal material such as aluminum (Al) material or a plastic material such as plastic or styrene material, but embodiments of the present disclosure are not limited thereto.

The apparatus 10 according to an embodiment of the present disclosure can further include a connection member 200.

The connection member 200 can be configured (or disposed) between the vibration member 100 and the rear cover 500. The connection member 200 can be configured to space apart the rear cover 500 apart from the rear surface of the vibration member 100. The connection member 200 can be configured between the vibration member 100 and the rear cover 500 to provide the gap space 10*s*.

The rear cover 500 can be coupled or connected to the vibration member 100 by the connection member 200. The rear cover 500 can be connected or coupled to the second surface 100*b* of the vibration member 100 by the connection member 200. The rear cover 500 can be connected or coupled to a periphery portion of the vibration member 100 by the connection member 200. For example, the rear cover 500 can be connected or coupled to a periphery portion of the second surface 100*b* of the vibration member 100 by the connection member 200.

The connection member 200 can be configured to minimize or prevent the transfer of a vibration of the vibration member 100 to the rear cover 500. The connection member 200 can include a material characteristic suitable for blocking the vibration transferred from the vibration member 100 to the rear cover 500. For example, the connection member 200 can include a material having elasticity (or Young's modulus). For example, the connection member 200 can include a material having elasticity for vibration absorption (or impact absorption). The connection member 200 according to an embodiment of the present disclosure can be configured as polyurethane materials or polyolefin materials, but embodiments of the present disclosure are not limited thereto. For example, the connection member 200 can include one or more of an adhesive, a double-sided tape, a double-sided foam tape, a double-sided foam pad, and a double-sided cushion tape, but embodiments of the present disclosure are not limited thereto.

The connection member 200 according to an embodiment of the present disclosure can prevent a physical contact (or friction) between the vibration member 100 and the rear cover 500, and thus, can prevent the occurrence of noise (or a noise sound) caused by the physical contact (or friction) between the vibration member 100 and the rear cover 500. For example, the connection member 200 can be a panel connection member, a coupling member, a first connection member, a buffer member, an elastic member, a damping member, a vibration absorption member, a vibration prevention member, or a vibration blocking member, but embodiments of the present disclosure are not limited thereto.

The connection member 200 according to another embodiment of the present disclosure can be configured to minimize or prevent the transfer of a vibration of the vibration member 100 to the rear cover 500 and to decrease the reflection of a sound wave which is generated and input based on a vibration of the vibration member 100.

With reference to FIGS. 3 and 4, the connection member 200 according to an embodiment of the present disclosure can include one or more protrusion parts 200*p*. For example, the one or more protrusion parts 200*p* can be a protrusion pattern, but embodiments of the present disclosure are not limited thereto.

The one or more protrusion parts 200*p* can protrude from a lateral surface (or an inner surface) of the connection member 200. For example, the one or more protrusion parts 200*p* can protrude from the lateral surface (or inner surface) of the connection member 200 toward the gap space 10*s*. For example, the one or more protrusion parts 200*p* can protrude from the lateral surface (or inner surface) of the connection member 200 toward a lateral surface (or a sidewall) of the vibration apparatus 300.

The one or more protrusion parts 200*p* according to an embodiment of the present disclosure can have a triangular shape or a saw-toothed shape, but embodiments of the present disclosure are not limited thereto. The one or more protrusion parts 200*p* can absorb or trap a reflected wave generated through reflection by the connection member 200, and thus, can prevent or minimize a reduction in sound pressure level characteristic caused by a standing wave generated by interference of a reflected wave and a progressive wave. For example, a reflected wave reflected from the connection member 200 based on a vibration of the vibration member 100 can be dispersed or reflected by the one or more protrusion parts 200*p*, and thus, an overlap and interference phenomenon between a reflected wave and a progressive wave can be prevented or minimized, thereby preventing or minimizing the occurrence of a standing wave. Accordingly, each of a highest sound pressure level and a lowest sound pressure level generated in a reproduction frequency band of a sound generated based on a vibration of the vibration member 100 can be reduced, and thus, flatness of a sound pressure level can be enhanced.

With reference to FIGS. 2 to 4, the connection member 200 according to another embodiment of the present disclosure can include a first connection member 210 and a second connection member 220.

The first connection member 210 can be disposed between the vibration member 100 and the rear cover 500. The first connection member 210 can be disposed or coupled between a rear periphery portion of the vibration member 100 and the rear cover 500. For example, the first connection member 210 can be disposed inward (or an inner portion) of the second connection member 220. The first connection member 210 can be configured to have hardness which is smaller than the second connection member 220, for example, a modulus (or a Young's modulus). For example, the first connection member 210 can include a double-sided polyurethane tape, a double-sided polyurethane foam tape, or a double-sided sponge tape, or the like, but embodiments of the present disclosure are not limited thereto.

The first connection member 210 can include one or more protrusion parts 200*p*. For example, the one or more protrusion parts 200*p* can protrude from a side surface (or an inner surface) of the first connection member 210.

The second connection member 220 can be disposed between the vibration member 100 and the rear cover 500 to surround the first connection member 210. The second connection member 220 can be disposed or coupled between the rear periphery portion of the vibration member 100 and the rear cover 500 to surround the first connection member 210. For example, the second connection member 220 can be disposed outward (or an outer portion) from the first connection member 210 and can be surrounded by the rear cover 500. The second connection member 220 can be configured to have hardness, which is greater than the first connection member 210, for example, a modulus (or a Young's modulus). For example, the second connection member 220 can include a double-sided polyolefin tape, a double-sided polyolefin foam tape, a double-sided acrylic tape, a double-sided acrylic foam tape, or the like, but embodiments of the present disclosure are not limited thereto.

The connection member 200 according to another embodiment of the present disclosure can absorb a sound which is generated and input based on a vibration of the vibration member 100 by the first connection member 210 which is relatively soft and is disposed inward from the second connection member 220 which is relatively harder, and thus, a reflected sound (or a reflected wave) generated by being reflected from the connection member 200 can be more minimized. Accordingly, each of a highest sound pressure level and a lowest sound pressure level generated in a reproduction frequency band of a sound generated based on a vibration of the vibration member 100 can be reduced, and thus, flatness of a sound pressure level can be more enhanced.

With reference to FIGS. 2 to 4, the rear cover 500 according to an embodiment of the present disclosure can include a first rear cover 510 and a second rear cover 520.

The first rear cover 510 can be disposed in parallel with the vibration member 100. The first rear cover 510 can be disposed to face the second surface 100*b* of the vibration member 100. The first rear cover 510 can be disposed to cover the second surface 100*b* of the vibration member 100. The first rear cover 510 can be spaced apart from the second surface 100*b* of the vibration member 100. For example, the first rear cover 510 can be spaced apart from the second surface 100*b* of the vibration member 100 with the gap space 10*s* therebetween.

The first rear cover 510 can be configured to cover the vibration apparatus 300. The first rear cover 510 can be spaced apart from the vibration apparatus 300. For example, the first rear cover 510 can be configured to cover the first vibration apparatus 300-1 and the second vibration apparatus 300-2. For example, the first rear cover 510 can be spaced apart from the rear surface of each of the first vibration apparatus 300-1 and the second vibration apparatus 300-2.

The first rear cover 510 according to an embodiment of the present disclosure can include a plate shape or a flat plate shape. For example, the first rear cover 510 can be an inner cover, an inner plate, a first rear plate, a first supporting plate, a housing plate, or a first supporting member, or the like, but embodiments of the present disclosure are not limited thereto.

The second rear cover 520 can be disposed to face the first rear cover 520. The second rear cover 520 can be configured or disposed at a rear surface of the first rear cover 510. The second rear cover 520 can be disposed to cover the rear surface of the first rear cover 510. The second rear cover 520 can be spaced apart from the rear surface of the first rear cover 510. For example, the second rear cover 520 can be spaced apart from the rear surface of the first rear cover 510 with an air gap 500*s* therebetween. For example, the second rear cover 520 can be an outer cover, an outer plate, a second rear plate, a rearmost cover, a set cover, or a second supporting member, or the like, but embodiments of the present disclosure are not limited thereto.

The first rear cover 510 and the second rear cover 520 according to an embodiment of the present disclosure can be connected (or coupled) to each other. The second rear cover 520 can be connected (or coupled) to the first rear cover 510 by a coupling member 530. For example, the second rear cover 520 can be partially connected (or coupled) to the first rear cover 510 by the coupling member 530.

The coupling member 530 can be disposed (or interposed) between the first rear cover 510 and the second rear cover 520. For example, the coupling member 530 can be disposed (or interposed) between a periphery portion of the first rear cover 510 and a periphery portion of the second rear cover 520. For example, the coupling member 530 can be disposed (or interposed) between a rear periphery portion of the first rear cover 510 and a front periphery portion of the second rear cover 520. For example, the coupling member 530 can be a connection member, a plate connection member, a second connection member, a cover connection member, a cover coupling member, or an adhesive member, but embodiments of the present disclosure are not limited thereto.

The coupling member 530 can be partially disposed (or interposed) between a middle portion of the first rear cover 510 other than the periphery portion of the first rear cover 510 and a middle portion of the second rear cover 520 other than the periphery portion of the second rear cover 520. Accordingly, the coupling member 530 can prevent a physical contact (or friction) between the middle portion of the first rear cover 510 and the middle portion of the second rear cover 520, and thus, can prevent the occurrence of noise (or a noise sound) caused by the physical contact (or friction) between the first rear cover 510 and the second rear cover 520.

The apparatus 10 or the rear cover 500 according to another embodiment of the present disclosure can further include a connection frame 540.

The connection frame 540 can be configured to cover or surround the lateral surface 100*c* of the vibration member 100 and lateral surfaces of the rear cover 500. The connection frame 540 can be configured to surround lateral surfaces of the first rear cover 510, lateral surfaces of the second rear cover 520, and the lateral surfaces 100*c* of the vibration member 100, respectively. The connection frame 540 can be configured to provide the air gap 500*s* between the first rear cover 510 and the second rear cover 520. For example, the connection frame 540 can be configured to provide the air gap 500*s* between the first rear cover 510 and the second rear cover 520, and configured to cover or surround the lateral surfaces of the rear cover 500 and the lateral surfaces 100*c* of the vibration member 100. For example, the connection frame 540 can be accommodated (or inserted) between the first rear cover 510 and the second rear cover 520, and can be configured to surround each of the lateral surfaces of the first rear cover 510, the lateral surfaces of the second rear cover 520, and the lateral surfaces 100*c* of the vibration member 100. The connection frame 540 can be connected to each of the first rear cover 510 and the second rear cover 520 by the coupling member 530. For example, the connection frame 540 can be a middle cabinet, a supporting frame, a cover frame, a side cover frame, a sidewall cover frame, a side cover, or a sidewall cover, but embodiments of the present disclosure are not limited thereto.

The air gap 500*s* between the first rear cover 510 and the second rear cover 520 can be surrounded by the first rear cover 510, the second rear cover 520, and the connection frame 540. For example, the air gap 500*s* can be a second space, a gap space, a second gap space, an air space, a sound space, a sound box, or a sealing space, or the like, but embodiments of the present disclosure are not limited thereto.

The connection frame 540 according to an embodiment of the present disclosure can further include a first frame part 541 and a second frame part 542.

The first frame part 541 can be configured to be accommodated (or inserted) between the first rear cover 510 and the second rear cover 520. The first frame part 541 can be accommodated (or inserted) between the first rear cover 510 and the second rear cover 520 to overlap the periphery portion of each of the first rear cover 510 and the second rear cover 520. The first frame part 541 can be disposed (or interposed) between the rear periphery portion of the first rear cover 510 and the front periphery portion of the second rear cover 520. For example, the first frame part 541 can be connected (or coupled) to the rear periphery portion of the first rear cover 510 and the front periphery portion of the second rear cover 520. For example, the first frame part 541 can be accommodated (or inserted) between the first rear cover 510 and the second rear cover 520, and thus, the air gap 500*s* can be provided (or formed) between the first rear cover 510 and the second rear cover 520. The air gap 500*s* can be surrounded by the first rear cover 510, the second rear cover 520, and the first frame part 541.

The first frame part 541 according to an embodiment of the present disclosure can have a tetragonal band (or belt or frame) shape including an opening portion. The opening portion of the first frame part 541 can overlap with the middle portion of the first rear cover 510 other than the rear periphery portion of the first rear cover 510. For example, the first frame part 541 can be a first connection frame, a first supporting part, or a first supporting frame, but embodiments of the present disclosure are not limited thereto.

The second frame part 542 can be connected to a lateral surface of the first frame part 541. For example, the second frame part 542 can be connected to an outer side surface of the first frame part 541. The second frame part 542 can be connected to the outer side surface of the first frame part 541 to surround or cover each of the lateral surfaces 100*c* of the vibration member 100, the lateral surfaces of the first rear cover 510, and the lateral surfaces of the second rear cover 520. The second frame part 542 can be integrated into the first rear cover 510. For example, the first frame part 510 and the second frame part 520 can be integrated (or configured) as one body (or a single body). For example, the connection frame 540 can have a cross-sectional structure having a "├"-shape or a "┤"-shape based on a coupling structure of the first frame part 510 and the second frame part 520, but embodiments of the present disclosure are not limited thereto. For example, the second frame part 542 can be a second connection frame, a second supporting part, a second supporting frame, or a sidewall frame, but embodiments of the present disclosure are not limited thereto.

The first frame part 541 can be connected to each of the first rear cover 510 and the second rear cover 520 by the coupling member 530. The coupling member 530 according to an embodiment of the present disclosure can include a first coupling member 531 and a second coupling member 532.

The first coupling member 531 can be configured to connect (or couple) the first rear cover 510 and the connection frame 540. The first coupling member 531 can be disposed (or configured) between the first rear cover 510 and the first frame part 541 of the connection frame 540. The second coupling member 532 can be configured to connect (or couple) the second rear cover 520 and the connection frame 540. The second coupling member 532 can be disposed (or configured) between the second rear cover 520 and the first frame portion 541 of the connection frame 540.

For example, the first coupling member 531 can be a first cover coupling member, a first connection member, or a panel connection member, but embodiments of the present disclosure are not limited thereto. For example, the second coupling member 532 can be a second cover coupling member, a second cover connection member, or a plate connection member, but embodiments of the present disclosure are not limited thereto.

Each of the first coupling member 531 and the second coupling member 532 can include a material having elasticity for vibration absorption (or impact absorption). For example, each of the first coupling member 531 and the second coupling member 532 can be configured as polyurethane materials or polyolefin materials, but embodiments of the present disclosure are not limited thereto. For example, each of the first coupling member 531 and the second coupling member 532 can include one or more of a double-sided tape, a double-sided foam tape, and a double-sided cushion tape, but embodiments of the present disclosure are not limited thereto.

The apparatus 10 or the rear cover 500 according to an embodiment of the present disclosure can further include a hole part 550.

The hole part 550 can be configured for decreasing an internal air pressure of the apparatus 10. For example, the hole part 550 can be configured for reducing an air pressure of an internal space of the apparatus 10 or an air pressure of the gap space 10*s* provided between the vibration member 100 and the rear cover 500. For example, the hole part 550 can be configured to tune a sound characteristic in a middle-low-pitched sound band.

The hole part 550 can be configured at the rear cover 500. The hole part 550 can be configured at a certain region or a partial region of the rear cover 500. The hole part 550 can be formed to pass through or vertically pass through the rear cover 500. Therefore, the internal space of the apparatus 10 or the gap space 10*s* provided between the vibration member 100 and the rear cover 500 can be connected to (or communicated with) a rear space of the rear cover 500 (or the external space of the apparatus 10) through the hole part 550, and thus, an air pressure of the internal space of the apparatus 10 or an air pressure of the gap space 10*s* provided between the vibration member 100 and the rear cover 500 can be reduced. For example, the gap space 10*s* which is provided to be surrounded between the vibration member 100 and the rear cover 500 by the connection member 1200 can be connected to (or communicated with) the rear space of the rear cover 500 (or the external space of the apparatus 10) through the hole part 550.

The hole part 550 can each be a path through which a sound generated based on a vibration of the vibration member 100 (or vibration apparatus 300) is output in a rearward direction (or a second sound output direction) SOD2 of the apparatus 10 or the rear cover 500. The sound generated based on the vibration of the vibration member 100 (or the vibration apparatus 300) can be output in the forward direction SOD1 of the vibration member 100 and can be output in a rearward direction SOD2 of the apparatus 10 or the rear cover 500 through the hole part 550. For example, a sound output in the forward direction SOD1 of the vibration member 100 can be a first sound (or a forward sound or a front output sound) S1. For example, a sound output in the rearward direction SOD2 of the apparatus 10 or the rear cover 500 can be a second sound (or a rearward sound or a rear output sound) S2. Accordingly, the apparatus 10 according to an embodiment of the present disclosure can output the sounds S1 and S2 in each of the forward direction SOD1 and the rearward direction SOD2. For example, the hole part 550 can be a vent part, a vent hole part, a sound hole part, a rear sound hole part, a rear sound output part, a hole arrangement part, a hole pattern part, an air duct part, an air entrance part, an air inlet and outlet part, an air discharge part, or an air pressure control part, but embodiments of the present disclosure are not limited thereto.

According to an embodiment of the present disclosure, the hole part 550 can communicate (or connect) the internal space (or gap space 10*s*) of the apparatus 10 with an external space to reduce an air pressure of the internal space (or gap space 10*s*), and thus, the hole part 550 can expand a band of a low-pitched sound band of a sound generated based on a vibration of the vibration member 100, thereby improving a sound characteristic and/or a sound pressure level characteristic of the low-pitched sound band. For example, an air pressure (or pressure) of the internal space (or gap space 10*s*) of the apparatus 10 can be reduced by the hole part 550, and thus, the amount of displacement (or a bending force) of the vibration member 100 or the vibration apparatus 300 can increase, and thus, a band of the low-pitched sound band can be expanded, thereby enhancing a sound characteristic and/or a sound pressure level characteristic of the low-pitched sound band. For example, the low-pitched sound band can be 300 Hz or less or 500 Hz or less, but embodiments of the present disclosure are not limited thereto.

According to another embodiment of the present disclosure, in an apparatus in which the hole part 550 is not configured at the rear cover 500 and has an internal space (or a gap space 10*s*), a largest variation of pressure can occur in the internal space (or gap space 10*s*) where a volume variation is largest, based on a vibration of the vibration member 100 (or the vibration apparatus 300), and thus, the amount of displacement (or a bending force) of the vibration member 100 (or the vibration apparatus 300) can decrease, whereby a sound characteristic and/or a sound pressure level characteristic of the low-pitched sound band can decrease or be reduced. The internal space (or gap space 10*s*) in which the hole part 550 is not configured at the rear cover 500 can be a closed internal space (or gap space 10*s*). For example, in the apparatus including the closed internal space (or gap space 10*s*), a pressure (or an air pressure) of the internal space (or gap space 10*s*) can increase based on a sound wave or a sound generated by a vibration of the vibration member 100 (or the vibration apparatus 300), and thus, the amount of displacement (or a bending force) of the vibration member 100 (or the vibration apparatus 300) can decrease, whereby a sound characteristic and/or a sound pressure level characteristic of the low-pitched sound band can decrease or be reduced.

The hole part 550 can be configured at the rear cover 500 to overlap the vibration apparatus 300. The hole part 550 can be configured at a region that overlaps the vibration apparatus 300 of a region of the rear cover 500, but embodiments of the present disclosure are not limited thereto. For example, the hole part 550 can be further configured at a region that overlaps a periphery region of the vibration apparatus 300 of the region of the rear cover 500. The vibration apparatus 300 can overlap a portion of the hole part 550. The portion of the hole part 550 can overlap the vibration apparatus 300, and the other portion (or a remaining portion) of the hole part 550 can overlap the vibration member 100 disposed at a periphery of the vibration apparatus 300. For example, a size of the hole part 550 can be greater than a size of the vibration apparatus 300. The hole part 550 can be formed to pass through or vertically pass through the rear cover 500 along a thickness direction of the rear cover 500 or a third direction Z (or a Z-axis direction).

The hole part 550 can be configured at the first rear cover 510 and the second rear cover 520 of the rear cover 500 to overlap the vibration apparatus 300. The hole part 550 can be formed to pass through or vertically pass through each of the first rear cover 510 and the second rear cover 520 along the thickness direction of the rear cover 500 or the third direction Z (or Z-axis direction). For example, the hole part 550 can include a plurality of hole configured at the rear cover 500. For example, the hole part 550 can include a plurality of hole configured at each of the first rear cover 510 and the second rear cover 520 of the rear cover 500.

The hole part 550 according to an embodiment of the present disclosure can include a first hole part 551 and a second hole part 552.

The first hole part 551 and the second hole part 552 can overlap with each other. For example, the gap space 10*s* can be connected to (or communicated with) the rear space of the rear cover 500 (or the external space of the apparatus 10) through the first hole part 551 and the second hole part 552. The first hole part 551 and the second hole part 552 can be configured to overlap with the air gap 500*s* therebetween. For example, the air gap 500*s* can be connected to (or communicated with) the gap space 10*s* through the first hole part 551, and can be connected to (or communicated with) the rear space of the rear cover 500 (or the external space of the apparatus 10) through the second hole part 552. For example, the gap space 10*s* can be connected to (or communicated with) the rear space of the rear cover 500 (or the external space of the apparatus 10) through the first hole part 551, the air gap 500*s*, and the second hole part 552.

The first hole part 551 can be configured at the first rear cover 510 to overlap the vibration apparatus 300. The vibration apparatus 300 can overlap a portion of the first hole part 551. The portion of the first hole part 551 can overlap the vibration apparatus 300, and the other portion (or remaining portion) of the first hole part 551 can overlap the vibration member 100 at the periphery of the vibration apparatus 300. For example, a size of the first hole part 551 can be greater than a size of the vibration apparatus 300. For example, the first hole part 551 can be an upper hole part, an inner hole part, a first vent hole part, a first sound hole part, or a first rear sound output part, but embodiments of the present disclosure are not limited thereto.

The first hole part 551 can connect (or communicate) the gap space 10*s* and the air gap 500*s* of the rear cover 500. For example, the gap space 10*s* can be connected to (or communicated with) the air gap 500*s* through the first hole part 551.

The first hole part 551 can include a plurality of first holes 551*h*. The plurality of first holes 551*h* can overlap the vibration apparatus 300. For example, some of the plurality of first holes 551*h* can overlap the vibration apparatus 300, and the other (or remaining) of the plurality of first holes 551*h* can overlap the vibration member 100 at the periphery of the vibration apparatus 300. Each of the plurality of first holes 551*h* can be formed to pass through or vertically pass through the first rear cover 510 along the third direction Z (or Z-axis direction) or a thickness direction of the first rear cover 510. Accordingly, the gap space 10*s* can be connected to (or communicated with) the air gap 500*s* through the plurality of first holes 551*h*. Thus, the sound (or second sound S2) generated based on the vibration of the vibration member 100 (or the vibration apparatus 300) can be output in the air gap 500*s* through the first hole part 551 or the plurality of first holes 551*h*. For example, the plurality of first holes 551*h* can have a circular shape with a diameter of 1.5 mm to 3 mm, but embodiments of the present disclosure are not limited thereto. For example, the plurality of first holes 551*h* can be first vent holes or first sound holes, or the like, but embodiments of the present disclosure are not limited thereto.

The first hole part 551 according to an embodiment of the present disclosure can include a first hole region 551*a* and a second hole region 551*b*.

The first hole region (or a first upper hole part) 551*a* can be configured at the first rear cover 510 to overlap the first vibration apparatus 300-1 of the vibration apparatus 300. The first hole region 551*a* can include a plurality of first holes 551*h*. The plurality of first holes 551*h* provided at the first hole region 551*a* can overlap the first vibration apparatus 300-1. For example, a size of the first hole region 551*a* can be greater than a size of the first vibration apparatus 300-1. For example, some of the plurality of first holes 551*h* provided at the first hole region 551*a* can overlap the first vibration apparatus 300-1, and the other (or remaining) of the plurality of first holes 551*h* can overlap the vibration member 100 at a periphery of the first vibration apparatus 300-1. The gap space 10*s* at a periphery of the first vibration apparatus 300-1 can be connected to (or communicated with) the air gap 500*s* through the first hole region 551*a*. Thus, the sound (or second sound S2) generated based on the vibration of the first vibration apparatus 300-1 can be output in the air gap 500*s* through the first hole region 551*a* or the plurality of first holes 551*h*.

The second hole region (or a second upper hole part) 551*b* can be configured at the first rear cover 510 to overlap the second vibration apparatus 300-2 of the vibration apparatus 300. The second hole region 551*b* can include a plurality of first holes 551*h*. The plurality of first holes 551*h* provided at the second hole region 551*b* can overlap the second vibration apparatus 300-2. For example, a size of the second hole region 551*b* can be greater than a size of the second vibration apparatus 300-2. For example, some of the plurality of first holes 551*h* provided at the second hole region 551*b* can overlap the second vibration apparatus 300-2, and the other (or remaining) of the plurality of first holes 551*h* can overlap the vibration member 100 at a periphery of the second vibration apparatus 300-2. The gap space 10*s* at a periphery of the second vibration apparatus 300-2 can be connected to (or communicated with) the air gap 500*s* through the second hole region 551*b*. Thus, the sound (or second sound S2) generated based on the vibration of the second vibration apparatus 300-2 can be output in the air gap 500*s* through the second hole region 551*b* or the plurality of first holes 551*h*.

The second hole part 552 can be configured at the second rear cover 520 to overlap the vibration apparatus 300. The second hole part 552 can be configured at the second rear cover 520 to overlap the first hole part 551. For example, the second hole part 552 can be configured at the second rear cover 520 to face the first hole part 551 with the air gap 500*s* therebetween. For example, the second hole part 552 can be disposed (or configured) between the vibration apparatus 300 and the second hole part 552. For example, the second hole part 552 can be configured to have a same size and a same structure as the first hole part 551. For example, the second hole part 552 can be a lower hole part, an outer hole part, a second vent hole part, a second sound hole part, or a second rear sound output part, but embodiments of the present disclosure are not limited thereto.

The second hole part 552 can include a plurality of second holes 552*h*. The plurality of second holes 552*h* can overlap the vibration apparatus 300. Each of the plurality of second holes 552*h* can overlap each of the plurality of first holes 551*h* configured at the first hole part 551. The plurality of second holes 552*h* can individually overlap with the plurality of first holes 551*h*. Each of the plurality of second holes 552*h* can be formed to pass through or vertically pass through the second rear cover 520 along the third direction Z (or Z-axis direction) or a thickness direction of the second rear cover 520. Accordingly, the air gap 500*s* can be connected to (or communicated with) the rear space of the rear cover 500 (or the external space of the apparatus 10) through the second hole part 552 or the plurality of second holes 552*h*. Thus, the sound (or second sound S2) generated based on the vibration of the vibration member 100 (or the vibration apparatus 300) can be output in the rear space of the rear cover 500 (or the external space of the apparatus 10) through the first hole part 551 (or the plurality of first holes 551*h*), the air gap 500*s*, and the second hole part 552 (or the plurality of second holes 552*h*). For example, the plurality of second holes 552*h* can have a circular shape with a diameter of 1.5 mm to 3 mm, but embodiments of the present disclosure are not limited thereto. For example, the plurality of second holes 552*h* can have a circular shape with the same diameter as the plurality of first holes 551*h*, but embodiments of the present disclosure are not limited thereto. For example, the plurality of second holes 552*h* can be second vent holes or second sound holes, or the like, but embodiments of the present disclosure are not limited thereto.

The second hole part 552 according to an embodiment of the present disclosure can include a first hole region 552*a* and a second hole region 552*b*.

The first hole region (or a first lower hole region or a third region) 552*a* can be configured at the second rear cover 520 to overlap the first hole region 551*a* of the first hole part 551. The first hole region 552*a* can include a plurality of second holes 552*h*. Each of the plurality of second holes 552*h* provided at the first hole region 552*a* can be configured at the second rear cover 520 to overlap each of the plurality of first holes 551*h* provided at the first hole region 551*a*. The plurality of second holes 552*h* can individually overlap with the plurality of first holes 551*h*. The air gap 500*s* can be connected to (or communicated with) the rear space of the rear cover 500 (or the external space of the apparatus 10) through the first hole region 552*a* or the plurality of second holes 552*h*. Accordingly, the gap space 10*s* at a periphery of the first vibration apparatus 300-1 can be connected to (or communicated with) the rear space of the rear cover 500 (or the external space of the apparatus 10) through the first hole region 551*a* (or the plurality of first holes 551*h*), the air gap 500*s*, and the first hole region 552*a* (or the plurality of second holes 552*h*). Thus, the sound (or second sound S2) generated based on the vibration of the first vibration apparatus 300-1 can be output in the rear space of the rear cover 500 (or the external space of the apparatus 10) through the first hole region 551*a* (or the plurality of first holes 551*h*) of the first hole part 551, the air gap 500*s*, and the first hole region 552*a* (or the plurality of second holes 552*h*) of the second hole part 552.

The second hole region (or a second lower hole region or a fourth region) 552*b* can be configured at the second rear cover 520 to overlap the second hole region 551*b* of the first hole part 551. The second hole region 552*b* can include a plurality of second holes 552*h*. Each of the plurality of second holes 552*h* provided at the second hole region 552*b* can be configured at the second rear cover 520 to overlap each of the plurality of first holes 551*h* provided at the second hole region 551*b*. The plurality of second holes 552*h* can individually overlap with the plurality of first holes 551*h*. The air gap 500*s* can be connected to (or communicated with) the rear space of the rear cover 500 (or the external space of the apparatus 10) through the second hole region 552*b* or the plurality of second holes 552*h*. Accordingly, the gap space 10*s* at a periphery of the second vibration apparatus 300-2 can be connected to (or communicated with) the rear space of the rear cover 500 (or the external space of the apparatus 10) through the second hole region 551*b* (or the plurality of first holes 551*h*), the air gap 500*s*, and the second hole region 552*b* (or the plurality of second holes 552*h*). Thus, the sound (or second sound S2) generated based on the vibration of the second vibration apparatus 300-2 can be output in the rear space of the rear cover 500 (or the external space of the apparatus 10) through the second hole region 551*b* (or the plurality of first holes 551*h*) of the first hole part 551, the air gap 500*s*, and the second hole region 552*b* (or the plurality of second holes 552*h*) of the second hole part 552.

Therefore, the apparatus 10 according to an embodiment of the present disclosure can output the sounds S1 and S2 in each of the forward direction SOD1 and the rearward direction SOD2 of the vibration member 100 (or display panel 110) by the vibration of the vibration member 100 based on the displacement (or driving or vibration) of the vibration apparatus 300.

The rear cover 500 according to an embodiment of the present disclosure can further include a cable hole 511.

The cable hole 511 can be configured at the rear cover 500 to be adjacent to the vibration apparatus 300. The cable hole 511 can be configured at the rear cover 500 to be adjacent to the hole part 550. The cable hole 511 can be formed to pass through or vertically pass through the rear cover 500. The cable hole 511 can have a size and a shape enabling a signal cable 350 of the vibration apparatus 300 to pass through. One side of the signal cable 350 can be connected to the vibration apparatus 300, and the other side of the signal cable 350 can pass through the cable hole 511, can be drawn out (or extended) to the rear surface of the rear cover 500 to be connected to a sound circuit board.

The cable hole 511 can include a first cable hole 511*a* configured at the first rear cover 510, and a second cable hole 511*b* configured at the second rear cover 520 and overlapping the first cable hole 511*a*. Accordingly, the signal cable 350 connected to the vibration apparatus 300 can pass through the first cable hole 511*a* and the second cable hole 511*b* and can be drawn out (or extended) to the rear surface of the rear cover 500.

The cable hole 511 can be a path through which a sound generated based on the vibration of the vibration member 100 (or the vibration apparatus 300) is output in the rearward direction (or the second sound output direction) SOD2 of the apparatus 10 or the rear cover 500. For example, the cable hole 511 can be a cable outlet port, a cable outlet hole, a signal line outlet port, an opening, or a duct, but embodiments of the present disclosure are not limited thereto.

With reference to FIGS. 2 and 4, the apparatus 10 according to an embodiment of the present disclosure can further include a partition member 600.

The partition member 600 can be disposed (or configured) between the vibration member 100 and the rear cover 500. The partition member 600 can be disposed (or configured) to separate the first region A1 and the second region A2 of the vibration member 100. The partition member 600 can be disposed (or configured) between the rear cover 500 and a boundary portion BP of the first region A1 and the second region A2 of the vibration member 100.

The partition member 600 can be configured to limit (or define) a vibration region of the vibration member 100 based on a vibration (or displacement or driving) of the vibration apparatus 300. For example, the partition member 600 can limit the vibration region of the vibration member 100, and thus, the partition member 600 can decrease a resonance frequency of the vibration member 100 and/or the vibration apparatus 300. For example, the vibration region of the vibration member 100 limited by the partition member 600 can act as a stiffness (or a spring constant) and a mass (or weight) for the vibration member 100 and/or the vibration apparatus 300. For example, the vibration region of the vibration member 100 limited by the partition member 600 can decrease the stiffness (or spring constant) for the vibration member 100 and/or the vibration apparatus 300 and can increase the mass (or weight) for the vibration member 100 and/or the vibration apparatus 300, and thus, a resonance frequency of the vibration member 100 and/or the vibration apparatus 300 can decrease. Therefore, a sound characteristic and/or a sound pressure level characteristic of the low-pitched sound band generated based on the vibration of the vibration member 100 can be more enhanced.

The partition member 600 can separate or can minimize or prevent mutual interference a vibration (or a sound), generated in the first region A1 of the vibration member 100, from a vibration (or a sound) generated in the second region A2 of the vibration member 100. A left sound and a right sound generated based on vibrations of the first region A1 and the second region A2 of the vibration member 100 can be separated from each other by the partition member 600, and thus, a sound output characteristic of the apparatus 10 can be more enhanced and the sounds including a 2-channel sound based on the separation of the left and right sounds can be output in the forward direction SOD1 of the vibration member 100 and the rearward direction SOD2 of the rear cover 500, respectively. For example, the partition member 600 can be a partition, a sound blocking member, a sound separation member, a space separation member, an enclosure, or a baffle, or the like, but embodiments of the present disclosure are not limited thereto.

The partition member 600 according to an embodiment of the present disclosure can include one or more protrusion parts (or second protrusion parts) 600*p*. For example, the one or more protrusion parts 600*p* can be a protrusion pattern, but embodiments of the present disclosure are not limited thereto.

The one or more protrusion parts 600*p* can protrude from a lateral surface (or an outer surface) of the partition member 600. For example, the one or more protrusion parts 600*p* can protrude from one or more of a first lateral surface (or a first sidewall) and a second lateral surface (or a second sidewall) of the partition member 600 toward a lateral surface (or a sidewall) of the vibration apparatus 300.

The one or more protrusion parts 600*p* according to an embodiment of the present disclosure can have a triangular shape or a saw-toothed shape, but embodiments of the present disclosure are not limited thereto. The one or more protrusion parts 600*p* can absorb or trap a reflected wave generated through reflection by the partition member 600, and thus, can prevent or minimize a reduction in sound pressure level characteristic caused by a standing wave generated by interference of a reflected wave and a progressive wave. For example, a reflected wave reflected from the partition member 600 based on a vibration of the vibration member 100 can be dispersed or reflected by the one or more protrusion parts 600*p*, and thus, an overlap and interference phenomenon between a reflected wave and a progressive wave can be prevented or minimized, thereby preventing or minimizing the occurrence of a standing wave. Therefore, each of a highest sound pressure level and a lowest sound pressure level generated in a reproduction frequency band of a sound generated based on the vibration of the vibration member 100 can be more reduced, and thus, flatness of a sound pressure level can be more enhanced.

With reference to FIG. 3, the apparatus 10 according to an embodiment of the present disclosure can further include a plate 180.

The plate 180 can be disposed (or attached) at the rear surface of the vibration member 100 to be adjacent to the vibration apparatus 300. The plate 180 can be disposed (or attached) at the rear surface of the vibration member 100 to overlap the cable hole 511. The plate 180 can be disposed (or attached) at the rear surface of the vibration member 100 to be spaced apart from the rear cover 500. The plate 180 can be disposed (or attached) at the rear surface of the vibration member 100 to be spaced apart from the cable hole 511. The plate 180 can be spaced apart from the vibration apparatus 300. For example, a size of the plate 180 can be greater than a size of the cable hole 511. For example, the plate 180 can cover the cable hole 511 and overlap some of the plurality of first holes 551*h* of the hole part 550. For example, the plate 180 can be disposed (or attached) at the rear surface of the vibration member 100 to overlap the signal cable 350 of the vibration apparatus 300, and can be spaced apart from the cable hole 511.

The plate 180 can be disposed (or attached) at the rear surface of the vibration member 100 to be adjacent to each of the first vibration apparatus 300-1 and the second vibration apparatus 300-2. For example, the plate 180 can be disposed (or attached) at the rear surface of the vibration member 100 to overlap the cable hole 511 adjacent to the first vibration apparatus 300-1, and can be disposed (or attached) at the rear surface of the vibration member 100 to overlap the cable hole 511 adjacent to the second vibration apparatus 300-2.

The plate 180 can be configured to dissipate or disperse heat concentrated in the cable hole 511 to the vibration member 100. For example, heat generated by the driving the vibration apparatus 300 or from the display panel 110 can be released (or dissipated) to an outside through the cable hole 511 based on an air flow, and thus, the temperature around the cable hole 511 can raise (or increase). Accordingly, a temperature in a portion of the vibration member 100 overlapping the cable hole 511 can raise (or increase) based on the temperature around the cable hole 511. For example, when the vibration member 100 includes the display panel 110, the temperature in a portion (or a local region) of the display panel 110 overlapping the cable hole 511 can raise (or increase) based on the temperature around the cable hole 511, and thus, an image quality defect of the display panel 110 can occur due to a rapid temperature difference in the portion of the display panel 110. Therefore, the plate 180 can minimize or prevent the image quality defect of the display panel 110 occurring due to the rapid temperature difference in a portion (or a local region) of the display panel 110 by diffusing (or dispersing or spreading) the heat around the cable hole 511 into a wide area of the vibration member 100.

The plate 180 can be configured as a metal material. For example, the plate 180 can be configured as a metal material with high thermal conductivity than the vibration member 100. For example, the plate 180 can be configured as a metal material with high thermal conductivity than the encapsulation member 113 of the display panel 110. For example, the plate 180 can be made of aluminum (Al), copper (Cu), or silver (Ag), and their alloys, but embodiments of the present disclosure are not limited thereto. For example, the plate 180 can be a metal plate, a metal sheet, a heat dissipation plate, a heat dissipation sheet, a heat dissipation tape, a heat diffusion sheet, or an aluminum sheet, but embodiments of the present disclosure are not limited thereto.

Figure 6:
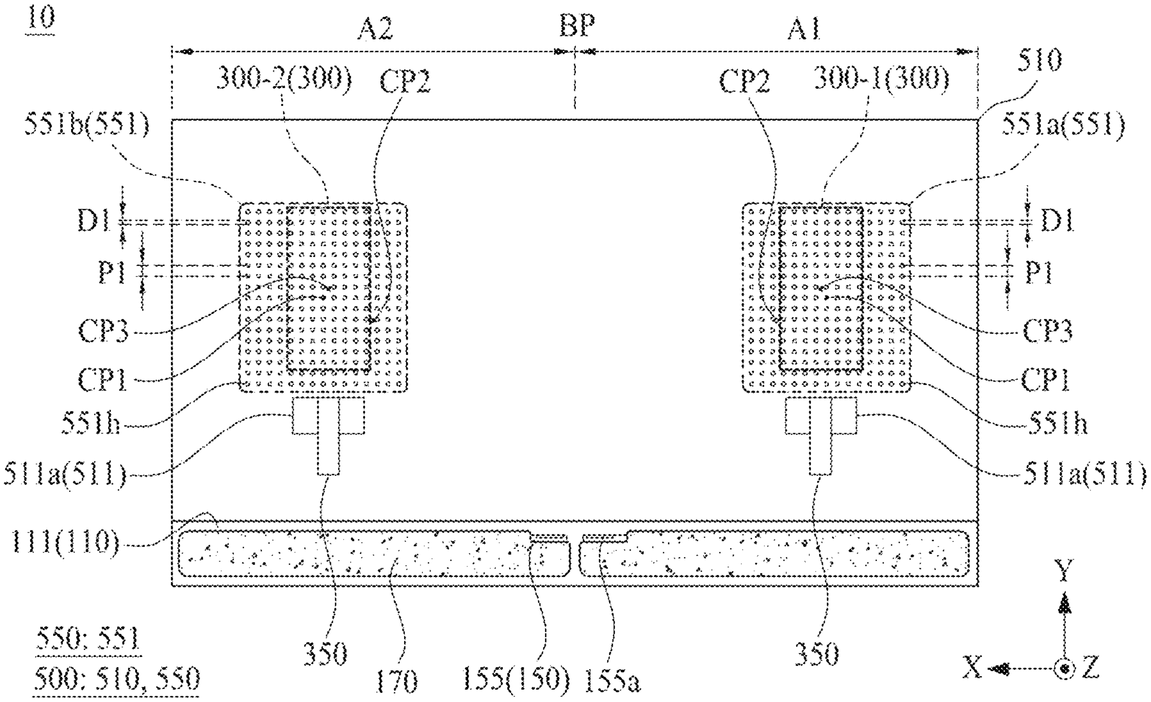
FIG. 6 illustrates a first rear cover and a first hole part of a hole part according to an embodiment of the present disclosure.

FIG. 6 illustrates a first rear cover and a first hole part of a hole part according to an embodiment of the present disclosure.

With reference to FIGS. 4 and 6, a first hole part 551 of a hole part 550 according to an embodiment of the present disclosure can include a first hole region 551*a* and a second hole region 551*b*.

The first hole region 551*a* can be disposed close to a periphery within the first region A1 of the vibration member 100. For example, the first hole region 551*a* can be disposed close to a periphery within the first region A1 of the vibration member 100 with respect to the first direction X. For example, to minimize vibration interference between the first region A1 and the second region A2 of the vibration member 100, a center portion CP1 of the first hole region 551*a* can be spaced apart from a center portion CP2 of the first region A1 of the vibration member 100 toward a periphery of the first region A1. For example, the center portion CP1 of the first hole region 551*a* can be between the center portion CP2 of the first region A1 of the vibration member 100 and a first short-side of the vibration member 100.

A center portion CP3 of the first vibration apparatus 300-1 overlapping the first hole region 551*a* can be spaced apart from the center portion CP1 of the first hole region 551*a*, but embodiments of the present disclosure are not limited thereto. For example, the center portion CP3 of the first vibration apparatus 300-1 can overlap or can be aligned with the center portion CP1 of the first hole region 551*a*.

The first hole region 551*a* can include a plurality of first holes 551*h*. The plurality of first holes 551*h* can be configured at the first hole region 551*a* to have a certain interval (or a pitch) P1. For example, the plurality of first holes 551*h* can be configured to have the certain interval P1 along each of the first direction X and the second direction Y. For example, the plurality of first holes 551*h* can be configured in a lattice shape (or a grid shape) having a predetermined interval P1. For example, the interval (or a pitch) P1 between the plurality of first holes 551*h* can be a shortest distance or a distance between center portions of two adjacent holes 551*h*. The plurality of first holes 551*h* can have a same size (or diameter) D1, but embodiments of the present disclosure are not limited thereto. The size D1 of each of the plurality of first holes 551*h* can be smaller than the interval (or pitch) P1 between the plurality of first holes 551*h*, but embodiments of the present disclosure are not limited thereto.

According to an embodiment of the present disclosure, in a case where the plurality of first holes 551*h* which overlap the vibration apparatus 300 or is at a rear surface of the vibration apparatus 300 is not sufficiently secured, an impedance of a rear sound (or second sound) can increase, and thus, a sound pressure level characteristic of a middle-low-pitched sound band can be reduced. Therefore, the first hole region 551*a* can have a hole aperture ratio of 33% or more, for reducing the impedance of the rear sound to enhance the sound pressure level characteristic of the middle-low-pitched sound band. For example, a hole aperture ratio can correspond to the number of holes 551*h* configured in the first hole region 551*a* having a predetermined size. For example, a case where the plurality of holes 551*h* having a size D1 and an interval P1 is maximally configured (or arranged) in the first hole region 551*a* can represent a hole aperture ratio of 100%. Accordingly, in a case where the plurality of first holes 551*h* which overlap the vibration apparatus 300 or is at the rear surface of the vibration apparatus 300 has a hole aperture ratio of 33% or more, the impedance of the rear sound can be reduced, and thus, the sound pressure level characteristic of the middle-low-pitched sound band can be enhanced.

The second hole region 551*b* can be disposed close to a periphery within the second region A2 of the vibration member 100. For example, the second hole region 551*b* can be disposed close to a periphery within the second region A2 of the vibration member 100 with respect to the first direction X. For example, to minimize vibration interference between the first region A1 and the second region A2 of the vibration member 100, a center portion CP1 of the second hole region 551*b* can be spaced apart from a center portion CP2 of the second region A2 of the vibration member 100 toward a periphery of the second region A2. For example, the center portion CP1 of the second hole region 551*b* can be between the center portion CP2 of the second region A2 of the vibration member 100 and a second short-side of the vibration member 100.

A center portion CP3 of the second vibration apparatus 300-2 overlapping the second hole region 551*b* can be spaced apart from the center portion CP1 of the second hole region 551*b*, but embodiments of the present disclosure are not limited thereto. For example, the center portion CP3 of the second vibration apparatus 300-2 can overlap or can be aligned with the center portion CP1 of the second hole region 551*b*.

The second hole region 551*b* can include a plurality of first holes 551*h*. The plurality of first holes 551*h* can be configured at the second hole region 551*b* to have a certain interval (or a pitch) P1. For example, the plurality of first holes 551*h* can be configured to have the certain interval P1 along each of the first direction X and the second direction Y.

The rear cover 500 according to an embodiment of the present disclosure can further include a first cable hole 511*a*.

The first cable hole 511*a* can be configured at the first rear cover 510 to be adjacent to the first hole part 551. The first cable hole 511*a* can be configured at the first rear cover 510 to be adjacent to a lower side of each of the first hole region 551*a* and the second hole region 551*b*. The signal cable 350 of the vibration apparatus 300 can be drawn out (or extended) to the rear surface of the first rear cover 510 through the first cable hole 511*a* in the gap space 10*s* between the vibration member 100 and the first rear cover 510. For example, the first cable hole 511*a* can be a cable outlet port, a cable outlet hole, a signal line outlet port, an opening, or a duct, but embodiments of the present disclosure are not limited thereto.

The apparatus 10 according to an embodiment of the present disclosure can further include an insulating member 170.

The insulating member 170 can be configured to prevent an electrical short circuit between the driving circuit part 150 and the second rear cover 520 of the rear cover 500. The insulating member 170 can be configured to cover the driving circuit part 150 disposed at one rear periphery portion of the vibration member 100. The insulating member 170 can be disposed (or configured) between one rear periphery portion of the vibration member 100 and the second rear cover 520 to cover the driving circuit part 150. For example, the insulating member 170 can be disposed (or configured) between one rear periphery portion of the base member 111 of the display panel 110 and the second rear cover 520 to cover the driving circuit part 150. For example, the insulating member 170 can be configured to cover one or more PCBs 155 disposed at one rear periphery portion of the vibration member 100. For example, the insulating member 170 can be configured to cover the other portion (or remaining portion) of one or more PCBs 155 other than a connector 155*a* at one or more PCBs 155. For example, the insulating member 170 can include an electrical insulating material. For example, the insulating member 170 can be an insulating pad, an insulating sheet, or an insulating tape, but embodiments of the present disclosure are not limited thereto.

Figure 7:
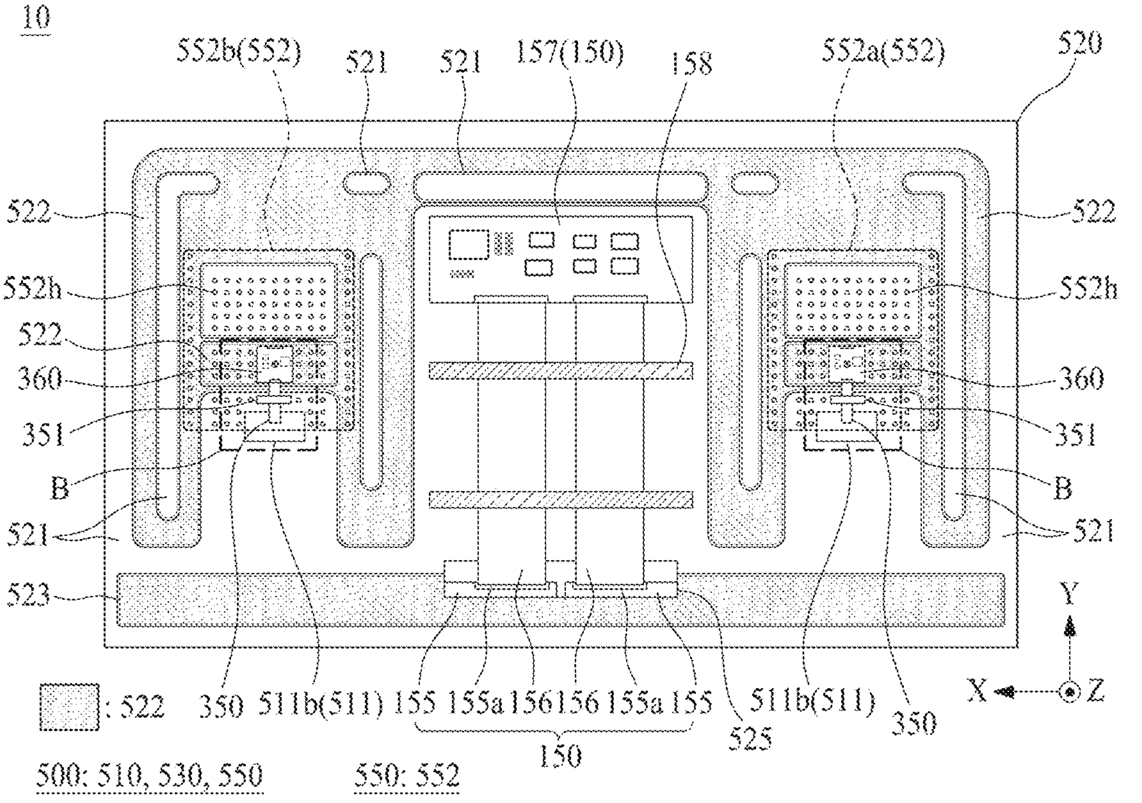
FIG. 7 illustrates a second rear cover and a second hole part of a hole part according to an embodiment of the present disclosure.
Figure 8:
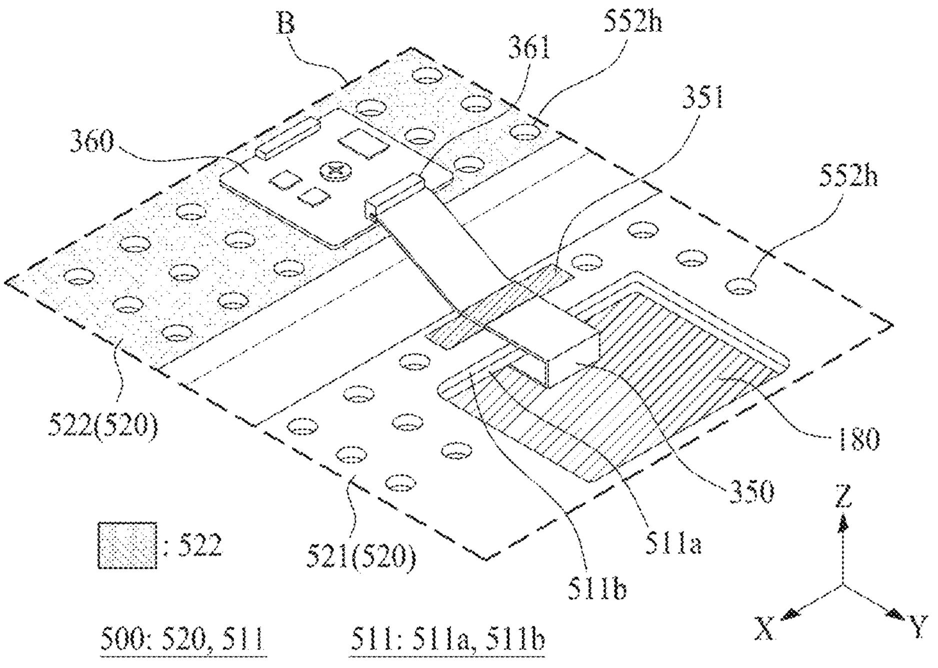
FIG. 8 is an expanded view of an area 'B' illustrated in FIG. 7.

FIG. 7 illustrates a second rear cover and a second hole part of a hole part according to an embodiment of the present disclosure. FIG. 8 is an expanded view of area 'B' illustrated in FIG. 7.

With reference to FIGS. 4 and 7, the second rear cover 520 of the rear cover 500 according to an embodiment of the present disclosure can include a flat portion 521 and a stiff portion 522.

The flat portion 521 can be configured in parallel with the first rear cover 510 of the rear cover 500. For example, an edge portion (or a periphery portion) of the second rear cover 520 can be configured as the flat portion 521. The flat portion 521 can be coupled the coupling member 530. For example, the flat portion 521 can be a floor portion, a floor plate, or a cover plate, but embodiments of the present disclosure are not limited thereto.

The stiff portion 522 can protrude in a rearward direction of the rear cover 500 from the flat portion 521, and thus, can increase the stiffness of the apparatus 10 or the rear cover 500. For example, the stiff portion 522 can be configured to be concave from a front surface of the flat portion 521 facing the first rear cover 510. For example, the stiff portion 522 can be for increasing the stiffness of the apparatus 10 or the rear cover 500 and can be configured in various shapes, but is not limited to a shape illustrated in FIG. 7. For example, the stiff portion 522 can be a forming portion, a protrusion portion, or a concave portion, but embodiments of the present disclosure are not limited thereto.

The second rear cover 520 of the rear cover 500 according to an embodiment of the present disclosure can further include an accommodating portion 523.

The accommodating portion 523 can be configured to accommodate the driving circuit unit 150. The accommodating portion 523 can protrude in a rearward direction of the rear cover 500 from the flat portion 521 of one edge portion (or one periphery portion) of the second rear cover 520 overlapping one edge portion (or one periphery portion) of the vibration member 100. The accommodating portion 523, as illustrated in FIG. 2, can be configured to cover or accommodate the plurality of flexible films 151 or the one or more PCBs 155 disposed at the rear surface of the vibration member 100. Therefore, the plurality of flexible films 151 or the one or more PCBs 155 can be covered or accommodated by the accommodating portion 523 of the second rear cover 520, and thus, can be protected from an external impact and can be insulated from the second rear cover 520 by the insulation member 170 illustrated in FIG. 6. For example, the accommodating portion 523 can be a forming portion, a protrusion portion, a circuit accommodating portion, or a PCB accommodating portion, but embodiments of the present disclosure are not limited thereto.

The second hole part 552 of the hole part 550 according to an embodiment of the present disclosure can include a first hole region 552*a* and a second hole region 552*b*.

The first hole region 552*a* can be configured at the second rear cover 520 to overlap the first hole region 551*a* of the first hole part 551. The first hole region 552*a* can include a plurality of second holes 552*h*. The plurality of second holes 552*h* can overlap the plurality of first holes 551*h* at the first hole region 551*a* of the first hole part 551, respectively. The plurality of second holes 552*h* can be configured at the flat portion 521 and the stiff portion 522 to overlap the plurality of first holes 551*h* at the first hole area 551*a* of the first hole part 551, respectively. For example, some of the plurality of second holes 552*h* can be configured at the flat portion 521, and the other (or remaining) of the plurality of second holes 552*h* can be configured at the stiff portion 522.

The second hole region 552*b* can be configured at the second rear cover 520 to overlap the second hole region 551*b* of the first hole part 551. The second hole region 552*b* can include a plurality of second holes 552*h*. The plurality of second holes 552*h* can overlap the plurality of first holes 551*h* at the second hole region 551*b* of the first hole part 551, respectively. The plurality of second holes 552*h* can be configured at the flat portion 521 and the stiff portion 522 to overlap the plurality of first holes 551*h* at the second hole area 551*b* of the first hole part 551, respectively. For example, some of the plurality of second holes 552*h* can be configured at the flat portion 521, and the other (or remaining) of the plurality of second holes 552*h* can be configured at the stiff portion 522.

With reference to FIGS. 4, 7, and 8, the rear cover 520 or the second rear cover 520 according to an embodiment of the present disclosure can include a cable hole 511*b*.

The second cable hole 511*b* can be configured at the second rear cover 520 to be adjacent to the second hole part 552. The second cable hole 511*b* can be configured at the second rear cover 520 to be adjacent to a lower side of each of the first hole region 552*a* and the second hole region 552*b*. The second cable hole 511*b* can be configured at the second rear cover 520 to overlap the first cable hole 511*a* at the first rear cover 510. The signal cable 350 which is drawn out (or extended) to the rear surface of the first rear cover 510 through the first cable hole 511*a* can be drawn out (or extended) to the rear surface of the second rear cover 520 through the second cable hole 511*b*.

The apparatus 10 according to an embodiment of the present disclosure can further include a sound circuit board 360.

The sound circuit board 360 can be disposed at the rear surface of the rear cover 500 and can be configured to apply a driving signal (or electrical signal or voice signal) to the vibration apparatus 300. The sound circuit board 360 can be configured to apply the driving signal to the vibration apparatus 300, based on a sound source signal applied from a host system (or display driving system or sound driving system). The sound circuit board 360 can be disposed at the rear surface of the rear cover 500 and connected to the signal cable 350 of the vibration apparatus 300. The sound circuit board 360 can be disposed at the rear surface of the second rear cover 520 adjacent to the second cable hole 511*b*.

According to an embodiment of the present disclosure, the sound circuit board 360 can be disposed (or fixed) at the stiff portion 522 of the second rear cover 520 adjacent to the second cable hole 511*b*. For example, to minimize the transfer of heat, occurring in the sound circuit board 360, to the vibration member 100 through the first rear cover 510, the sound circuit board 360 can be disposed (or fixed) at the stiff portion 522, spaced apart from the first rear cover 510 with the air gap 500*s* therebetween, of the stiff portion 522 of the second rear cover 520.

The sound circuit board 360 can be connected to the signal cable 350 drawn out (or extended) to the rear surface of the rear cover 500 through the second cable hole 511*b*. The vibration apparatus 300 embedded in the apparatus 10 can be drawn out (or extended) through the cable hole 511 configured in the rear cover 500 and can be connected to the cable connector 361 of the sound circuit board 360, and thus, can vibrate based on the driving signal applied through the signal cable 350 from the sound circuit board 360. For example, the sound circuit board 360 can be an amplifier PCB, an interface board, or a sound driving board, but embodiments of the present disclosure are not limited thereto.

The apparatus 10 according to an embodiment of the present disclosure can further include a cable fixing member (or a first cable fixing member) 351.

The cable fixing member 351 can fix a portion (or center portion) of the signal cable 350, drawn out or extended to the rear surface of the rear cover 500 through the second cable hole 511*b*, to the rear surface of the second rear cover 520. The cable fixing member 351 can prevent a noise sound caused by the vibration or shaking of the signal cable 350 based on a sound (or sound wave) output through the plurality of second holes 552*h* of the second hole part 552. For example, the cable fixing member 351 can be an insulating tape, but embodiments of the present disclosure are not limited thereto.

The second rear cover 520 according to an embodiment of the present disclosure can further include a cable outlet hole (or a third cable hole) 525.

The cable outlet hole 525 can be configured at the second rear cover 520 to overlap the connector 155*a* at the one or more PCBs 155. The cable outlet hole 525 can have a size and a shape enabling the one or more signal transfer members 156 to pass through.

According to an embodiment of the present disclosure, the control board 157 of the driving circuit part 150 can be disposed at the middle portion of the second rear cover 520, and can be connected to the one or more signal transfer members 156 which is drawn out (or extended) to the rear surface of the rear cover 500 through the cable outlet hole 525.

The apparatus 10 according to an embodiment of the present disclosure can further include one or more cable fixing members (or a second cable fixing member) 158.

The one or more cable fixing members 158 can fix a portion (or center portion) of the one or more signal transfer members 156, drawn out (or extended) to the rear surface of the rear cover 500 through the cable outlet hole 525, to the rear surface of the second rear cover 520. The one or more cable fixing members 158 can prevent a noise sound caused by the vibration or shaking of the one or more signal transfer members 156. For example, the one or more cable fixing members 158 can be an insulating tape, but embodiments of the present disclosure are not limited thereto.

Figure 9:
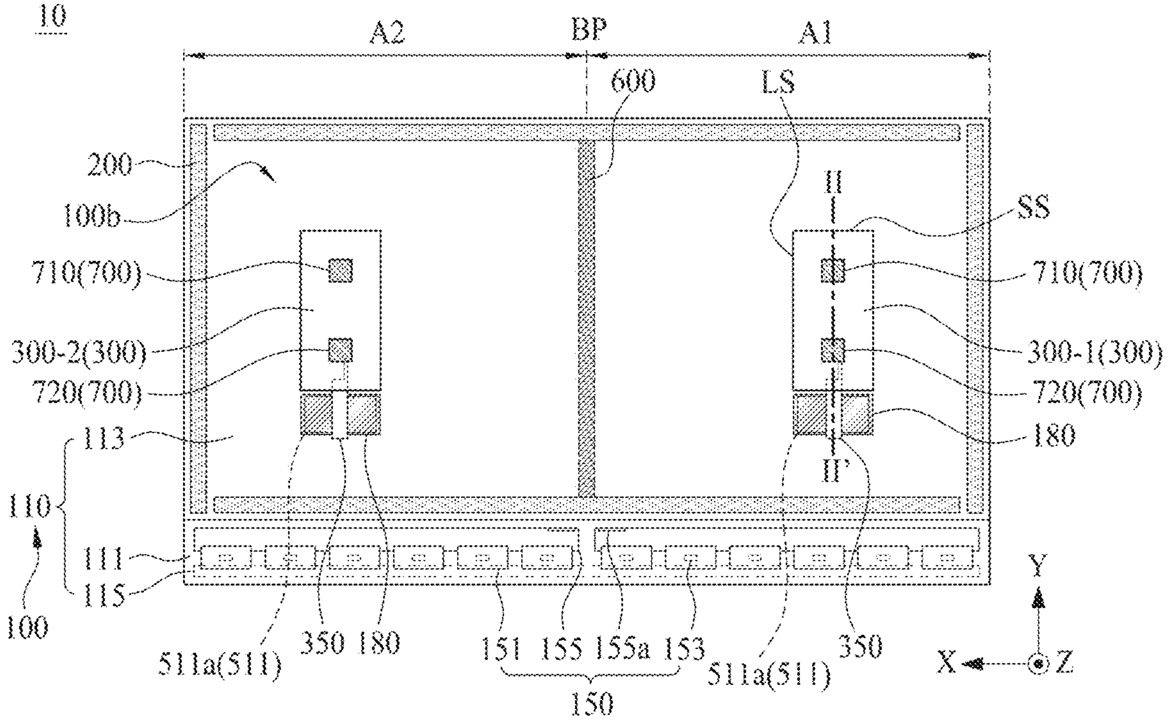
FIG. 9 illustrates a rear surface of a vibration member, a vibration apparatus, and a pad member according to an embodiment of the present disclosure.
Figure 10:
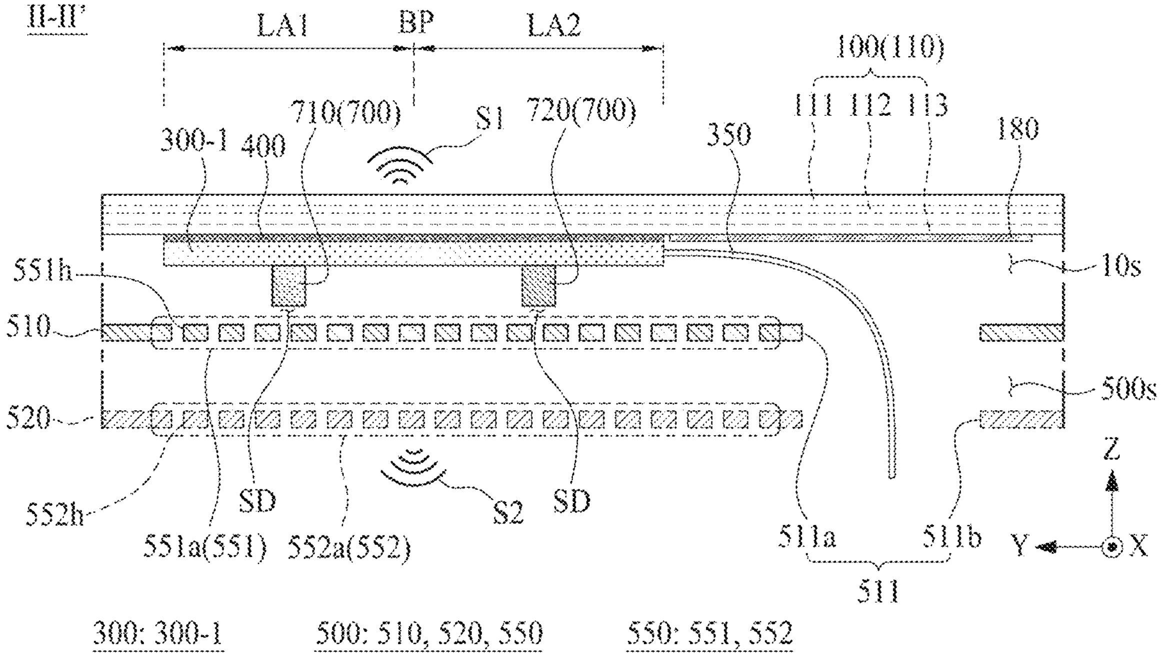
FIG. 10 is one example of a cross-sectional view taken along line II-II' illustrated in FIG. 9.

FIG. 9 illustrates a rear surface of a vibration member, a vibration apparatus, and a pad member according to an embodiment of the present disclosure. FIG. 10 is a cross-sectional view taken along line II-II' illustrated in FIG. 9.

With reference to FIGS. 9 and 10, the apparatus 10 according to an embodiment of the present disclosure can further include a pad member 700.

The pad member 700 can be configured for improving the degradation and/or dip phenomenon of sound quality. The pad member 700 can be disposed or configured at the vibration apparatus 300. For example, the pad member 700 can be configured for preventing a resonance frequency of the vibration apparatus 300 or decreasing a reduction in sound pressure level. The pad member 700 can be configured to maintain the gap space 10*s* between the vibration apparatus 300 and the rear cover 500 or a distance between the vibration apparatus 300 and the rear cover 500. Accordingly, because the apparatus 10 according to an embodiment of the present disclosure includes the pad member 700, sound quality can be improved, and an increase in temperature caused by driving of the vibration apparatus 300 can be prevented because the air gap or the distance between the vibration member 100 and the rear cover 500 is maintained.

The pad member 700 can be at a gap space 10*s* between a vibration apparatus 300 and a rear cover 500. For example, the pad member 700 can be at the gap space 10*s* between the vibration apparatus 300 and a first rear cover 510 of the rear cover 500. For example, the pad member 700 can be between the vibration apparatus 300 and a hole part 550 of the rear cover 500.

The pad member 700 according to an embodiment of the present disclosure can be connected (or attached) to a rear surface of the vibration apparatus 300 to be spaced apart from the rear cover 500. For example, a first surface of the pad member 700 can be connected (or attached) to the rear surface of the vibration apparatus 300, and a second surface opposite to the first surface of the pad member 700 can be spaced apart from the first rear cover 510 of the rear cover 500. For example, the pad member 700 can be connected (or attached) to the rear surface of the vibration apparatus 300 to be spaced apart from the hole part 550 of the rear cover 500. For example, the pad member 700 can be connected (or attached) to the rear surface of the vibration apparatus 300 to overlap some of the plurality of first holes 551*h* configured at the hole part 500 of the rear cover 500. For example, the pad member 700 can be connected (or attached) to the rear surface of the vibration apparatus 300 to face or directly face the hole part 500 of the rear cover 500 with a separation space SD therebetween.

The pad member 700 according to an embodiment of the present disclosure can have a size smaller than the vibration apparatus 300. For example, the pad member 700 can have a size of 14% to 20% of the size of the vibration apparatus 300, but embodiments of the present disclosure are not limited thereto. For example, the pad member 700 can have a pillar shape. For example, the pad member 700 can have a polygonal pillar shape or a circular pillar shape. For example, the pad member 700 can have a square pillar shape. However, the shape of the pad member 700 is not limited thereto.

The pad member 700 according to an embodiment of the present disclosure can act as a mass for increasing a mass (or weight) of the vibration apparatus 300. The pad member 700 can increase the mass (or weight) in a region of the vibration member 100 overlapping the vibration apparatus 300, and thus, can reduce a lowest resonance frequency (or a lowest natural frequency) of the vibration member 100. Therefore, the vibration apparatus 300 can vibrate at a relatively low frequency due to a lowest resonance frequency (or a lowest natural frequency) based on an increase in mass caused by the pad member 700. Accordingly, a sound characteristic and/or a sound pressure level characteristic of a low-pitched sound band generated based on a vibration of the vibration apparatus 300 can be enhanced. For example, the pad member 700 can be a resonance pad, a resonance control pad, an external resonance pad, a gap pad, a resonance control part, a resonance control member, a resonance balancing pad, a vibration control pad, a vibration balancing pad, a local mass, a point mass, a mass member, a weight clapper, or a mass member, but embodiments of the present disclosure are not limited thereto.

The pad member 700 according to an embodiment of the present disclosure can be configured to correct a mode shape of each of a primary vibration mode and a secondary vibration mode of the vibration member 100 based on the vibration of the vibration apparatus 300. The pad member 700 can be configured to accelerate a primary peak vibration mode of the vibration member 100. For example, the pad member 700 can move a primary peak of a sound (or a sound pressure level), generated based on the vibration of the vibration member 100, to a low-pitched sound band, and thus, can increase or enhance a sound characteristic and/or a sound pressure level characteristic of the low-pitched sound band and can extend the low-pitched sound band of a sound generated based on the vibration of the vibration member 100.

The pad member 700 according to an embodiment of the present disclosure can be configured as a material which absorbs or adjusts the vibration of the vibration apparatus 300. The pad member 700 can be configured as an elastic material having stiffness which is less than a bending stiffness of the vibration apparatus 300, but embodiments of the present disclosure are not limited thereto and the pad member 700 can be configured as a weight material having a weight. For example, the pad member 700 can include a vibration absorption layer, but embodiments of the present disclosure are not limited thereto. For example, the pad member 700 can include one or more of a silicone-based polymer, paraffin wax, and an acrylic-based polymer, but embodiments of the present disclosure are not limited thereto. For example, the pad member 700 can be configured as a single-sided tape, a single-sided foam tape, a single-sided cushion tape, a single-sided sponge tape, a single-sided adhesive pad, a single-sided adhesive foam tape, or a single-sided adhesive cushion pad, or the like, but embodiments of the present disclosure are not limited thereto. For example, the pad member 700 can be configured as a material which differs from a partition member 600, but embodiments of the present disclosure are not limited thereto.

The vibration apparatus 300 can include a first area (or a first half area) LA1 and a second area (or a second half area) LA2. For example, the vibration apparatus 300 can include the first area LA1 and the second area LA2 with respect to a long-side length direction (for example, a second direction Y). For example, in the vibration apparatus 300, a boundary portion BP between the first area LA1 and the second area LA2 can be a middle of a long-side length of the vibration apparatus 300. For example, the second area LA2 of the vibration apparatus 300 can be adjacent to a cable hole 511 configured at the rear cover 500 than the first area LA1.

The pad member 700 can be disposed (or attached) at each of the first and second areas LA1 and LA2 of the vibration apparatus 300. The pad member 700 according to an embodiment of the present disclosure can include a first pad member 710 and a second pad member 720.

The first pad member 710 can be disposed (or attached) at the first area LA1 of the vibration apparatus 300. For example, the first pad member 710 can be disposed (or attached) at a center portion of the first area LA1 of the vibration apparatus 300. For example, a center portion of the first pad member 710 can be disposed (or attached) at or aligned with the center portion of the first area LA1 of the vibration apparatus 300. For example, the first pad member 710 can have a size smaller than the first area LA1 of the vibration apparatus 300. For example, the first pad member 710 can have a size of 7% to 10% of a size of the first area LA1 of the vibration apparatus 300, but embodiments of the present disclosure are not limited thereto.

The second pad member 720 can be disposed (or attached) at the second area LA2 of the vibration apparatus 300. For example, the second pad member 720 can be disposed (or attached) at a center portion of the second area LA2 of the vibration apparatus 300. For example, a center portion of the second pad member 720 can be disposed (or attached) at or aligned with the center portion of the second area LA2 of the vibration apparatus 300. For example, the second pad member 720 can have a size smaller than the second area LA2 of the vibration apparatus 300. For example, the second pad member 720 can have a size of 7% to 10% of a size of the second area LA2 of the vibration apparatus 300, but embodiments of the present disclosure are not limited thereto.

According to an embodiment of the present disclosure, the vibration apparatus 300 can include a first vibration apparatus 300-1 and a second vibration apparatus 300-2.

The first vibration apparatus 300-1 can be disposed at the first region A1 of the vibration member 100, and the second vibration apparatus 300-2 can be disposed at the second region A2 of the vibration member 100. The pad member 700 can be disposed (or attached) at the first vibration apparatus 300-1 disposed at the first region A1 of the vibration member 100, and can be disposed (or attached) at the second vibration apparatus 300-2 disposed at the second region A2 of the vibration member 100.

Each of the first vibration apparatus 300-1 and the second vibration apparatus 300-2 can include a first area LA1 and a second area LA2.

The pad member 700 can include a first pad member 710 disposed (or attached) at the first area LA1 of each of the first vibration apparatus 300-1 and the second vibration apparatus 300-2, and a second pad member 720 disposed (or attached) at the second area LA2 of each of the first vibration apparatus 300-1 and the second vibration apparatus 300-2.

The first pad member 710 can be disposed (or attached) at the center portion of the first area LA1 of the first vibration apparatus 300-1 and the center portion of the first area LA1 of the second vibration apparatus 300-2, respectively. The second pad member 720 can be disposed (or attached) at the center portion of the first area LA1 of the first vibration apparatus 300-1 and the center portion of the second area LA2 of the second vibration apparatus 300-2, respectively.

The pad member 700 according to an embodiment of the present disclosure can be configured to correct a mode shape of each of a primary vibration mode and a secondary vibration mode of the vibration member 100 based on the vibration of the vibration apparatus 300. The pad member 700 can be configured to accelerate a primary peak vibration mode of the vibration member 100. For example, the pad member 700 can move a primary peak of a sound (or a sound pressure level), generated based on the vibration of the vibration member 100, to a low-pitched sound band, and thus, can increase or enhance a sound characteristic and/or a sound pressure level characteristic of the low-pitched sound band and can extend the low-pitched sound band of a sound generated based on the vibration of the vibration member 100.

The apparatus 10 according to an embodiment of the present disclosure can further include the pad member 700, and thus, can increase or enhance a sound characteristic and/or a sound pressure level characteristic of a low-pitched sound band, can extend a low-pitched sound band of a sound generated based on a vibration of the vibration member 100, can be improved in sound quality, and can prevent an increase in temperature caused by driving of the vibration apparatus 100 because the air gap between the vibration member 100 and the rear cover 500 is maintained, thereby minimizing or preventing an image quality defect of the display panel 110 caused by a rapid temperature difference in one portion of the display panel 110.

Figure 11:
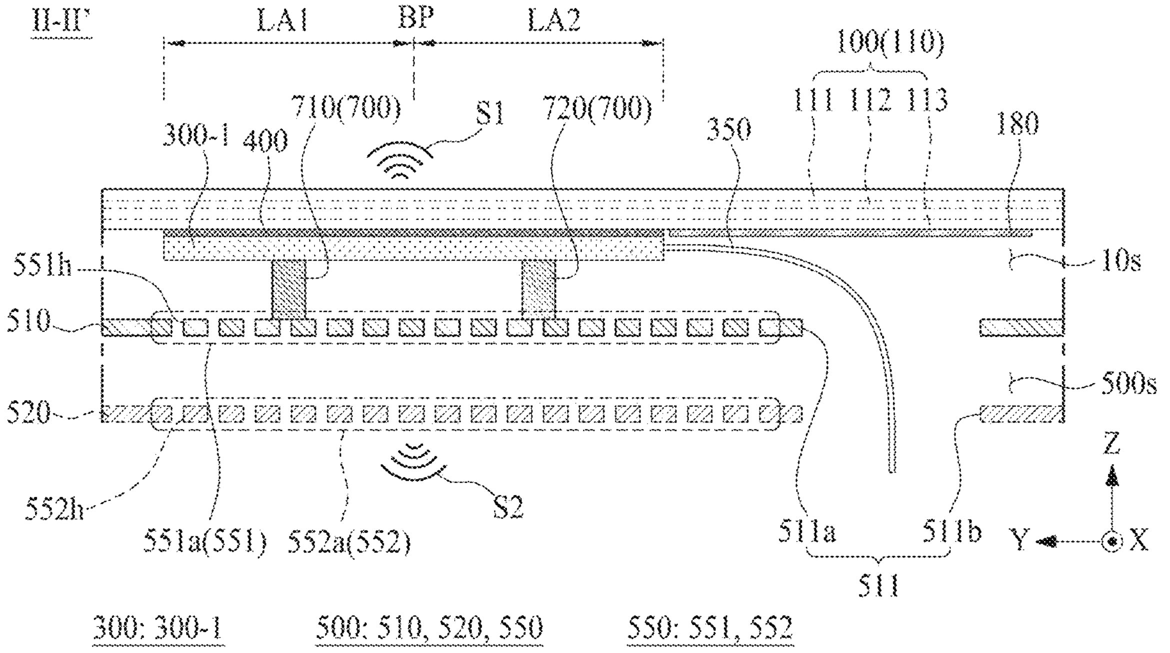
FIG. 11 is another example of a cross-sectional view taken along line II-II' illustrated in FIG. 9.

FIG. 11 is another cross-sectional view taken along line II-II' illustrated in FIG. 9. Particularly, FIG. 11 illustrates an embodiment implemented by changing the pad member described above with reference to FIGS. 9 and 10. In the following description, therefore, repeated descriptions of the pad member and the other elements except elements relevant thereto are omitted or may be briefly provided. Descriptions above with reference to FIGS. 9 and 10 can be included in descriptions of FIG. 11.

With reference to FIGS. 9 and 11, a pad member 700 according to another embodiment of the present disclosure can be configured to contact (or adhere closely) or connected (or attached) to the rear cover 500.

The pad member 700 can be connected (or attached) to the rear surface of the vibration apparatus 300, and can be connected (or attached) to the first rear cover 510 of the rear cover 500. For example, a first surface of the pad member 700 can be connected (or attached) to the rear surface of the vibration apparatus 300, and a second surface of the pad member 700 can contact (or adhere closely) or can be connected (or attached) to the first rear cover 510 of the rear cover 500.

The pad member 700 according to another embodiment of the present disclosure can be configured to cover a portion of the hole part 550 which is configured at the rear cover 500. For example, the pad member 700 can be configured to cover a portion of the plurality of first holes 551*h* which is configured at the first hole part 551 of the hole part 550.

The first pad member 710 of the pad member 700 can be connected (or attached) to each of the center portion of the first area LA1 of the first vibration apparatus 300-1 and the center portion of the first area LA1 of the second vibration apparatus 300-2, and can be connected (or attached) to the first rear cover 510 of the rear cover 500. The first pad member 710 can be configured to cover the portion of the plurality of first holes 551*h* which is configured at the first hole part 551.

The second pad member 720 of the pad member 700 can be connected (or attached) to each of the center portion of the second area LA2 of the first vibration apparatus 300-1 and the center portion of the second area LA2 of the second vibration apparatus 300-2, and can be connected (or attached) to the first rear cover 510 of the rear cover 500. The second pad member 720 can be configured to cover the portion of the plurality of first holes 551*h* which is configured at the first hole part 551.

The pad member 700 according to another embodiment of the present disclosure can be connected between the rear surface of the vibration apparatus 700 (or first and second vibration apparatuses 300-1 and 300-2) and the first rear cover 510 of the rear cover 500, and thus, can prevent (or limit) or bind a vibration (or displacement) of one portion (for example, a center portion of each of first and second regions LA1 and LA2) of the vibration apparatus 300, thereby decreasing the degradation or dip phenomenon of sound quality and preventing a resonance frequency of the vibration apparatus 300 (or the first and second vibration apparatuses 300-1 and 300-2) or decreasing a reduction in sound pressure level. Further, the pad member 700 can maintain a gap space 10*s* or a distance between the vibration apparatus 300 and the rear cover 500 intactly, and thus, can prevent an increase in temperature caused by driving of the vibration apparatus 300, thereby minimizing or preventing an image quality defect of the display panel 110 caused by heat.

Figure 12:
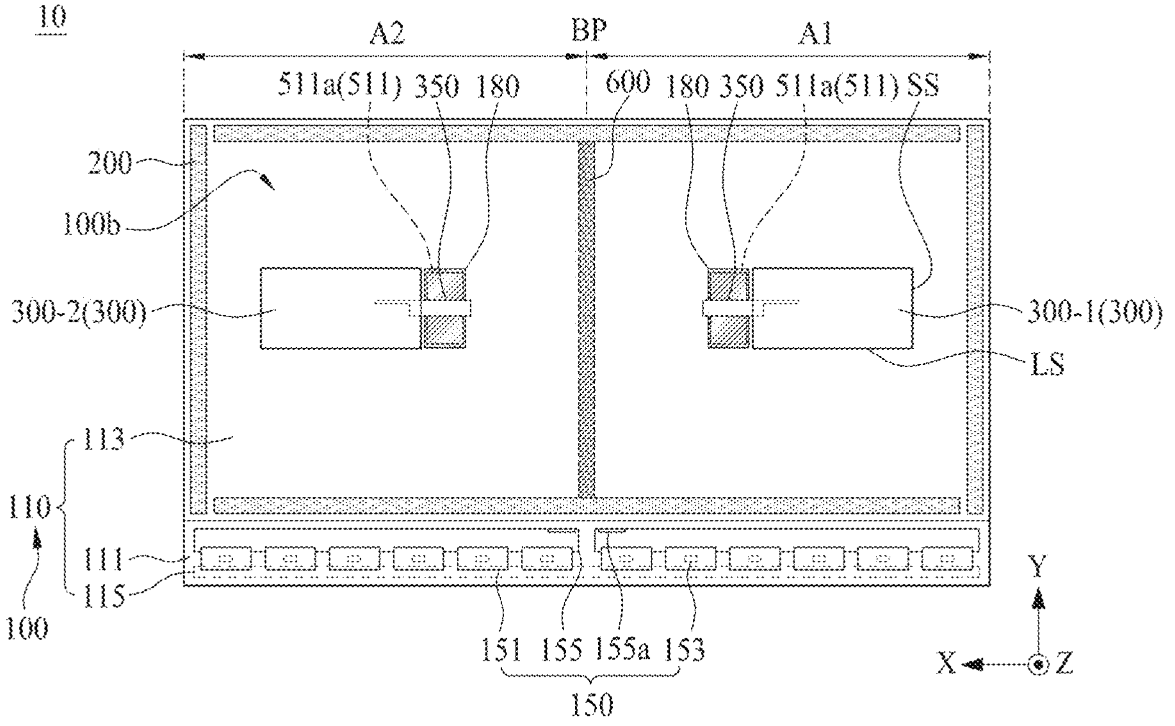
FIG. 12 illustrates a rear surface of a vibration member and a vibration apparatus according to another embodiment of the present disclosure.
Figure 13:
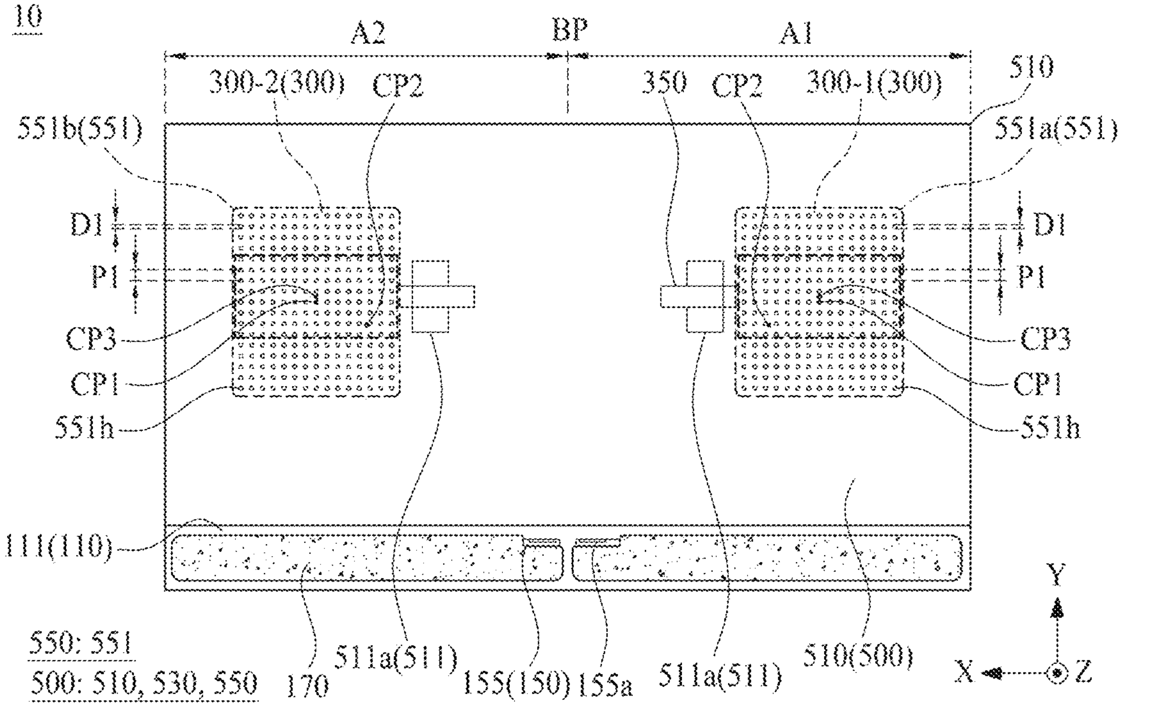
FIG. 13 illustrates a first rear cover and a first hole part of a hole part according to another embodiment of the present disclosure.

FIG. 12 illustrates a rear surface of a vibration member and a vibration apparatus according to another embodiment of the present disclosure. FIG. 13 illustrates a first rear cover and a first hole part of a hole part according to another embodiment of the present disclosure. Particularly, FIGS. 12 and 13 illustrate an embodiment implemented by changing an arrangement structure of the vibration apparatus in the apparatus described above with reference to FIGS. 2 to 10. In the following description, therefore, repeated descriptions the other elements other than an arrangement structure of the vibration apparatus and relevant elements thereto are omitted or may be briefly provided. Descriptions above with reference to FIGS. 2 to 10 can be included in descriptions of FIGS. 12 and 13.

With reference to FIGS. 12 and 13, the vibration apparatus 300 according to an embodiment of the present disclosure can include a rectangular shape including a long-side LS and a short-side SS.

The vibration apparatus 300 according to another embodiment of the present disclosure can be a same as or substantially the same as the vibration apparatus 300 described above with reference to FIGS. 2 to 10 except for the arrangement structure or an arrangement direction of the vibration apparatus 300, and thus, repeated descriptions thereof are omitted.

The long-side LS of the vibration apparatus 300 can be parallel to the long-side of the vibration member 100, and the short-side SS of the vibration apparatus 300 can be parallel to the short-side of the vibration member 100. For example, a long-side length direction of the vibration apparatus 300 can be parallel to the first direction X or a long-side length direction (or a horizontal direction) of the vibration member 100. For example, the vibration apparatus 300 can have a horizontal arrangement structure. Accordingly, in the vibration member 100 having a rectangular shape, a horizontal vibration region by the vibration apparatus 300 can be increased by the horizontal arrangement structure of the vibration apparatus 300, and thus, a displacement amount or an amplitude displacement of the vibration member 100 can be increased, thereby enhancing a sound characteristic and/or a sound pressure level characteristic of the low-pitched sound band generated based on the vibration of the vibration member 100.

The first vibration apparatus 300-1 of the vibration apparatus 300 can be disposed (or attached) at the first region A1 of the vibration member 100 to have the horizontal arrangement structure. Accordingly, in the first region A1 of the vibration member 100, a horizontal vibration region by the first vibration apparatus 300-1 can be increased by the horizontal arrangement structure of the vibration apparatus 300, and thus, a displacement amount or an amplitude displacement of the first region A1 of the vibration member 100 can be increased, whereby a sound characteristic and/or a sound pressure level characteristic of the low-pitched sound band generated based on the vibration of the first region A1 of the vibration member 100 can be enhanced.

The second vibration apparatus 300-2 of the vibration apparatus 300 can be disposed (or attached) at the second region A2 of the vibration member 100 to have the horizontal arrangement structure. Accordingly, in the second region A2 of the vibration member 100, a horizontal vibration region by the second vibration apparatus 300-2 can be increased by the horizontal arrangement structure of the vibration apparatus 300, and thus, a displacement amount or an amplitude displacement of the second region A2 of the vibration member 100 can be increased, whereby a sound characteristic and/or a sound pressure level characteristic of the low-pitched sound band generated based on the vibration of the second region A2 of the vibration member 100 can be enhanced.

In the apparatus 10 according to another embodiment of the present disclosure, the plate 180 can be disposed (or attached) at the rear surface of the vibration member 100 to be adjacent to the vibration apparatus 300. For example, the plate 180 can be disposed to be adjacent to the vibration apparatus 300 in a region between the vibration apparatus 300 and the central portion of the vibration member 100. For example, the plate 180 can be disposed to be adjacent to the vibration apparatus 300 in a region between the vibration apparatus 300 and the partition member 600.

The plate 180 can be disposed (or attached) at the rear surface of the vibration member 100 to be adjacent to each of the first vibration apparatus 300-1 and the second vibration apparatus 300-2. For example, the plate 180 can be disposed (or attached) at the rear surface of the vibration member 100 to overlap the cable hole 511 adjacent to the first vibration apparatus 300-1, and can be disposed (or attached) at the rear surface of the vibration member 100 to overlap the cable hole 511 adjacent to the second vibration apparatus 300-2.

The apparatus 10 according to another embodiment of the present disclosure can have a same effect as the apparatus 10 described above with reference to FIGS. 1 to 8, and a sound characteristic and/or a sound pressure level characteristic of the low-pitched sound band can be enhanced based on the horizontal arrangement structure of the vibration apparatus 300.

Figure 14:
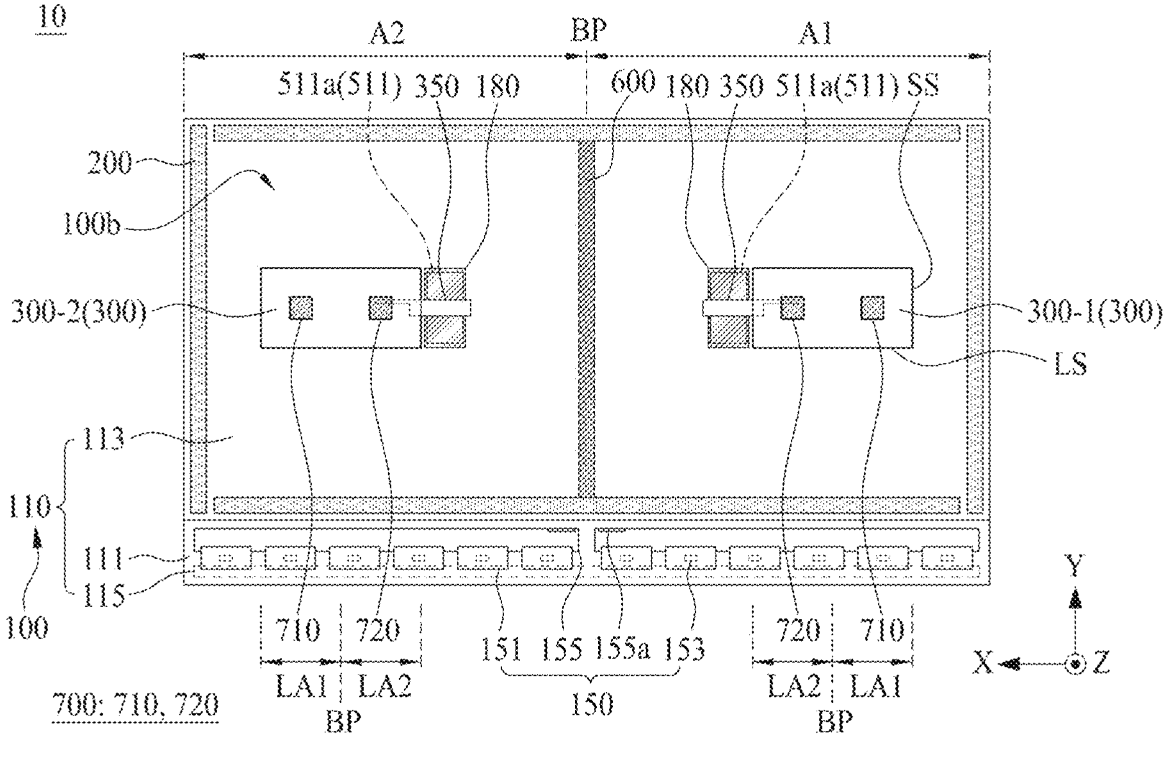
FIG. 14 illustrates a rear surface of a vibration member and a vibration apparatus according to another embodiment of the present disclosure.

FIG. 14 illustrates a rear surface of a vibration member and a vibration apparatus according to another embodiment of the present disclosure. Particularly, FIG. 14 illustrates an embodiment where a pad member is additionally configured at the apparatus described above with reference to FIGS. 12 and 13. In the following description, therefore, repeated descriptions of the other elements other than a pad member and relevant elements thereto are omitted or may be briefly provided. Descriptions above with reference to FIGS. 12 and 13 can be included in descriptions of FIG. 14.

With reference to FIG. 14, the apparatus 10 according to another embodiment of the present disclosure can further include a pad member 700.

The pad member 700 can be at a gap space 10*s* between the vibration apparatus 300 and the rear cover 500. For example, the pad member 700 can be at the gap space 10*s* between the vibration apparatus 300 and the first rear cover 510 of the rear cover 500. For example, the pad member 700 can be between the vibration apparatus 300 and the hole part 550 of the rear cover 500. The vibration apparatus 300 can include the first area LA1 and the second area LA2 with respect to a long-side length direction (for example, a second direction Y). The pad member 700 can be disposed (or attached) at each of the first area LA1 and the second area LA2 of the vibration apparatus 300. The pad member 700 can include a first pad member 710 disposed (or attached) at the first area LA1 of the vibration apparatus 300 and a second pad member 720 disposed (or attached) at the second area LA2 of the vibration apparatus 300. Except for that the pad member 700 is disposed (or attached) at the vibration apparatus 300 which is disposed in the horizontal arrangement structure, the pad member 700 can be a same as or substantially a same as the pad member 700 described above with reference to FIG. 9, and thus, repeated descriptions thereof are omitted.

In the apparatus 10 according to another embodiment of the present disclosure, the pad member 700 (or the first and second pad members 710 and 720) can be spaced apart from the first rear cover 510 (or the rear cover 500) as illustrated in FIG. 10, or can contact (or directly contact) the first rear cover 510 (or the rear cover 500) as illustrated in FIG. 11.

The apparatus 10 according to another embodiment of the present disclosure can have a same effect as the apparatus 10 described above with reference to FIGS. 9 to 11, and a sound characteristic and/or a sound pressure level characteristic of a low-pitched sound band can be enhanced based on the horizontal arrangement structure of the vibration apparatus 300.

Figure 15:
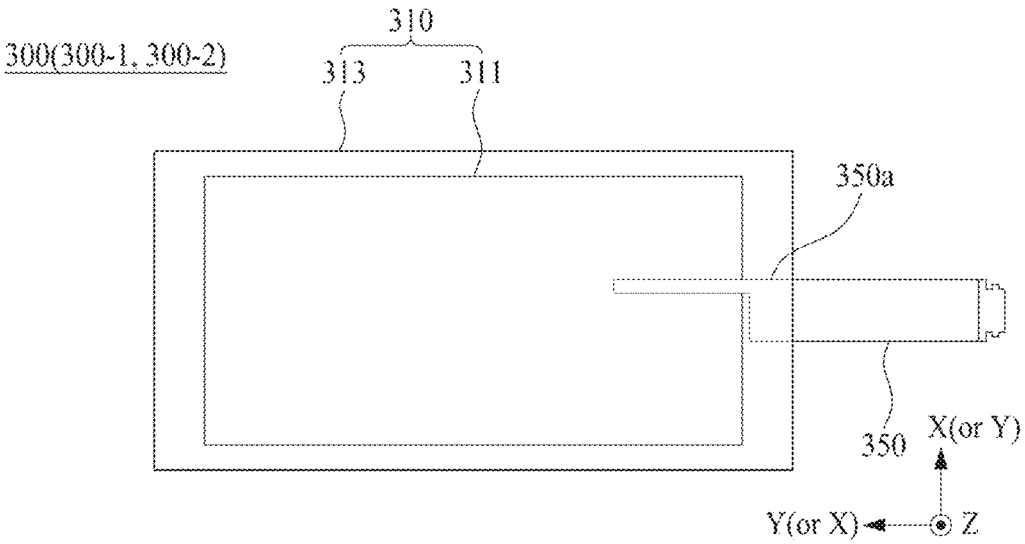
FIG. 15 illustrates a vibration apparatus according to an embodiment of the present disclosure.
Figure 16:
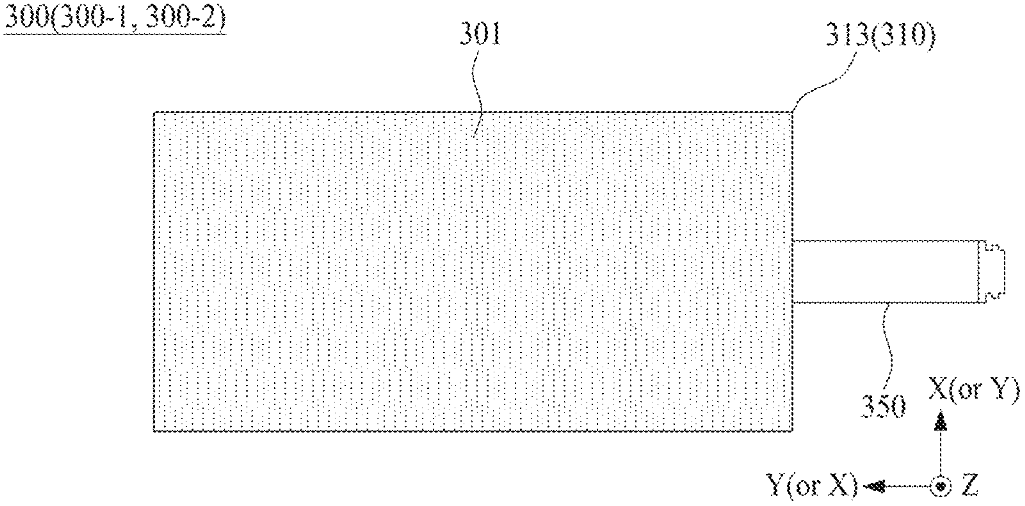
FIG. 16 illustrates a rear surface of the vibration apparatus illustrated in FIG. 15.

FIG. 15 illustrates a vibration apparatus according to an embodiment of the present disclosure. FIG. 16 illustrates a rear surface of the vibration apparatus illustrated in FIG. 15.

With reference to FIGS. 15 and 16, the vibration apparatus 300 (or the first and second vibration apparatuses 300-1 and 300-2) according to an embodiment of the present disclosure can include one or more vibration generators.

The vibration apparatus 300 or one or more vibration generators can include a vibration generating part 310 including a piezoelectric material.

The vibration generating part 310 can be configured to vibrate based on a driving signal (or a sound signal or a voice signal) supplied from a sound circuit board. For example, the vibration generating part 310 can be a vibration device, a sound device, a vibration generating device, a sound generating device, a vibration film, a vibration generating film, a vibrator, a vibration generator, a sound generator, an active vibrator, an active vibration generator, a vibration structure, a sound generating structure, an active vibration member, or the like, but embodiments of the present disclosure are not limited thereto.

The vibration generating part 310 according to an embodiment of the present disclosure can include a vibration part 311. The vibration part 311 can be configured to vibrate by a piezoelectric effect based on a driving signal. The vibration part 311 can include at least one or more of a piezoelectric inorganic material and a piezoelectric organic material. For example, the vibration part 311 can be a piezoelectric device, a piezoelectric device part, a piezoelectric device layer, a piezoelectric structure, a piezoelectric vibration part, a piezoelectric vibration layer, or the like, but embodiments of the present disclosure are not limited thereto.

The vibration generating part 310 or one or more vibration generators according to an embodiment of the present disclosure can further include a cover member 313.

The cover member 313 can be configured to protect the vibration part 311. For example, the cover member 313 can be configured to surround the vibration part 311. For example, the cover member 330 can be configured to have a size which is greater than the vibration part 311. For example, the cover member 313 can be a protection member, but embodiments of the present disclosure are not limited thereto.

According to an embodiment of the disclosure, the cover member 313 can be configured to cover a first surface (or a front surface) of the vibration part 311. For example, a second surface (or a rear surface) of the vibration part 311 opposite to the first surface of the vibration part 311 can be an attachment surface (or a connection surface or a panel attachment surface) attached at (or connected to) the vibration member. For example, the second surface of the vibration part 311 can include an adhesive layer 301. For example, the second surface (or attachment surface) or the adhesive layer 301 of the vibration part 311 can be protected by a release paper (or a release film). For example, when the vibration apparatus 300 is connected to (or attached at) the vibration member, the release paper (or release film) can be released (or removed) from the adhesive layer 301.

The vibration apparatus 300 according to an embodiment of the present disclosure can further include a signal cable 350.

The signal cable 350 can be configured to be electrically connected to the vibration part 511. A portion 350*a* of the signal cable 350 can be accommodated (or inserted) between the vibration part 511 and the cover member 313. Accordingly, the signal cable 350 can be integrated into (or configured as one body with) the vibration part 311. For example, the vibration apparatus 300 (or the first and second vibration apparatuses 300-1 and 300-2 according to an embodiment of the present disclosure can be a vibration apparatus in which the signal cable 350 is integrated. For example, the signal cable 350 can be configured as a signal supply member, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

Figure 17:
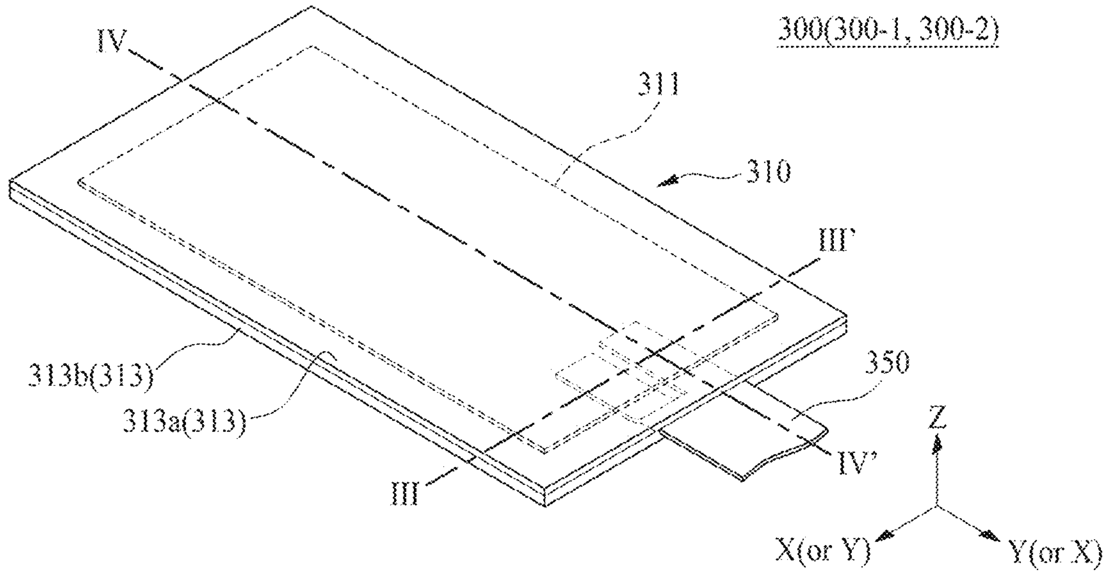
FIG. 17 is a perspective view illustrating a vibration apparatus according to another embodiment of the present disclosure.
Figure 18:
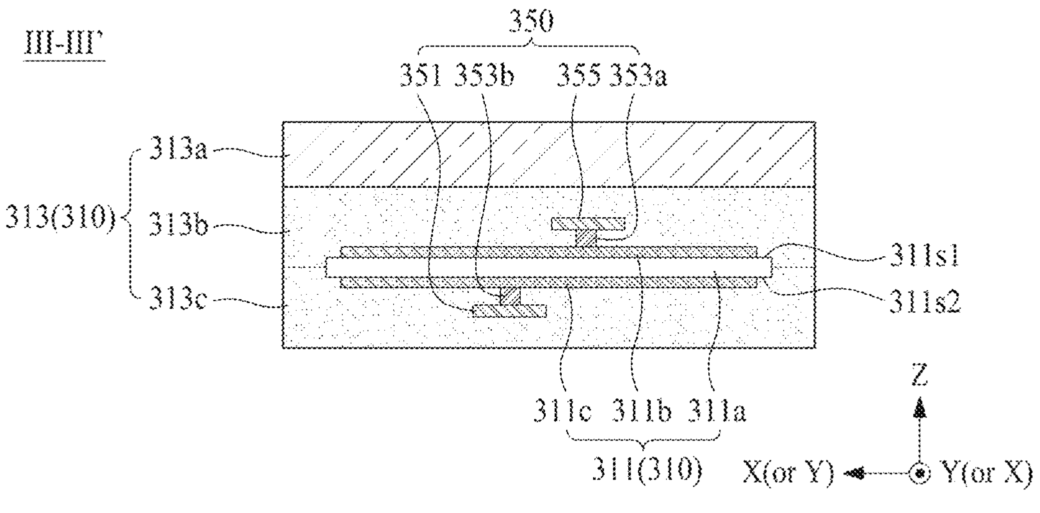
FIG. 18 is a cross-sectional view taken along line III-III' illustrated in FIG. 17.
Figure 19:
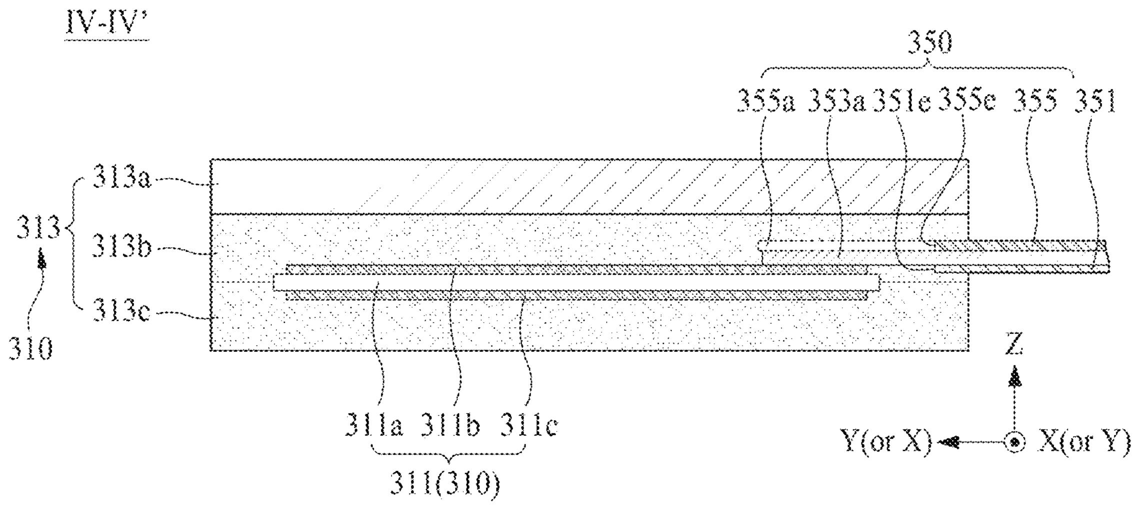
FIG. 19 is a cross-sectional view taken along line IV-IV' illustrated in FIG. 17.

FIG. 17 is a perspective view illustrating a vibration apparatus according to another embodiment of the present disclosure. FIG. 18 is a cross-sectional view taken along line III-III' illustrated in FIG. 17. FIG. 19 is a cross-sectional view taken along line IV-IV' illustrated in FIG. 17. FIGS. 17 to 18 illustrate the vibration apparatus (or first and second vibration apparatuses) described above with reference to FIGS. 1 to 16.

With reference to FIGS. 17 to 19, the vibration apparatus 300 or the first and second vibration apparatuses 300-1 and 300-2 according to another embodiment of the present disclosure can include one or more vibration generators.

The one or more vibration generators can include a vibration generating part 310 including a piezoelectric material. The vibration generating part 310 can include a vibration part 311.

The vibration generating part 310 or the vibration part 311 according to an embodiment of the present disclosure can include a vibration layer 311*a*, a first electrode layer 311*b*, and a second electrode layer 311*c*.

The vibration layer 311*a* can include a piezoelectric material or an electroactive material which includes a piezoelectric effect. For example, the vibration layer 311*a* can be configured as a ceramic-based material or a piezoelectric ceramic. For example, the vibration layer 311*a* can be a piezoelectric layer, a piezoelectric material layer, an electroactive layer, a piezoelectric composite layer, a piezoelectric composite, a piezoelectric ceramic composite, or the like, but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material of the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material of the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration layer 311*a* can include at least one or more of calcium titanate ($CaTiO_3$), barium titanate ($BaTiO_3$), and strontium titanate ($SrTiO_3$), without lead (Pb), but embodiments of the present disclosure are not limited thereto.

The first electrode layer 311*b* can be disposed at a first surface (or an upper surface or a front surface) 311*s*1 of the vibration layer 311*a*. The first electrode layer 311*b* can have a same size as the vibration layer 311*a*, or can have a size which is smaller than the vibration layer 311*a*.

The second electrode layer 311*c* can be disposed at a second surface (or a lower surface or a rear surface) 311*s*2 which is opposite to or different from the first surface 311*s*1 of the vibration layer 311*a*. The second electrode layer 311*c* can have a same size as the vibration layer 311*a*, or can have a size which is smaller than the vibration layer 311*a*. For example, the second electrode layer 311*c* can have a same shape as that of the vibration layer 311*a*, but embodiments of the present disclosure are not limited thereto.

One or more of the first electrode layer 311*b* and the second electrode layer 311*c* according to an embodiment of the present disclosure can be formed of a transparent conductive material, a semitransparent conductive material, or an opaque conductive material.

The vibration layer 311*a* can be polarized (or poling) by a certain voltage applied to the first electrode layer 311*b* and the second electrode layer 311*c* in a certain temperature atmosphere, or a temperature atmosphere that can be changed from a high temperature to a room temperature, but embodiments of the present disclosure are not limited thereto. For example, a polarization direction (or a poling direction) formed in the vibration layer 311*a* can be formed or aligned (or arranged) from the first electrode layer 311*b* to the second electrode layer 311*c*, but embodiments of the present disclosure are not limited thereto, and a polarization direction (or a poling direction) formed in the vibration layer 311*a* can be formed or aligned (or arranged) from the second electrode layer 311*c* to the first electrode layer 311*b*.

The vibration layer 311*a* can alternately and repeatedly contract and/or expand based on an inverse piezoelectric effect according to a sound signal (or a voice signal) applied to the first electrode layer 311*b* and the second electrode layer 311*c* from the outside to vibrate. For example, the vibration layer 311*a* can vibrate in a vertical direction (or thickness direction) and in a planar direction by the signal applied to the first electrode layer 311*b* and the second electrode layer 311*c*. The vibration layer 31l*a* can be displaced (or vibrated or driven) by contraction and/or expansion of the planar direction, thereby improving a vibration characteristic including a sound characteristic and/or a sound pressure level characteristic of the vibration generating part 310 or the vibration apparatus 300 (or first and second vibration apparatuses 300-1 and 300-2).

The vibration generating part 310 according to an embodiment of the present disclosure can further include a cover member 313. The cover member 313 can be configured to protect at least one or more of the first surface 311*s*1 and the second surface 311*s*2 of the vibration part 311. The cover member 313 can be configured to surround at least one or more of the first surface 311*s*1 and the second surface 311*s*2 of the vibration part 311.

The cover member 313 according to an embodiment of the present disclosure can further include a first cover member 313*a*.

The first cover member 313*a* can be disposed (or configured) at the first surface (or a front surface) 311*s*1 of the vibration part 311. For example, the first cover member 313*a* can be configured to cover the first electrode layer 311*b* of the vibration part 311. For example, the first cover member 313*a* can be configured to have a size which is greater than the vibration part 311. The first cover member 313*a* can be configured to protect the first surface 311*s*1 of the vibration part 311 and the first electrode layer 311*b*.

The first cover member 313*a* can include one or more materials of plastic, fiber, cloth, paper, leather, carbon, and wood, but embodiments of the present disclosure are not limited thereto. For example, the first cover member 313*a* can be a polyimide film, a polyethylene naphthalate, or a polyethylene terephthalate film, but embodiments of the present disclosure are not limited thereto.

The cover member 313 according to an embodiment of the present disclosure can further include a first adhesive layer 313*b*.

The first adhesive layer 313*b* can be disposed on the first surface (or front surface) 311*s*1 of the vibration part 311. The first adhesive layer 313*b* can be configured to cover the first electrode layer 311*b* of the vibration part 311. The first adhesive layer 313*b* can be configured to protect the first surface 311*s*1 of the vibration part 311 and the first electrode layer 311*b*.

The first cover member 313*a* can be connected or coupled to the first surface 311*s*1 of the vibration part 311 by the first adhesive layer 313*b*. For example, the first cover member 313*a* can be connected or coupled to the first surface 311*s*1 of the vibration part 311 or the first electrode layer 311*b* by the first adhesive layer 313*b*. For example, the first cover member 313*a* can be connected or coupled to the first surface 311*s*1 of the vibration part 311 or the first electrode layer 311*b* by a film laminating process using the first adhesive layer 313*b*. The first adhesive layer 313*b* can be configured to surround an entire first surface 311*s*1 of the vibration part 311 and a portion of side surfaces of the vibration part 311.

The cover member 313 according to an embodiment of the present disclosure can further include a second adhesive layer 313*c*.

The second adhesive layer 313*c* can be disposed on the second surface (or rear surface) 311*s*2 of the vibration part 311. The second adhesive layer 313*c* can be configured to cover the second electrode layer 311*c* of the vibration part 311. The second adhesive layer 313*c* can be configured to cover or protect the second surface 311*s*2 of the vibration part 311 and second first electrode layer 311*c*. The second adhesive layer 313*c* can be configured to surround an entire second surface 311*s*2 of the vibration part 311 and a portion of side surfaces of the vibration part 311. For example, the second adhesive layer 313*c* can be a protection layer or a protection member, but embodiments of the present disclosure are not limited thereto. For example, the cover member 313 can include the first cover member 313*a*, the first adhesive layer 313*b*, and the second adhesive layer 313*c*. For example, the cover member 313 can be a protection member, but embodiments of the present disclosure are not limited thereto.

Each of the first adhesive layer 313*b* and second adhesive layer 313*c* according to an embodiment of the present disclosure can include an electrically insulating material which has adhesiveness and is capable of compression and decompression. For example, each of the first adhesive layer 313*b* and second adhesive layer 313*c* can include an epoxy resin, an acrylic resin, a silicone resin, a urethane resin, a pressure sensitive adhesive (PSA), an optically cleared adhesive (OCA), or an optically cleared resin (OCR), but embodiments of the present disclosure are not limited thereto.

Each of the first adhesive layer 313*b* and second adhesive layer 313*c* according to another embodiment of the present disclosure can include an insulating adhesive material. For example, each of the first adhesive layer 313*b* and second adhesive layer 313*c* can include one or more of a thermo-curable adhesive, a photo-curable adhesive, and a thermo-setting adhesive (or a thermal bonding adhesive). For example, each of the first adhesive layer 313*b* and second adhesive layer 313*c* can include the thermo-curable adhesive or the thermosetting adhesive. The thermosetting adhesive can be a heat-active type or a thermo-curable type, but embodiments of the present disclosure are not limited thereto.

The first adhesive layer 313*b* and the second adhesive layer 313*c* can be configured to surround the vibrating part 311. For example, one or more of the first adhesive layer 313*b* and the second adhesive layer 313*c* can be configured to surround the vibrating part 311. For example, the vibrating part 311 can be inserted (or accommodated) or embedded (or built-in) inside of an adhesive layer including the first adhesive layer 313*b* and the second adhesive layer 313*c*. For example, the first adhesive layer 313*b* and the second adhesive layer 313*c* can be one adhesive layer (or a single adhesive layer) configured to surround the vibrating part 311. For example, the first cover member 313*a* can be coupled to (or attached at) a first surface of one adhesive layer configured to surround the vibrating part 311. For example, the first surface of one adhesive layer can be a first surface of the first adhesive layer 313*b*.

The second adhesive layer 313*c* can be protected by a release paper (or a release film). For example, when the vibration apparatus 300 is connected to (or attached at) the vibration member, the release paper (or the release film) can be released (or removed) from the adhesive layer 301.

Figure 20:
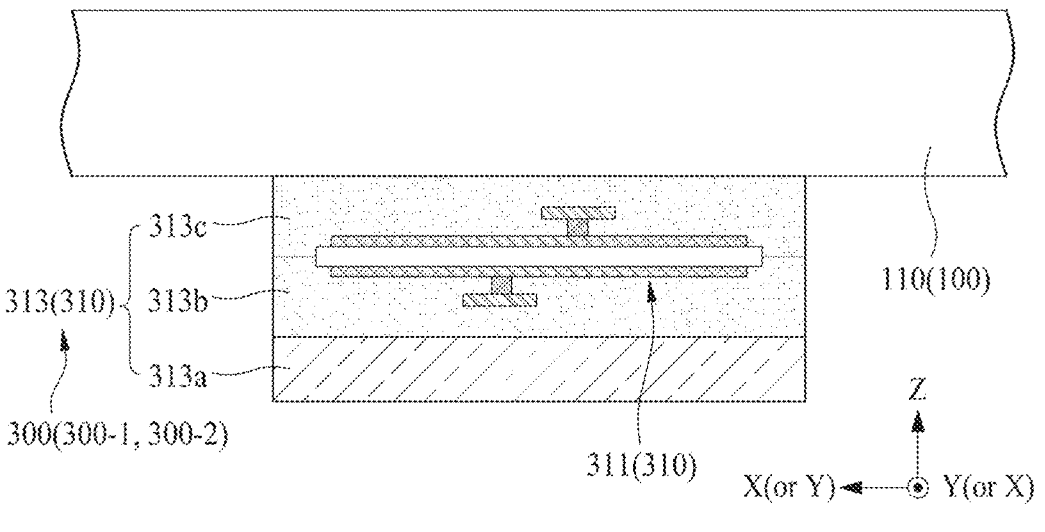
FIG. 20 illustrates a connection structure of the vibration apparatus and the vibration member described with reference to FIGS. 17 to 19.

The vibration apparatus 300 (or the first and second vibration apparatuses 300-1 and 300-2) according to an embodiment of the present disclosure can be connected to (or attached at) the rear surface of the vibration member 100 or the display panel 110 by the second adhesive layer 313*c*, as illustrated in FIG. 20. For example, the vibration apparatus 300 (or the first and second vibration apparatuses 300-1 and 300-2) according to an embodiment of the present disclosure can be directly connected to (or attached at) the rear surface of the vibration member 100 or the display panel 110 by the second adhesive layer 313*c*, without the connection member 400 illustrated in FIGS. 2 and 4. For example, the second adhesive layer 313*c* which is connected to (or attached at) the rear surface of the vibration member 100 or the display panel 110 can be a coupling layer or a connection layer.

The vibration apparatus 300 (or one or more vibration generators) according to an embodiment of the present disclosure can further include a signal cable 350.

The signal cable 350 can be configured to be electrically connected to the vibration generating part 310. The signal cable 350 can be configured to supply a driving signal supplied from the sound circuit board to the vibration generating part 310. The signal cable 350 can be configured to be electrically connected to the vibration part 311 at one side of the vibration generating part 310. The signal cable 350 can be configured to be electrically connected to the first electrode layer 311*b* and the second electrode layer 311*c* of the vibration part 311. For example, the signal cable 350 can be electrically connected to the sound circuit board 360 disposed at the rear surface of the rear cover 500 through the cable hole 511 configured at the rear cover 500, as illustrated in FIGS. 7 and 8.

A portion 350*a* of the signal cable 350 can be accommodated (or inserted) between the vibration part 311 and the cover member 313. An end portion (or a distal end portion or one side) 350*a* of the signal cable 350 can be disposed or inserted (or accommodated) between one periphery portion of the cover member 313 and one periphery portion of the vibration part 311. The one periphery portion of the cover member 313 and one periphery portion of the vibration part 311 can accommodate or vertically cover the end portion (or the distal end portion or one side) 350*a* of the signal cable 350. Accordingly, the signal cable 350 can be integrated into the vibration generating part 310. For example, the vibration apparatus 300 (or the first and second vibration apparatuses 300-1 and 300-2) according to an embodiment of the present disclosure can be a vibration apparatus in which the signal cable 350 is integrated.

The signal cable 350 according to an embodiment of the present disclosure can include a base member 351 and a plurality of signal lines 353*a* and 353*b*. For example, the signal cable 350 can include a base member 351, a first signal line 353*a*, and a second signal line 353*b*.

The base member 351 can include a transparent or opaque plastic material, but embodiments of the present disclosure are not limited thereto.

The first and second signal lines 353*a* and 353*b* can be disposed at a first surface of the base member 351 in parallel with a long-side length direction of the vibration generating part 310. The first and second signal lines 353*a* and 353*b* can be spaced apart from each other or electrically separated from each other. The first and second signal lines 353*a* and 353*b* can be disposed in parallel to each other at the first surface of the base member 351. For example, the end portions (or distal end portions or one sides) of the first and second signal lines 353*a* and 353*b* can be separated from each other, and thus, can be individually curved or bent.

The end portion (or distal end portion or one side) of the first signal line 353*a* can be electrically connected to the first electrode layer 311*b* of the vibration part 311. For example, the end portion of the first signal line 353*a* can be electrically connected to at least a portion of the first electrode layer 311*b* of the vibration part 311 at one periphery portion of the cover member 313. For example, the end portion of the first signal line 353*a* can be electrically connected to the first electrode layer 311*b* by a conductive double-sided tape. Accordingly, the first signal line 353*a* can supply a first driving signal, supplied from the sound circuit board, to the first electrode layer 311*b* of the vibration part 311.

The end portion (or distal end portion or one side) of the second signal line 353*b* can be electrically connected to the second electrode layer 311*c* of the vibration part 311. For example, the end portion of the second signal line 353*b* can be electrically connected to at least a portion of the second electrode layer 311*c* of the vibration part 311 at one periphery portion of the cover member 313. For example, the end portion of the second signal line 353*b* can be electrically connected to the second electrode layer 311*c* by a conductive double-sided tape. Accordingly, the second signal line 353*b* can supply a second driving signal, supplied from the sound circuit board, to the second electrode layer 311*c* of the vibration part 311.

The signal cable 350 according to an embodiment of the present disclosure can further include an insulation layer 355.

The insulation layer 355 can be disposed at the first surface of the base member 351 to cover each of the first signal line 353*a* and the second signal line 353*b* other than the end portion (or distal end portion or one side) of the signal cable 350.

The end portion (or one side) of the signal cable 350 including the end portion (or one side) of the base member 351 can be inserted (or accommodated) or fixed between the first surface of the vibration part 311 and the cover member 313. Accordingly, the end portion (or one side) of the first signal line 353*a* can be maintained with being electrically connected to the first electrode layer 311*b* of the vibration part 311, and the end portion (or one side) of the second signal line 353*b* can be maintained with being electrically connected to the second electrode layer 311*c* of the vibration part 311. Furthermore, the end portion (or the one side) of the signal cable 350 can be inserted (or accommodated) and fixed between the vibration part 311 and the cover member 313, and thus, a contact defect between the vibration generating part 310 and the signal cable 350 caused by the movement of the signal cable 350 can be prevented.

In the signal cable 350 according to an embodiment of the present disclosure, each of the end portion (or one side) of the base member 351 and an end portion (or one side) 355*a* of the insulation layer 355 can be removed. For example, the end portion of each of the first and second signal lines 353*a* and 353*b* can protrude (or extend) to have a certain length from each of an end 351*e* of the base member 351 and an end 355*e* of the insulation layer 355. Accordingly, the end portion (or distal end portion or one side) of each of the first and second signal lines 353*a* and 353*b* can be individually or independently curved (or bent).

The end portion (or one side) of the first signal line 353*a*, which is not supported by the end portion (or one side) of the base member 351 and the end portion 355*a* of the insulation layer 355, can be directly connected to or directly contact the first electrode layer 311*b* of the vibration part 311. The end portion (or one side) of the second signal line 353*b*, which is not supported by the end portion (or one side) of the base member 351 and the end portion (or one side) 355*a* of the insulation layer 355, can be directly connected to or directly contact the second electrode layer 311*c* of the vibration part 311.

According to an embodiment of the present disclosure, the portion 350*a* of the signal cable 350 can be disposed or inserted (or accommodated) between the vibration part 311 and the cover member 313, and thus, the signal cable 350 can be integrated into (or configured as one body with) the vibration generating part 310. Accordingly, the vibration generating part 310 and the signal cable 350 can be configured as one part (or one component), and thus, an effect of uni-materialization can be obtained.

According to the vibration apparatus 300 according to an embodiment of the present disclosure, the first signal line 353*a* and the second signal line 353*b* of the signal cable 350 can be integrated into (or configured as one body with) the vibration generating part 310, and thus, a soldering process for an electrical connection between the vibration generating part 310 and the signal cable 350 may not be needed. Accordingly, a manufacturing process and a structure of the vibration apparatus 300 (or first and second vibration apparatuses 300-1 and 300-2) can be simplified, and thus, a hazardous process can be reduced.

Figure 21:
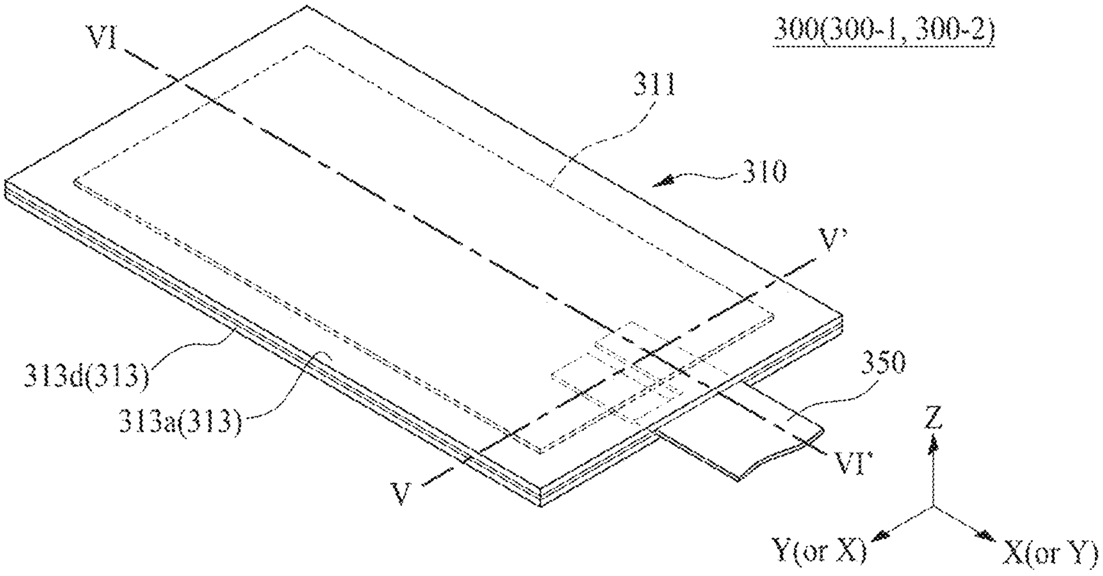
FIG. 21 is a perspective view illustrating a vibration apparatus according to another embodiment of the present disclosure.
Figure 22:
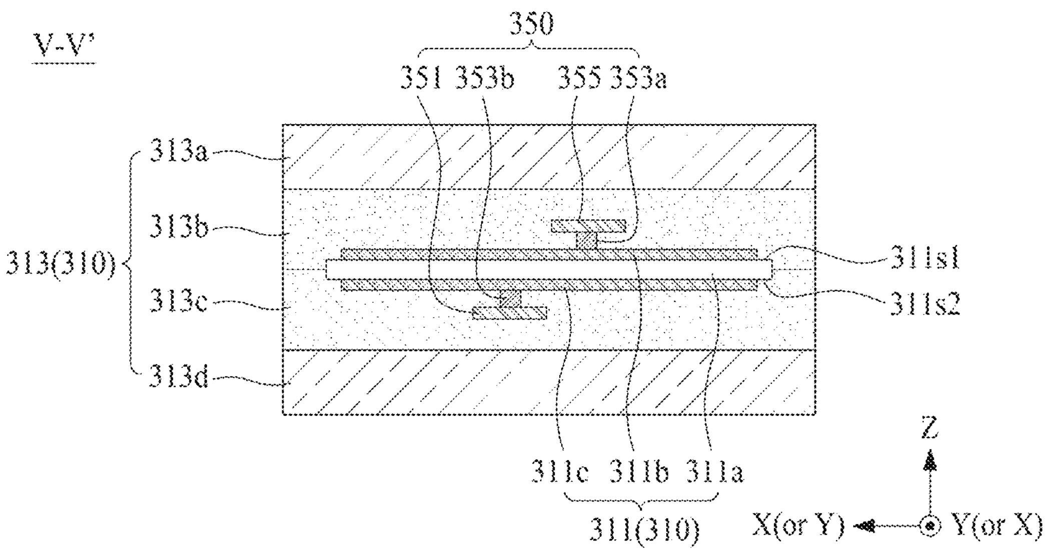
FIG. 22 is a cross-sectional view taken along line V-V' illustrated in FIG. 21.
Figure 23:
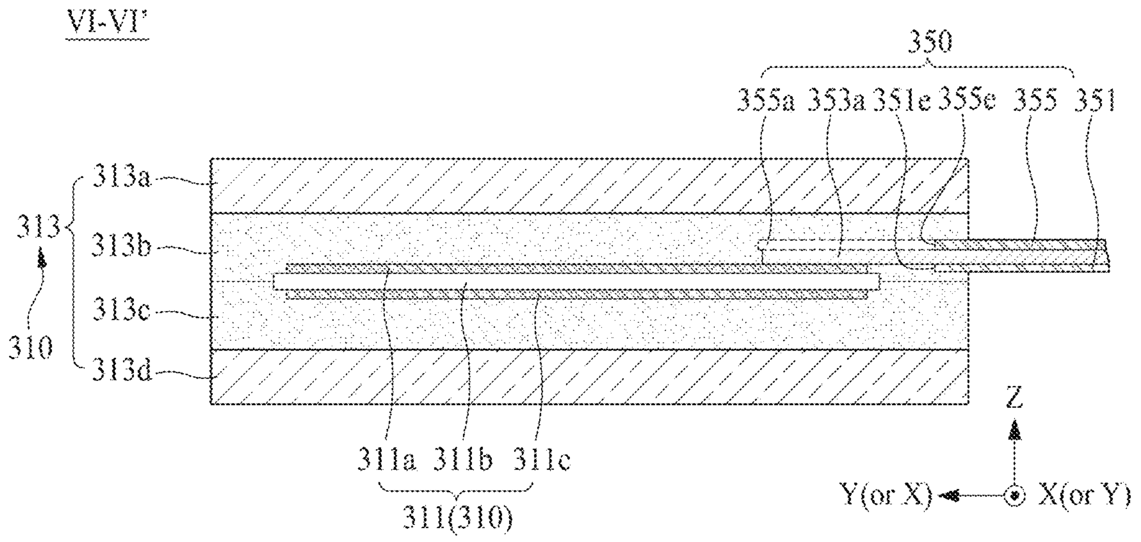
FIG. 23 is a cross-sectional view taken along line VI-VI' illustrated in FIG. 21.

FIG. 21 is a perspective view illustrating a vibration apparatus according to another embodiment of the present disclosure. FIG. 22 is a cross-sectional view taken along line V-V' illustrated in FIG. 21. FIG. 23 is a cross-sectional view taken along line VI-VI' illustrated in FIG. 21. Particularly, FIGS. 21 to 23 illustrate an embodiment where a second cover member is additionally configured at the apparatus described above with reference to FIGS. 17 to 20. In the following description, therefore, repeated descriptions of the other elements other than a second cover member and relevant elements thereto are omitted or may be briefly provided. Descriptions above with reference to FIGS. 17 to 20 can be included in descriptions of FIGS. 21 to 23.

With reference to FIGS. 21 to 23, in the vibration apparatus 300 (or first and second vibration apparatuses 300-1 and 300-2) according to another embodiment of the present disclosure, the cover member 313 can further include a second cover member 313*d*.

The second cover member 313*d* can be disposed at a second surface 311*s*2 of the vibration part 311. For example, the second cover member 313*d* can be configured to cover the second electrode layer 311*c* of the vibration part 311. For example, the second cover member 313*d* can be configured to have a size which is greater than the vibration part 311 and can be configured to have a same size as the first cover member 313*a*. The second cover member 313*d* can be configured to protect the second surface 311*s*2 of the vibration part 311 and the second electrode layer 311*c*. The vibration part 311 can be disposed or inserted (or accommodated) between the first cover member 313*a* and the second cover member 313*d*.

The second cover member 313*d* can be connected or coupled to the second surface 311*s*2 of the vibration part 311 by the second adhesive layer 313*c*. For example, the second cover member 313*d* can be connected or coupled to the second surface 311*s*2 of the vibration part 311 or the second electrode layer 311*c* by the second adhesive layer 313*c*. For example, the second cover member 313*d* can be connected or coupled to the second surface 311*s*2 of the vibration part 311 or the second electrode layer 311*c* by a film laminating process using the second adhesive layer 313*c*. The second adhesive layer 313*c* can be configured to surround an entire second surface 311*s*2 of the vibration part 311 and a portion of side surfaces of the vibration part 311.

The second cover member 313*d* according to an embodiment of the present disclosure can include one or more materials of plastic, fiber, cloth, paper, leather, carbon, and wood, but embodiments of the present disclosure are not limited thereto. For example, each of the first cover member 313*a* and the second cover member 313*d* can include a same material or different material. For example, each of the first cover member 313*a* and the second cover member 313*d* can be any one of a polyimide film, a polyethylene naphthalate, or a polyethylene terephthalate film, but embodiments of the present disclosure are not limited thereto. For example, the cover member 313 can include the first cover member 313*a*, the first adhesive layer 313*b*, the second adhesive layer 313*c*, and the second cover member 313*d*. For example, the cover member 313 can be a protection member, but embodiments of the present disclosure are not limited thereto.

Figure 24:
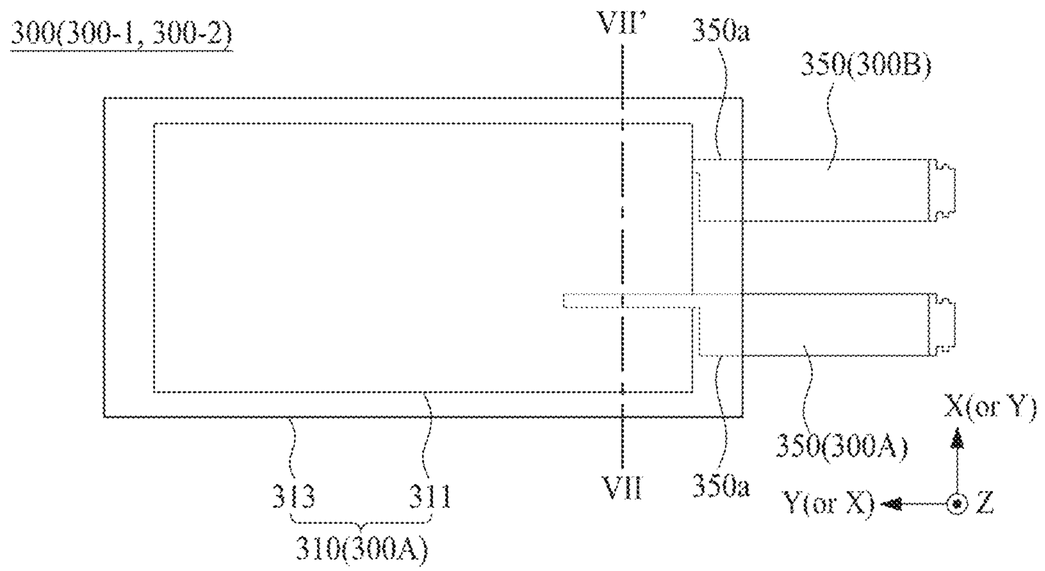
FIG. 24 illustrates a vibration apparatus according to another embodiment of the present disclosure.
Figure 25:
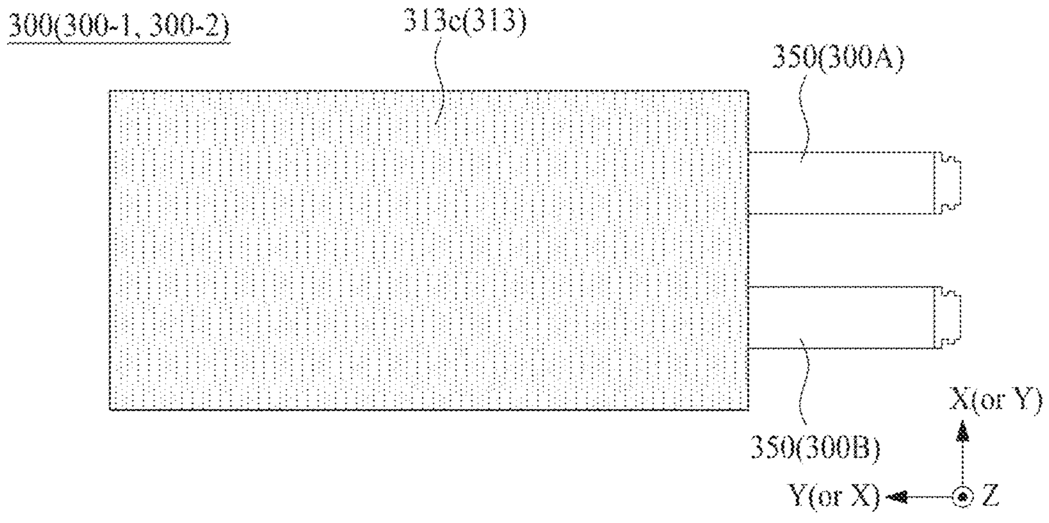
FIG. 25 is a rear view of a vibration apparatus according to another embodiment of the present disclosure illustrated in FIG. 24.
Figure 26:
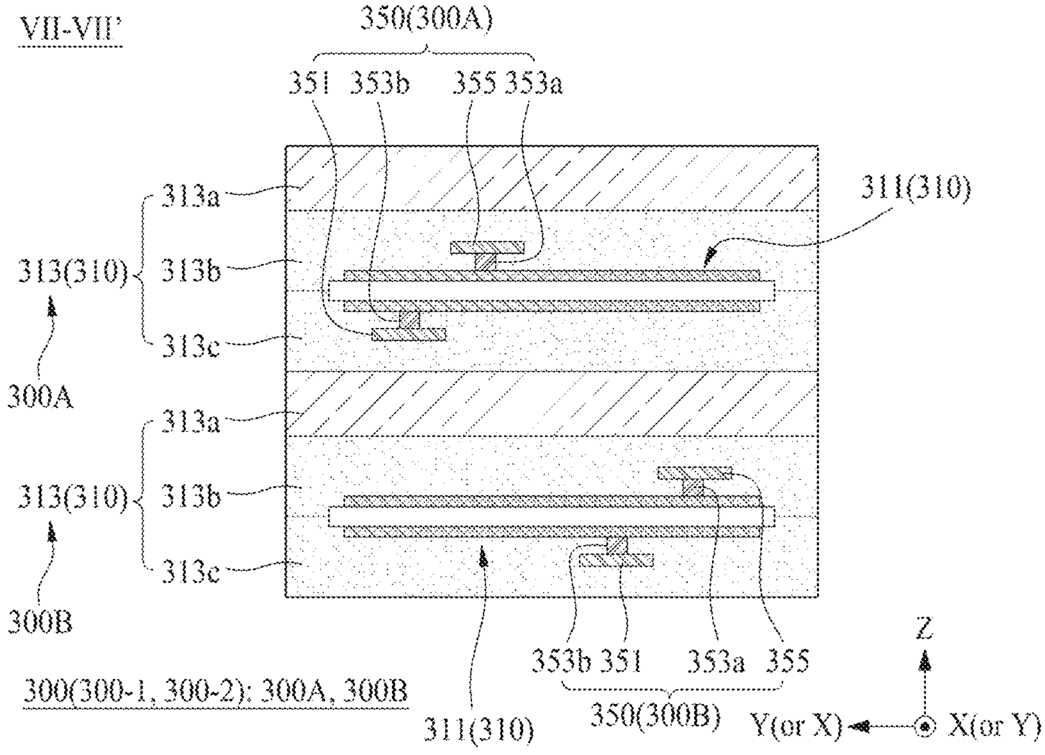
FIG. 26 is a cross-sectional view taken along line VII-VII' illustrated in FIG. 24.
Figure 27:
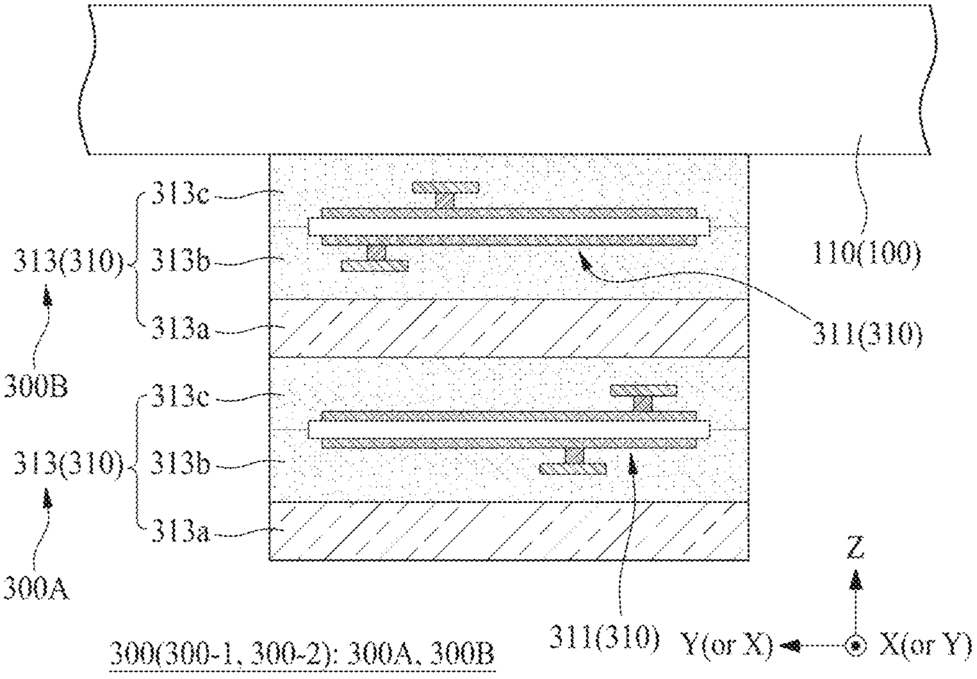
FIG. 27 illustrates a connection structure of the vibration apparatus and the vibration member described with reference to FIGS. 24 to 26.
Figure 28:
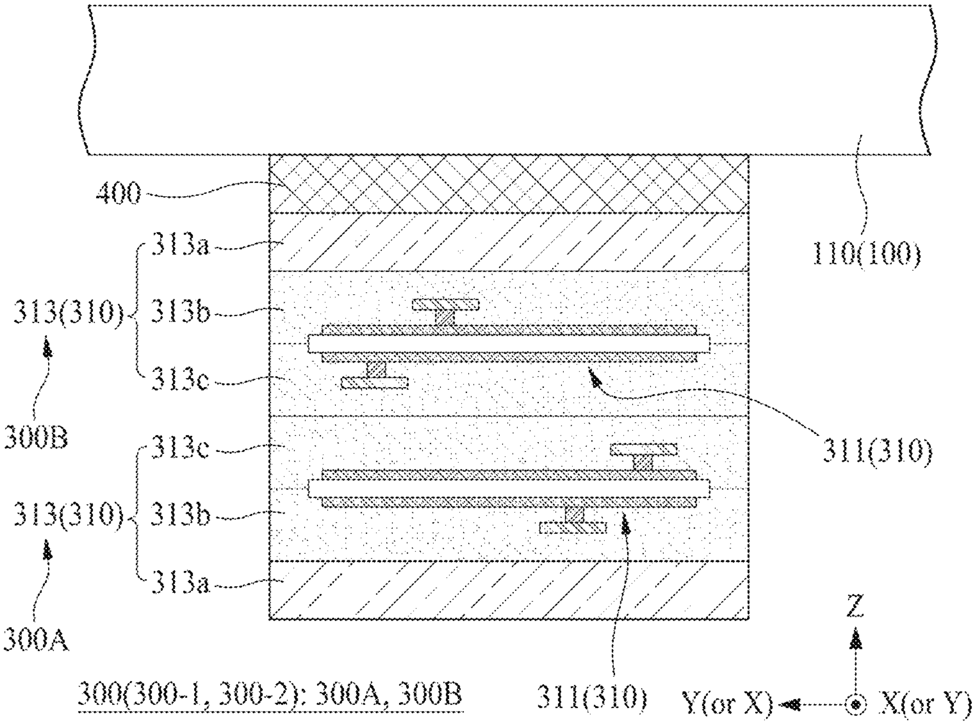
FIG. 28 illustrates another connection structure of the vibration apparatus and the vibration member described with reference to FIGS. 24 to 26.

FIG. 24 illustrates a vibration apparatus according to another embodiment of the present disclosure. FIG. 25 is a rear view of a vibration apparatus according to another embodiment of the present disclosure illustrated in FIG. 24. FIG. 26 is a cross-sectional view taken along line VII-VII' illustrated in FIG. 24. FIG. 27 illustrates a connection structure of the vibration apparatus and the vibration member described with reference to FIGS. 24 to 26. FIG. 28 illustrates another connection structure of the vibration apparatus and the vibration member described with reference to FIGS. 24 to 26.

With reference to FIGS. 24 to 26, the vibration apparatus 300 (or first and second vibration apparatuses 300-1 and 300-2) according to another embodiment of the present disclosure a plurality of vibration generators 300A and 300B.

The plurality of vibration generators 300A and 300B can overlap or be stacked with each other to be displaced (or driven or vibrated) in a same direction to maximize an amplitude displacement of the vibration apparatus 300 (or first and second vibration apparatuses 300-1 and 300-2) and/or an amplitude displacement of the vibration member 100. For example, the plurality of vibration generators 300A and 300B can have substantially a same size, but embodiments of the present disclosure are not limited thereto. For example, the plurality of vibration generators 300A and 300B can have substantially a same size within an error range of a manufacturing process, but embodiments of the present disclosure are not limited thereto. Therefore, the plurality of vibration generators 300A and 300B can maximize an amplitude displacement of the vibration apparatus 300 (or first and second vibration apparatuses 300-1 and 300-2) and/or an amplitude displacement of the vibration member 100.

According to an embodiment of the present disclosure, when at least one of the plurality of vibration generators 300A and 300B has a different size departing from an error range of a manufacturing process, the displacement directions and the amplitude displacements of each of the plurality of vibration generators 300A and 300B may not match with each other, and thus, the amplitude displacement of the vibration apparatus 300 (or first and second vibration apparatuses 300-1 and 300-2) may not be maximized. For example, when at least one of the plurality of vibration generators 300A and 300B is displaced in a different direction, the displacement directions of the plurality of vibration generators 300A and 300B may not match with each other, and thus, the amplitude displacement of the vibration apparatus 300 (or first and second vibration apparatuses 300-1 and 300-2) may not be maximized.

Each of the plurality of vibration generators 300A and 300B can include a vibration generating part 310. The vibration generating part 310 of each of the plurality of vibration generators 300A and 300B can include a vibration part 311 and a cover member 313. The vibration part 311 and the cover member 313 can be a same as or substantially a same as the vibration part 311 and the cover member 313 described above with reference to FIGS. 17 to 19, respectively, and are referred to by like reference numerals and repeated descriptions thereof are omitted.

Each of the plurality of vibration generators 300A and 300B can further include a signal cable 350. The signal cable 350 can be a same as or substantially a same as the signal cable 350 described above with reference to FIGS. 17 to 19, and are referred to by like reference numerals and repeated descriptions thereof are omitted.

Each of the plurality of vibration generators 300A and 300B can be vertically connected (or attached) by an adhesive layer (or a second adhesive layer 313*c*) configured at the cover member 313.

The vibration apparatus 300 (or first and second vibration apparatuses 300-1 and 300-2) according to another embodiment of the present disclosure a first vibration generator 300A and a second vibration generator 300B.

According to an embodiment of the disclosure, the first vibration generator 300A can be connected to (or attached at) the cover member 313 of the second vibration generator 300B. For example, the first cover member 313*a* of the second vibration generator 300B can be connected to (or attached at) the adhesive layer (or second adhesive layer 313*c* or an attachment surface or a panel attachment surface) of the first vibration generator 300A. For example, the adhesive layer 313*c* of the first vibration generator 300A can be protected by a release paper (or a release film). In this case, the vibration apparatus 300 (or first and second vibration apparatuses 300-1 and 300-2) according to another embodiment of the present disclosure can be connected to (or attached at) the rear surface of the vibration member 100 or the display panel 110 by the adhesive layer (or the second adhesive layer 313*c*) of the second vibration generator 300B, as illustrated in FIG. 27. For example, the vibration apparatus 300 (or first and second vibration apparatuses 300-1 and 300-2) according to another embodiment of the present disclosure can be directly connected to (or attached at) the rear surface of the vibration member 100 or the display panel 110 by the second adhesive layer 313*c* of the second vibration generator 300B, without the connection member 400 illustrated in FIGS. 2 and 4.

According to another embodiment of the disclosure, the adhesive layer (or the second adhesive layer 313*c*) of the first vibration generator 300A can be connected to (or attached at) the adhesive layer (or the second adhesive layer 313*c*) of the second vibration generator 300B. For example, the vibration part 311 of the first vibration generator 300A and the vibration part 311 of the second vibration generator 300B can be disposed (or configured) between the first cover member 313*a* of the first vibration generator 300A and the first cover member 313*a* of the second vibration generator 300B, and can be protected by the first cover member 313*a* of the first vibration generator 300A and the first cover member 313*a* of the second vibration generator 300B. In this case, the vibration apparatus 300 (or first and second vibration apparatuses 300-1 and 300-2) according to another embodiment of the present disclosure can be connected to (or attached at) the rear surface of the vibration member 100 or the display panel 110 by the connection member 400, as illustrated in FIG. 28.

Figure 29:
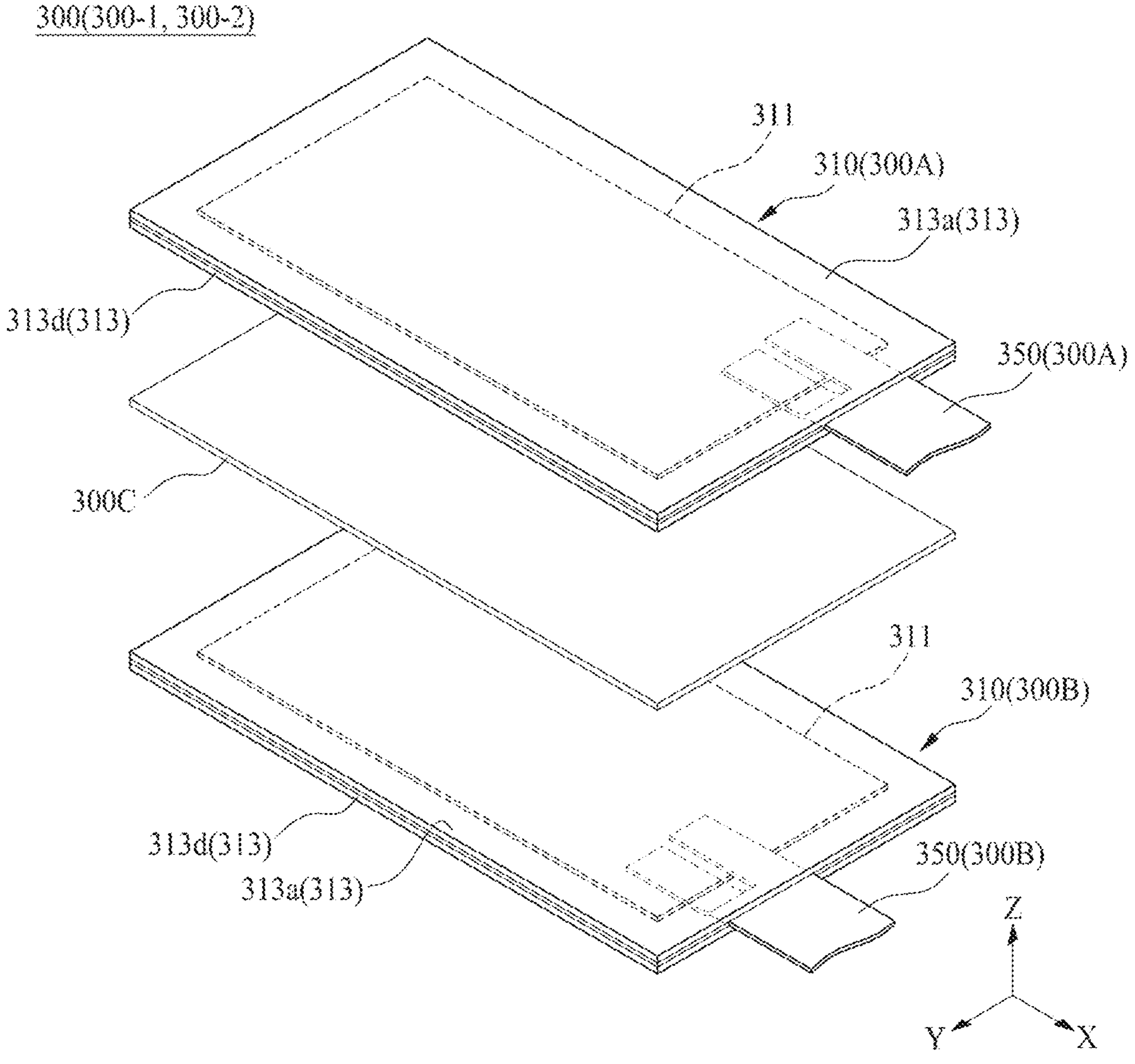
FIG. 29 is a perspective view illustrating a vibration apparatus according to another embodiment of the present disclosure.

FIG. 29 is a perspective view illustrating a vibration apparatus according to another embodiment of the present disclosure.

With reference to FIG. 29, the vibration apparatus 300 according to another embodiment of the present disclosure a plurality of vibration generators 300A and 300B, and an adhesive member 300C.

The plurality of vibration generators 300A and 300B can overlap or be stacked with each other to be displaced (or driven or vibrated) in a same direction to maximize an amplitude displacement of the vibration apparatus 300 (or first and second vibration apparatuses 300-1 and 300-2) and/or an amplitude displacement of the vibration member 100. For example, the plurality of vibration generators 300A and 300B can have substantially a same size, but embodiments of the present disclosure are not limited thereto. For example, the plurality of vibration generators 300A and 300B can have substantially a same size within an error range of a manufacturing process, but embodiments of the present disclosure are not limited thereto. Therefore, the plurality of vibration generators 300A and 300B can maximize an amplitude displacement of the vibration apparatus 300 (or first and second vibration apparatuses 300-1 and 300-2) and/or an amplitude displacement of the vibration member 100.

Each of the plurality of vibration generators 300A and 300B can include a vibration generating part 310. The vibration generating part 310 of each of the plurality of vibration generators 300A and 300B can include a vibration part 311 and a cover member 313. The vibration part 311 and the cover member 313 can be a same as or substantially a same as the vibration part 311 and the cover member 313 described above with reference to FIGS. 21 to 23, respectively, and are referred to by like reference numerals and repeated descriptions thereof are omitted.

Each of the plurality of vibration generators 300A and 300B can further include a signal cable 350. The signal cable 350 can be a same as or substantially a same as the signal cable 350 described above with reference to FIGS. 21 to 23, and are referred to by like reference numerals and repeated descriptions thereof are omitted.

Each of the plurality of vibration generators 300A and 300B can be vertically connected (or attached) by the adhesive member 300C. The adhesive member 300C can be disposed between the plurality of vibration generators 300A and 300B. For example, the adhesive member 300C can be disposed or connected between the cover member 313 of each of the plurality of vibration generators 300A and 300B.

The vibration apparatus 300 (or first and second vibration apparatuses 300-1 and 300-2) according to another embodiment of the present disclosure can include two or more vibration generators 300A and 300B which are stacked to be displaced in a same direction. In the following description, an example where vibration apparatus 300 (or first and second vibration apparatuses 300-1 and 300-2) includes first and second vibration generators 300A and 300B will be described.

The adhesive member 300C can be disposed or connected between the first vibration generator 300A and the second vibration generator 300B. For example, the adhesive member 300C can be disposed or connected between the cover member 313 of the first vibration generator 300A and the cover member 313 of the second vibration generator 300B.

For example, the adhesive member 300C can be disposed or connected between the second cover member 313*d* of the first vibration generator 300A and the first cover member 313*a* of the second vibration generator 300B. For example, the adhesive member 300C can be an intermediate member, an intermediate adhesive member, an insulating member, or an insulating adhesive member, but embodiments of the present disclosure are not limited thereto.

The adhesive member 300C according to an embodiment of the present disclosure can be configured as a material including an adhesive layer which is good in attaching force or adhesive force, with respect to each of the plurality of vibration generators 300A and 300B. For example, the adhesive member 300C can include a double-sided tape, a double-sided foam tape, a double-sided foam pad, an adhesive, or the like, but embodiments of the present disclosure are not limited thereto. For example, an adhesive layer of the adhesive member 300C can include epoxy, acrylic, silicone, or urethane, but embodiments of the present disclosure are not limited thereto.

The adhesive layer of the adhesive member 300C according to an embodiment of the present disclosure can include a urethane-based material (or substance) having relatively ductile characteristic than the acrylic-based material. Accordingly, the vibration loss within the vibration apparatus 300 (or first and second vibration apparatuses 300-1 and 300-2) caused by displacement interference between the plurality of vibration generators 300A and 300B can be minimized, or each of the plurality of vibration generators 300A and 300B can be freely displaced (or vibrated or driven).

The vibration apparatus 300 (or first and second vibration apparatuses 300-1 and 300-2) according to another embodiment of the present disclosure can be connected to (or attached at) the rear surface of the vibration member 100 or the display panel 110 by the connection member 400, as illustrated in FIGS. 2, 4, and 5. For example, in the vibration apparatus 300 (or first and second vibration apparatuses 300-1 and 300-2), the first cover member 313*a* of the first vibration generator 300A or the second cover member 313*d* of the second vibration generator 300B can be connected to (or attached at) the rear surface of the vibration member 100 or the display panel 110 by the connection member 400.

The vibration apparatus 300 (or first and second vibration apparatuses 300-1 and 300-2) according to another embodiment of the present disclosure can include the plurality of vibration generators 300A and 300B which are stacked to vibrate (or displace or drive) in a same direction, and thus, the amount of displacement and/or an amplitude displacement can be maximized or increased. Accordingly, the amount of displacement (or a bending force) or an amplitude displacement of a vibration member 100 can be maximized or increased.

Figure 30A:
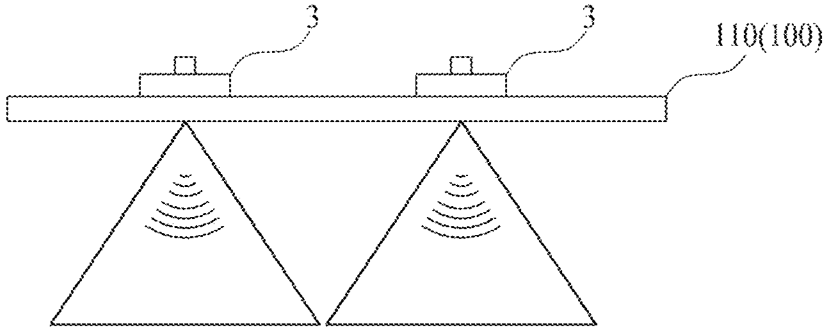
FIG. 30A illustrates an orientation of a sound output from an apparatus according to an experimental example.
Figure 30B:
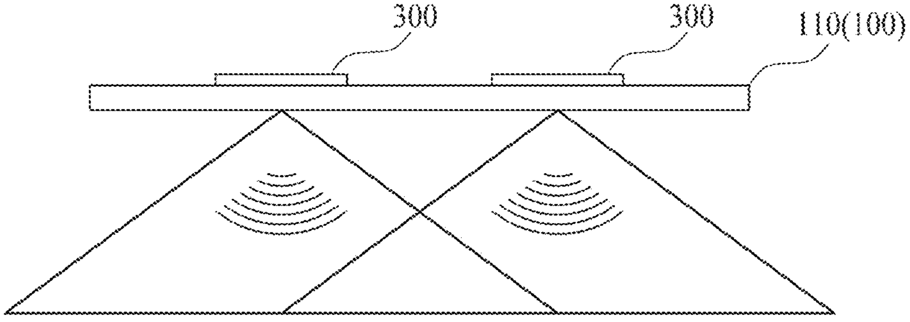
FIG. 30B illustrates an orientation of a sound output from an apparatus according to an embodiment of the present disclosure.

FIG. 30A illustrates an orientation of a sound output from an apparatus (for example, a display apparatus) according to an experimental example. FIG. 30B illustrates an orientation of a sound output from an apparatus (for example, a display apparatus) according to an embodiment of the present disclosure.

The apparatus (for example, a display apparatus) according to the experimental example can output a sound, based on a vibration of a vibration member 100 (for example, a display panel 110) based on a vibration of an actuator 3 including a coil and a magnet connected to a rear surface of a vibration member 100 (for example, a display panel 110). The apparatus (for example, a display apparatus) according to an embodiment of the present disclosure can output a sound, based on a vibration of a vibration member 100 (for example, a display panel 110) based on a vibration of a film-type vibration apparatus including a piezoelectric material connected to a rear surface of a vibration member 100 (for example, a display panel 110).

With reference to FIGS. 30A and 30B, comparing with the apparatus according to the experimental example, it can be seen that the apparatus according to an embodiment of the present disclosure has a wide sound orientation angle. Accordingly, the apparatus according to an embodiment of the present disclosure can include the film-type vibration apparatus including the piezoelectric material, thereby implementing an immersive sound.

Figure 31A:
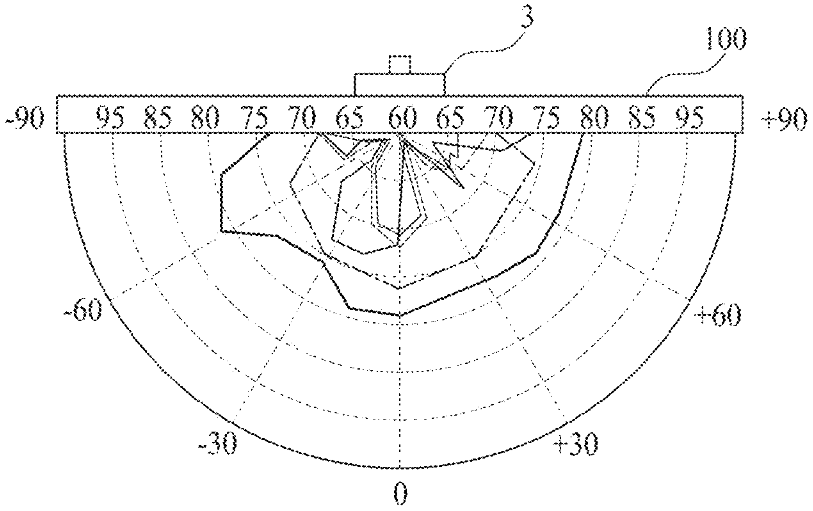
FIG. 31A illustrates a sound pressure level characteristic based on beamforming of a sound output from the apparatus according to the experimental example described above with reference to FIG. 30A.
Figure 31B:
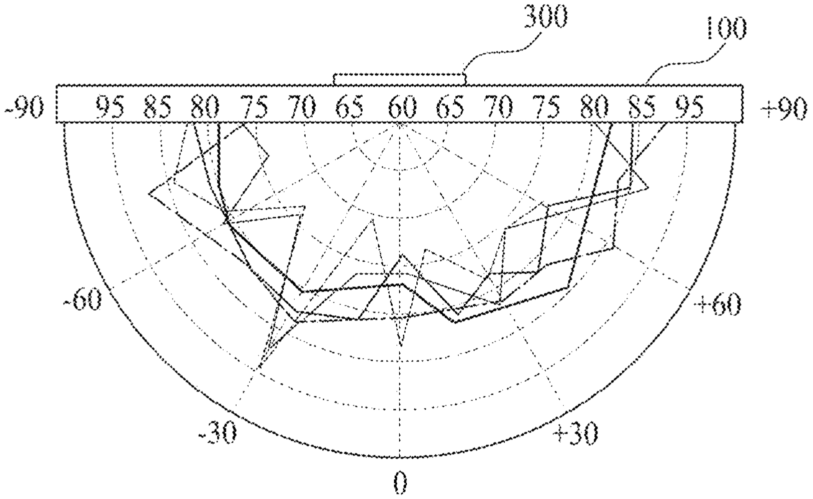
FIG. 31B illustrates a sound pressure level characteristic based on beamforming of a sound output from the apparatus according to an embodiment of the present disclosure described above with reference to FIG. 30B.

FIG. 31A illustrates a sound pressure level characteristic based on beamforming of a sound output from the apparatus (for example, a display apparatus) according to the experimental example described above with reference to FIG. 30A. FIG. 31B illustrates a sound pressure level characteristic based on beamforming of a sound output from the apparatus (for example, a display apparatus) according to an embodiment of the present disclosure described above with reference to FIG. 30B.

In each of FIGS. 31A and 31B, a thick solid line represents a sound pressure level characteristic of a sound having a frequency of 1 kHz, a dash-single dotted line represents a sound pressure level characteristic of a sound having a frequency of 5 kHz, a solid line represents a sound pressure level characteristic of a sound having a frequency of 8 kHz, a thin solid line represents a sound pressure level characteristic of a sound having a frequency of 10 kHz, and a thin dotted line represents a sound pressure level characteristic of a sound having a frequency of 12 kHz.

With reference to FIGS. 31A and 31B, comparing with the apparatus according to the experimental example, it can be seen that the apparatus according to an embodiment of the present disclosure has a wide sound orientation angle and a relatively high sound pressure level with respect to a frequency of each of 1 kHz, 5 kHz, 8 kHz, 10 kHz, and 12 kHz.

Figure 32A:
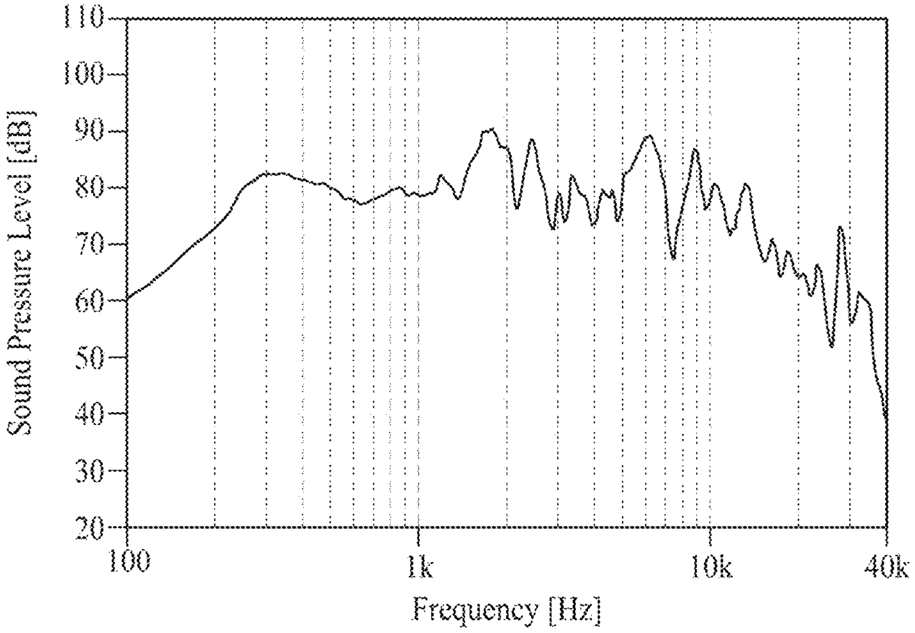
FIG. 32A illustrates a sound output characteristic of the apparatus according to the experimental example described above with reference to FIG. 30A.
Figure 32B:
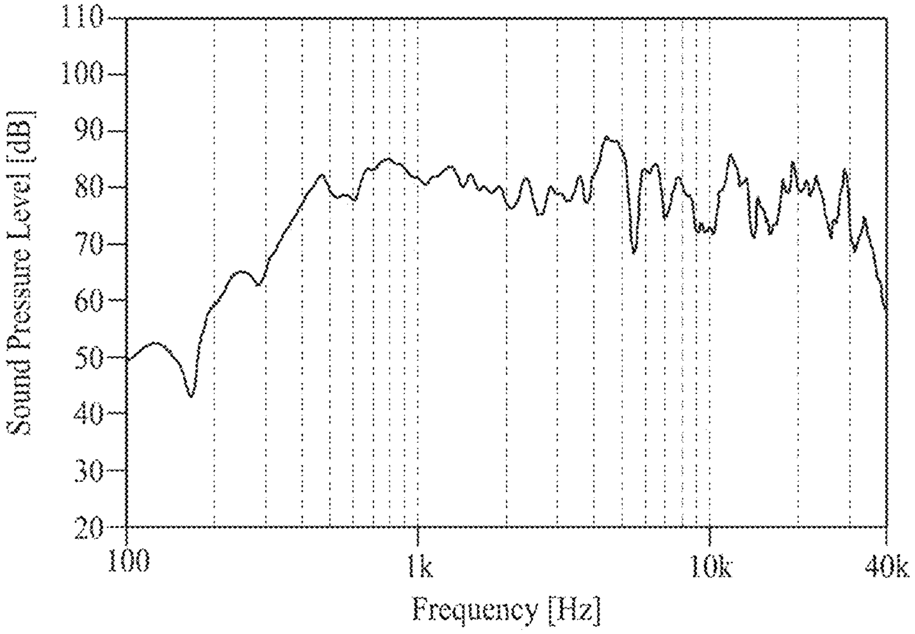
FIG. 32B illustrates a sound output characteristic of the apparatus according to an embodiment of the present disclosure described above with reference to FIG. 30B.

FIG. 32A illustrates a sound output characteristic of the apparatus (for example, the display apparatus) according to the experimental example described above with reference to FIG. 30A. FIG. 32B illustrates a sound output characteristic of the apparatus (for example, the display apparatus) according to an embodiment of the present disclosure described above with reference to FIG. 30B. In FIGS. 32A and 32B, the abscissa axis represents a frequency (hertz (Hz)), and the ordinate axis represents a sound pressure level (SPL) (decibel (dB)).

With reference to FIGS. 32A and 32B, comparing with the apparatus according to the experimental example, it can be seen that the apparatus according to an embodiment of the present disclosure has a high sound pressure level in a high-pitched sound band of 10 kHz to 40 kHz, and a difference between a highest sound pressure level and a lowest sound pressure level is small. Accordingly, the apparatus according to an embodiment of the present disclosure can reproduce a high sound approximate to high-resolution of high frequency range (Hi-Res) standard. For example, the Hi-Res standard can be a sound pressure level of 40 kHz or less.

Figure 33:
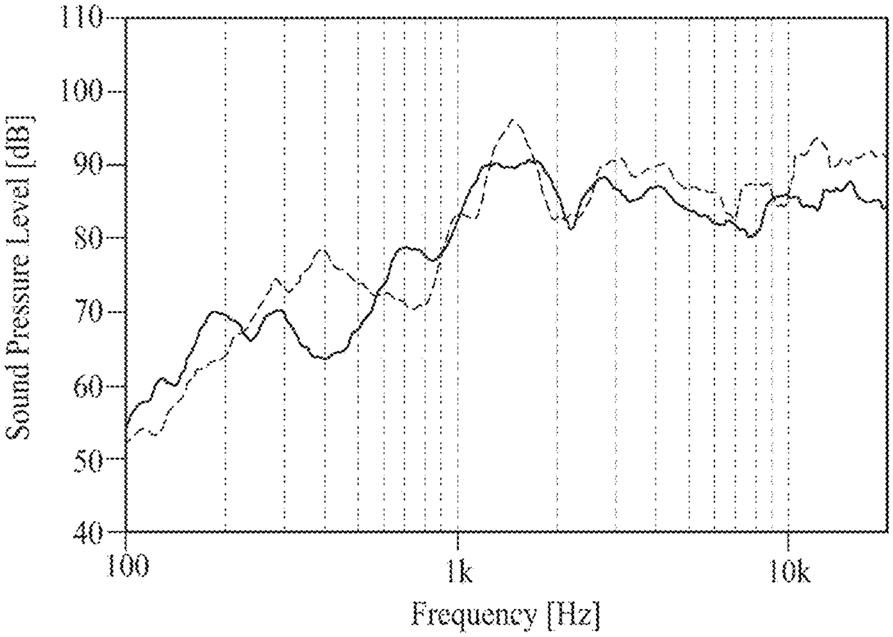
FIG. 33 illustrates a sound output characteristic of an apparatus according to first and second experimental examples.

FIG. 33 illustrates a sound output characteristic of an apparatus (for example, a display apparatus) according to first and second experimental examples. The apparatus according to the first experimental example includes a vibration apparatus, which has a stack structure of first and second vibration generators described above with reference to FIG. 29 and is connected to a rear surface of a vibration member (or a display panel), and a rear cover which does not include a hole part overlapping the vibration apparatus. The apparatus according to the second experimental example includes a vibration apparatus, which includes one vibration generator described above with reference to FIG. 21 and is connected to a rear surface of a vibration member (or a display panel), and a rear cover which does not include a hole part overlapping the vibration apparatus. In FIG. 33, a dotted line represents a sound output characteristic of the apparatus according to the first experimental example, and a solid line represents a sound output characteristic of the apparatus according to the second experimental example. In FIG. 33, the abscissa axis represents a frequency (hertz (Hz)), and the ordinate axis represents a sound pressure level (SPL) (decibel (dB)).

With reference to FIG. 33, comparing with the apparatus according to the first experimental example, it can be seen that the apparatus according to the second experimental example has a low sound pressure level in a-pitched sound band of about 120 Hz to 680 Hz.

Figure 34:
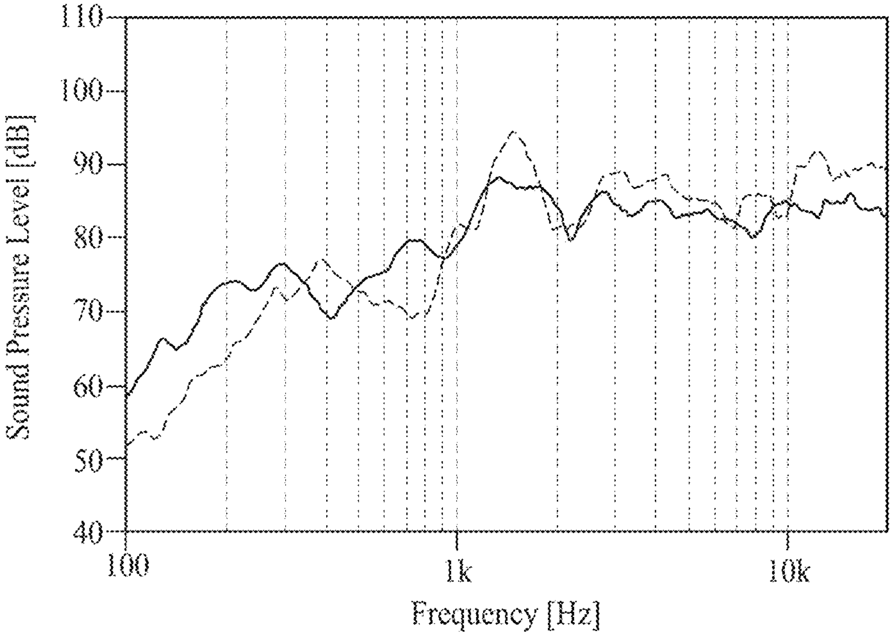
FIG. 34 illustrates a sound output characteristic of the apparatus according to the first experimental example described above with reference to FIG. 33 and a sound output characteristic of the apparatus according to an embodiment of the present disclosure.

FIG. 34 illustrates a sound output characteristic of the apparatus (for example, the display apparatus) according to the first experimental example described above with reference to FIG. 33 and a sound output characteristic of the apparatus (for example, the display apparatus) according to an embodiment of the present disclosure. In FIG. 34, a dotted line represents a sound output characteristic of the apparatus according to the first experimental example, and a solid line represents a sound output characteristic of the apparatus according to an embodiment of the present disclosure including a plurality of holes which are configured in a rear cover to have a hole aperture ratio of 33%. Further, the abscissa axis represents a frequency (hertz (Hz)), and the ordinate axis represents a sound pressure level (SPL) (decibel (dB)).

With reference to FIG. 34, comparing with the apparatus according to the first experimental example, it can be seen that the apparatus according to an embodiment of the present disclosure has a high sound pressure level in a-pitched sound band of about 350 Hz or less and 500 Hz to 900 Hz. Further, comparing with the apparatus according to the second experimental example illustrated in FIG. 33, it can be seen that the apparatus according to an embodiment of the present disclosure has a high sound pressure level in a-pitched sound band of about 600 Hz or less. Accordingly, in a case where a bent hole is configured in a rear cover overlapping a vibration apparatus, it can be seen that a sound pressure level characteristic is improved in a low-pitched sound band (for example, a-pitched sound band of about 600 Hz or less).

Figure 35:
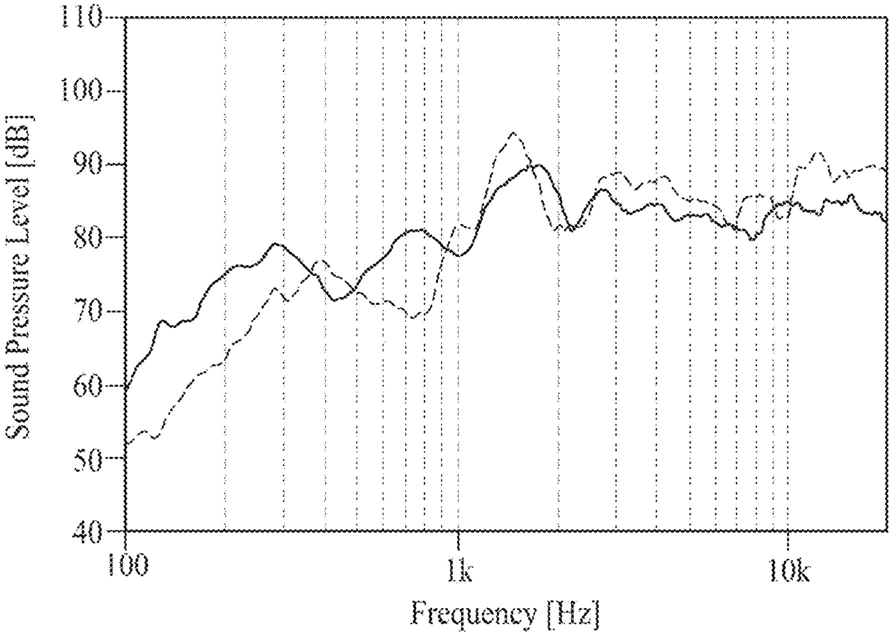
FIG. 35 illustrates a sound output characteristic of the apparatus according to the first experimental example described above with reference to FIG. 33 and a sound output characteristic of the apparatus according to another embodiment of the present disclosure.

FIG. 35 illustrates a sound output characteristic of the apparatus (for example, the display apparatus) according to the first experimental example described above with reference to FIG. 33 and a sound output characteristic of the apparatus (for example, the display apparatus) according to another embodiment of the present disclosure. In FIG. 35, a dotted line represents a sound output characteristic of the apparatus according to the first experimental example, and a solid line represents a sound output characteristic of the apparatus according to an embodiment of the present disclosure including a plurality of holes which are configured in a rear cover to have a hole aperture ratio of 66%. Further, the abscissa axis represents a frequency (hertz (Hz)), and the ordinate axis represents a sound pressure level (SPL) (decibel (dB)).

With reference to FIG. 35, comparing with the apparatus according to the first experimental example, it can be seen that the apparatus according to another embodiment of the present disclosure has a high sound pressure level in a-pitched sound band of about 370 Hz or less and 500 Hz to 900 Hz. Further, comparing with the apparatus according to the second experimental example illustrated in FIG. 33, it can be seen that the apparatus according to another embodiment of the present disclosure has a high sound pressure level in a-pitched sound band of about 900 Hz or less. Moreover, comparing with the apparatus according to an embodiment of the present disclosure illustrated in FIG. 34, it can be seen that the apparatus according to another embodiment of the present disclosure has a high sound pressure level in a-pitched sound band of about 950 Hz or less.

Accordingly, in a case where a bent hole is configured in a rear cover overlapping a vibration apparatus, it can be seen that a sound pressure level characteristic is improved in a low-pitched sound band (for example, a-pitched sound band of about 900 Hz or less).

As seen in FIGS. 33 to 35, comparing with the apparatus according to each of the first and second experimental examples where a bent hole is not configured, a sound pressure level of a sound output from an apparatus according to one or more embodiments of the present disclosure can increase as a hole aperture ratio of a bent hole configured in a rear cover increases, and a sound characteristic and/or a sound pressure level characteristic of a middle-low-pitched sound band can be enhanced. For example, in the apparatus according to one or more embodiments of the present disclosure, a plurality of holes configured in the rear cover can be configured to have a hole aperture ratio of 33%.

Figure 36:
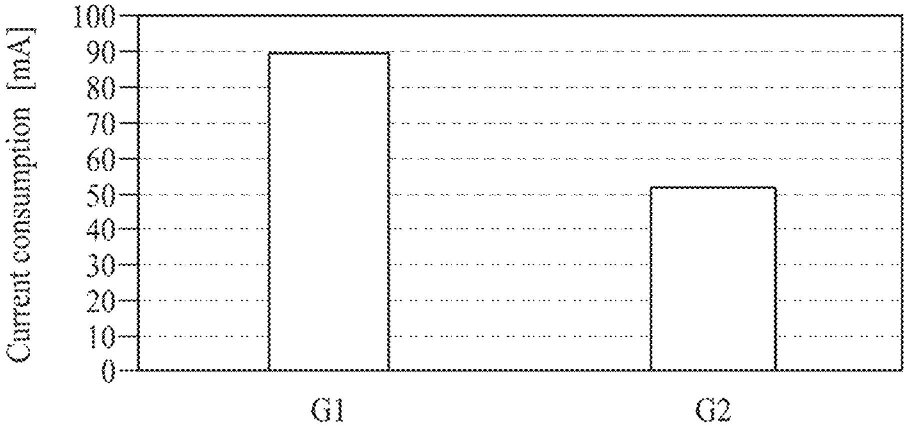
FIG. 36 illustrates a current consumption of an apparatus according to an experimental example and a current consumption of an apparatus according to an embodiment of the present disclosure.

FIG. 36 illustrates a current consumption of an apparatus according to an experimental example and a current consumption (mA) of an apparatus according to an embodiment of the present disclosure. In FIG. 36, G1 represents the current consumption of the apparatus according to the experimental example, and G2 represents the current consumption of the apparatus according to an embodiment of the present disclosure. The experimental example represents a current consumption of the apparatus described above with reference to FIG. 30A. Current consumption has been measured when outputting a sound having the same sound pressure level in the apparatus according to the experimental example and the apparatus according to an embodiment of the present disclosure.

With reference to FIG. 36, the current consumption of the apparatus according to the experimental example has been measured to be 90 mA, and the current consumption of the apparatus according to an embodiment of the present disclosure has been measured to be 51.3 mA. Therefore, the apparatus according to an embodiment of the present disclosure can include the film-type vibration apparatus, and thus, can have current consumption which is less than that of the apparatus according to the experimental example configured with an actuator including a magnet and a coil. Accordingly, when outputting a sound having the same sound pressure level, it can be seen that the apparatus according to an embodiment of the present disclosure decreases by about half of current consumption compared to the apparatus according to the experimental example.

Figure 37A:
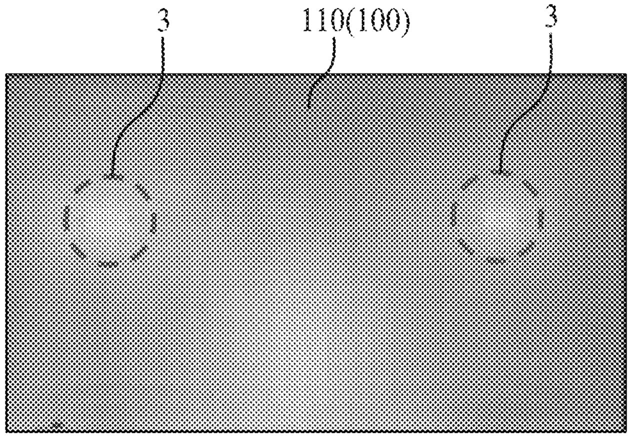
FIG. 37A illustrates a front temperature of a vibration member when outputting a sound in an apparatus according to an experimental example.
Figure 37B:
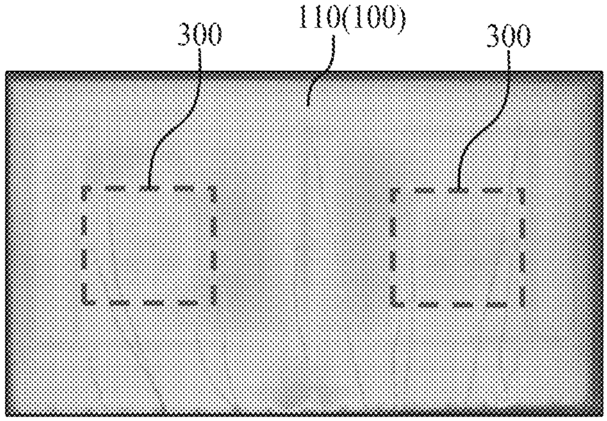
FIG. 37B illustrates a front temperature of a vibration member when outputting a sound in an apparatus according to an embodiment of the present disclosure.

FIG. 37A illustrates a front temperature of a vibration member when outputting a sound in an apparatus according to an experimental example. FIG. 37B illustrates a front temperature of a vibration member when outputting a sound in an apparatus according to an embodiment of the present disclosure. In temperature measurement, an actuator 3 of the apparatus according to the experimental example and a vibration apparatus 300 of the apparatus according to an embodiment of the present disclosure have been equally driven with 4 W (watt).

With reference to FIG. 37A, in the apparatus according to the experimental example, a temperature in a region of a vibration member 100 (or a display panel 110) overlapping the actuator 3 including the magnet and the coil has been output at 35.3° C. when the actuator 3 is turned off. Accordingly, in the apparatus according to the experimental example, it has been measured that a temperature increases by about 1.7° C. when outputting a sound.

With reference to FIG. 37B, in the apparatus according to an embodiment of the present disclosure, a temperature in a region of a vibration member 100 (or a display panel 110) overlapping a film-type vibration apparatus 300 has been output at 38.0° C. when the vibration apparatus 300 is turned off and has been output at 38.6° C. when the vibration apparatus 300 is turned on. Accordingly, in the apparatus according to an embodiment of the present disclosure, it has been measured that a temperature increases by about 0.6° C. when outputting a sound.

Therefore, when outputting a sound having the same sound pressure level, the apparatus according to an embodiment of the present disclosure can be lower in temperature increase rate of the vibration member 100 (or the display panel 110) than the apparatus according to the experimental example, and thus, can have an effect of improving a temperature. Further, the apparatus according to an embodiment of the present disclosure can prevent an increase in temperature caused by driving of the vibration apparatus 300 (or display panel 110) because an air gap between the vibration member 100 (or the display panel 110) and the rear cover is maintained, thereby minimizing or preventing a degradation in image quality caused by an increase in temperature.

An apparatus according to one or more embodiments of the present disclosure is described below.

An apparatus according to one or more embodiments of the present disclosure can comprise a vibration member, a vibration apparatus connected to a rear surface of the vibration member, and a rear cover covering a rear surface of the vibration apparatus. The rear cover can comprise a hole part including a plurality of holes overlapping the vibration apparatus. A size of the hole part can be greater than a size of the vibration apparatus.

According to one or more embodiments of the present disclosure, the vibration member can generate a sound based on a vibration of the vibration apparatus. The sound can be output in a forward direction of the vibration member and can be output in a rearward direction of the rear cover through the hole part.

According to one or more embodiments of the present disclosure, the apparatus can further comprise a gap space provided between the vibration member and the rear cover. The gap space can be connected to a rear space of the rear cover through the hole part.

According to one or more embodiments of the present disclosure, the apparatus can further comprise a connection member configured between the vibration member and the rear cover to provide the gap space.

According to one or more embodiments of the present disclosure, the connection member can comprise one or more protrusion parts. The one or more protrusion parts can protrude from a lateral surface of the connection member to the gap space.

According to one or more embodiments of the present disclosure, the rear cover can comprise a first rear cover covering the rear surface of the vibration apparatus, and a second rear cover covering a rear surface of the first rear cover. The hole part can be configured at the first rear cover and the second rear cover.

According to one or more embodiments of the present disclosure, the hole part can comprise a first hole part including a plurality of first holes configured at the first rear cover, and a second hole part including a plurality of second holes configured at the second rear cover to overlap the first hole part.

According to one or more embodiments of the present disclosure, some of the plurality of first holes can overlap the vibration apparatus, and the other of the plurality of first holes can overlap the vibration member at a periphery of the vibration apparatus.

According to one or more embodiments of the present disclosure, the apparatus can further comprise a gap space provided between the vibration member and the rear cover. The gap space can be connected to a rear space of the rear cover through the first hole part and the second hole part.

According to one or more embodiments of the present disclosure, the rear cover can further comprise a connection frame configured to provide an air gap between the first rear cover and the second rear cover. The air gap can be between the first hole part and the second hole part.

According to one or more embodiments of the present disclosure, the apparatus can further comprise a sound circuit board disposed at a rear surface of the second rear cover and electrically connected to the vibration apparatus through a signal cable. The second rear cover can comprise a flat portion parallel to the first rear cover, and a stiff portion protruding from the flat portion. The sound circuit board can be disposed at the stiff portion spaced apart from the first rear cover with the air gap therebetween.

According to one or more embodiments of the present disclosure, the apparatus can further comprise a pad member configured between the rear surface of the vibration apparatus and the hole part of the rear cover.

According to one or more embodiments of the present disclosure, the pad member can overlap some of the plurality of holes and can be spaced apart from the rear cover or contacts the rear cover.

According to one or more embodiments of the present disclosure, the vibration apparatus can comprise a first area and a second area. The pad member can comprise a first pad member at the first area of the vibration apparatus, and a second pad member at the second area of the vibration apparatus.

According to one or more embodiments of the present disclosure, the first pad member can have a size, which is smaller than a size of the first area of the vibration apparatus, and can be disposed at a center portion of the first area of the vibration apparatus.

According to one or more embodiments of the present disclosure, the pad member can comprise an elastic material having stiffness which is less than a bending stiffness of the vibration apparatus.

According to one or more embodiments of the present disclosure, the apparatus can further comprise a plate disposed at a rear surface of the vibration member adjacent to one side of the vibration apparatus. The rear cover can further comprise a cable hole configured to be adjacent to the hole part. The plate can overlap the cable hole and can be spaced apart from the cable hole.

According to one or more embodiments of the present disclosure, the vibration apparatus can comprise a vibration generating part including a piezoelectric material, and a signal cable electrically connected to the vibration generating part.

According to one or more embodiments of the present disclosure, the apparatus can further comprise a plate disposed at the rear surface of the vibration member to overlap the signal cable. The rear cover can further comprise a cable hole through which the signal cable passes. The plate can overlap the cable hole and can be spaced apart from the cable hole.

According to one or more embodiments of the present disclosure, the vibration generating part can comprise a vibration part including a piezoelectric material, and a cover member configured to cover the vibration part.

According to one or more embodiments of the present disclosure, a portion of the signal cable can be accommodated between the vibration part and the cover member.

According to one or more embodiments of the present disclosure, the cover member can comprise a first cover member disposed at a first surface of the vibration part, a first adhesive layer between the first surface of the vibration part and the first cover member, and a second adhesive layer configured to cover a second surface of the vibration part opposite to the first surface of the vibration part. The vibration apparatus can be configured to be connected to the rear surface of the vibration member by the second adhesive layer.

According to one or more embodiments of the present disclosure, the apparatus can further comprise a connection member between the vibration member and the vibration apparatus. The cover member can comprise a first cover member disposed at a first surface of the vibration member, a first adhesive layer between the first surface of the vibration part and the first cover member, a second cover member disposed at a second surface of the vibration part opposite to the first surface of the vibration part, and a second adhesive layer between the second surface of the vibration part and the second cover member. The connection member can be configured to be connected to the first cover member or the second cover member.

According to one or more embodiments of the present disclosure, the vibration apparatus can comprise a plurality of vibration generators, and an adhesive member between the plurality of vibration generators.

According to one or more embodiments of the present disclosure, the vibration member can comprise one or more materials of metal, plastic, fiber, leather, wood, cloth, rubber, carbon, glass, and paper, or can comprise a display panel including a pixel configured to display an image.

An apparatus according to one or more embodiments of the present disclosure can be applied to or included in a sound apparatus. The apparatus according to one or more embodiments of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like.

It will be apparent to those skilled in the art that various modifications and variations can be made in the present disclosure without departing from the spirit or scope of the disclosures. Thus, it is intended that the present disclosure covers the modifications and variations of this disclosure provided that within the scope of the claims and their equivalents.

What is claimed is:

1. An apparatus, comprising:

a vibration member;

a vibration apparatus connected to a rear surface of the vibration member;

a plate disposed at the rear surface of the vibration member adjacent to one side of the vibration apparatus; and a rear cover covering a rear surface of the vibration apparatus, wherein the rear cover comprises a hole part including a plurality of holes overlapping the vibration apparatus, and a cable hole configured to be adjacent to the hole part, and wherein a size of the hole part is greater than a size of the vibration apparatus, and wherein the plate overlaps the cable hole and is spaced apart from the cable hole.

2. The apparatus of claim 1, wherein the vibration member generates a sound based on a vibration of the vibration apparatus, and wherein the sound is output in a forward direction of the vibration member and is output in a rearward direction of the rear cover through the hole part.

3. The apparatus of claim 1, further comprising a gap space provided between the vibration member and the rear cover, wherein the gap space is connected to a rear space of the rear cover through the hole part.

4. The apparatus of claim 3, further comprising a connection member configured between the vibration member and the rear cover to provide the gap space.

5. The apparatus of claim 4, wherein the connection member comprises one or more protrusion parts, and wherein the one or more protrusion parts protrude from a lateral surface of the connection member to the gap space.

6. The apparatus of claim 1, wherein the rear cover comprises:

a first rear cover covering the rear surface of the vibration apparatus; and a second rear cover covering a rear surface of the first rear cover, and wherein the hole part of the rear cover is configured at the first rear cover and the second rear cover.

7. The apparatus of claim 6, wherein the hole part of the rear cover comprises:

a first hole part including a plurality of first holes configured at the first rear cover; and a second hole part including a plurality of second holes configured at the second rear cover to overlap the first hole part.

8. The apparatus of claim 7, wherein some first holes among the plurality of first holes overlap the vibration apparatus, and other first holes among the plurality of first holes overlap the vibration member at a periphery of the vibration apparatus.

9. The apparatus of claim 7, further comprising a gap space provided between the vibration member and the rear cover, wherein the gap space is connected to a rear space of the rear cover through the first hole part and the second hole part.

10. The apparatus of claim 7, wherein the rear cover further comprises a connection frame configured to provide an air gap between the first rear cover and the second rear cover, and wherein the air gap is between the first hole part and the second hole part.

11. The apparatus of claim 10, further comprising a sound circuit board disposed at a rear surface of the second rear cover and electrically connected to the vibration apparatus through a signal line or a signal cable, wherein the second rear cover comprises:

a flat portion disposed parallel to the first rear cover; and a stiff portion protruding from the flat portion, and wherein the sound circuit board is disposed at the stiff portion spaced apart from the first rear cover with the air gap therebetween.

12. The apparatus of claim 1, further comprising a pad member configured between the rear surface of the vibration apparatus and the hole part of the rear cover.

13. The apparatus of claim 12, wherein the pad member overlaps some of the plurality of holes and is spaced apart from the rear cover or contacts the rear cover.

14. The apparatus of claim 12, wherein the vibration apparatus comprises a first area and a second area, and wherein the pad member comprises:

a first pad member at the first area of the vibration apparatus; and a second pad member at the second area of the vibration apparatus.

15. The apparatus of claim 14, wherein the first pad member has a size, which is smaller than a size of the first area of the vibration apparatus, and is disposed at a center portion of the first area of the vibration apparatus.

16. The apparatus of claim 12, wherein the pad member comprises an elastic material having stiffness which is less than a bending stiffness of the vibration apparatus.

17. The apparatus of claim 1, wherein the vibration apparatus comprises:

a plurality of vibration generators; and an adhesive member disposed between the plurality of vibration generators.

18. The apparatus of claim 1, wherein the vibration member comprises one or more materials among metal, plastic, fiber, leather, wood, cloth, rubber, carbon, glass, and paper, or comprises a display panel including a plurality of pixels configured to display an image.

19. An apparatus, comprising:

a vibration member;

a vibration apparatus connected to a rear surface of the vibration member;

a plate disposed at the rear surface of the vibration member; and a rear cover covering a rear surface of the vibration apparatus, wherein the vibration apparatus comprises:

a vibration generating part including a piezoelectric material; and a signal cable electrically connected to the vibration generating part, wherein the rear cover comprises a hole part including a plurality of holes overlapping the vibration apparatus, and a cable hole through which the signal cable passes, wherein a size of the hole part is greater than a size of the vibration apparatus, and wherein the plate overlaps the cable hole and the signal cable, and is spaced apart from the cable hole.

20. The apparatus of claim 19, wherein the vibration generating part comprises:

a vibration part including a piezoelectric material; and a cover member configured to cover the vibration part.

21. The apparatus of claim 20, wherein a portion of the signal cable is accommodated between the vibration part and the cover member.

22. The apparatus of claim 20, wherein the cover member comprises:

a first cover member disposed at a first surface of the vibration part;

a first adhesive layer disposed between the first surface of the vibration part and the first cover member; and a second adhesive layer configured to cover a second surface of the vibration part opposite to the first surface of the vibration part, and wherein the vibration apparatus is configured to be connected to the rear surface of the vibration member by the second adhesive layer.

23. The apparatus of claim 20, further comprising a connection member disposed between the vibration member and the vibration apparatus, wherein the cover member comprises:

a first cover member disposed at a first surface of the vibration member;

a first adhesive layer disposed between the first surface of the vibration part and the first cover member;

a second cover member disposed at a second surface of the vibration part opposite to the first surface of the vibration part; and a second adhesive layer disposed between the second surface of the vibration part and the second cover member, and wherein the connection member is configured to be connected to the first cover member or the second cover member.

24. An apparatus, comprising:

a vibration member;

a vibration apparatus connected to a rear surface of the vibration member;

a rear cover covering a rear surface of the vibration apparatus, the rear cover comprising a first rear cover covering the rear surface of the vibration apparatus and a second rear cover covering a rear surface of the first rear cover; and a sound circuit board disposed at a rear surface of the second rear cover and electrically connected to the vibration apparatus through a signal line or a signal cable, wherein the rear cover comprises a hole part including a plurality of holes overlapping the vibration apparatus, wherein a size of the hole part is greater than a size of the vibration apparatus, wherein the hole part of the rear cover is configured at the first rear cover and the second rear cover, wherein the hole part of the rear cover comprises:

a first hole part including a plurality of first holes configured at the first rear cover; and a second hole part including a plurality of second holes configured at the second rear cover to overlap the first hole part, wherein the rear cover further comprises a connection frame configured to provide an air gap between the first rear cover and the second rear cover, wherein the air gap is between the first hole part and the second hole part;

wherein the second rear cover comprises:

a flat portion disposed parallel to the first rear cover; and a stiff portion protruding from the flat portion, and wherein the sound circuit board is disposed at the stiff portion spaced apart from the first rear cover with the air gap therebetween.

* * * * *